(12) United States Patent
Binfet et al.

(10) Patent No.: US 10,703,181 B2
(45) Date of Patent: Jul. 7, 2020

(54) TONNEAU ASSEMBLIES AND METHODS OF USE AND MANUFACTURE THEREOF

(71) Applicant: Honda Motor Co., Ltd., Tokyo (JP)

(72) Inventors: Michael T. Binfet, Bellefontaine, OH (US); Brock J. Stull, Columbus, OH (US); Douglas R. Kaltenmark, Powell, OH (US); Babuji K. Tamarapoo, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 15/862,698

(22) Filed: Jan. 5, 2018

(65) Prior Publication Data
US 2018/0194208 A1 Jul. 12, 2018

Related U.S. Application Data

(60) Provisional application No. 62/478,177, filed on Mar. 29, 2017, provisional application No. 62/443,210, filed on Jan. 6, 2017.

(51) Int. Cl.
*B60J 7/10* (2006.01)
*B60P 7/04* (2006.01)

(52) U.S. Cl.
CPC ............... *B60J 7/104* (2013.01); *B60J 7/102* (2013.01); *B60P 7/04* (2013.01)

(58) Field of Classification Search
CPC ............... B60J 7/104; B60J 7/102; B60J 7/04
USPC .................................................... 296/100.16
See application file for complete search history.

(56) References Cited

U.S. PATENT DOCUMENTS

| | | | |
|---|---|---|---|
| 2,853,758 | A | 9/1958 | Topf |
| 3,707,919 | A | 1/1973 | Adler |
| 3,768,540 | A | 10/1973 | McSwain |
| 3,812,640 | A | 5/1974 | Knott |

(Continued)

FOREIGN PATENT DOCUMENTS

| | | |
|---|---|---|
| DE | 3109542 | 9/1982 |
| DE | 10024645 | 1/2001 |

(Continued)

OTHER PUBLICATIONS 2005-2014 Nissan Frontier Roll Up Tonneau Covers—Access 22030179—Access TonnoSport Tonneau Cover.pdf.

(Continued)

*Primary Examiner* — Hilary L Gutman
(74) *Attorney, Agent, or Firm* — Rankin, Hill & Clark LLP

(57) ABSTRACT

Some embodiments are directed to a tonneau side rail assembly for attachment to a vehicle bed frame that is at least partially covered by a bed frame cover, and that at least partially defines a vehicle exposed area. The tonneau side rail assembly can include a tonneau side rail that is configured to be removably attached to a tonneau assembly. The tonneau side rail can include upper and lower surfaces, an aperture being defined in each of the upper and lower surfaces such that an open space is defined between the apertures. An extender can define longitudinally opposite ends, one of the ends being configured to be rigidly secured to the vehicle bed frame, and the other of the ends being configured to be rigidly secured to the tonneau side rail so as to define a gap between the tonneau side rail and the bed frame cover.

18 Claims, 32 Drawing Sheets

(56) References Cited

U.S. PATENT DOCUMENTS

| | | | |
|---|---|---|---|
| 4,032,186 A | 6/1977 | Pickering et al. | |
| 4,036,521 A * | 7/1977 | Clenet | B60J 7/104 |
| | | | 296/100.15 |
| 4,273,377 A | 6/1981 | Alexander | |
| 4,444,427 A | 4/1984 | Martin | |
| 4,480,675 A | 11/1984 | Berkemeier | |
| 4,542,610 A | 9/1985 | Weimar | |
| 4,563,034 A | 1/1986 | Lamb | |
| 4,639,033 A | 1/1987 | Wheatley et al. | |
| 4,673,208 A | 6/1987 | Tsukamoto | |
| 4,757,854 A | 7/1988 | Rippberger | |
| 4,792,178 A | 12/1988 | Kokx | |
| 4,923,240 A | 5/1990 | Swanson | |
| 4,958,875 A | 9/1990 | Zamzow | |
| 5,058,652 A | 10/1991 | Wheatley et al. | |
| 5,076,338 A | 12/1991 | Schmeichel et al. | |
| 5,152,574 A | 10/1992 | Tucker | |
| 5,186,514 A | 2/1993 | Ronai | |
| 5,224,748 A | 7/1993 | Decker et al. | |
| 5,273,382 A * | 12/1993 | Yearick | F16B 13/066 |
| | | | 411/64 |
| 5,324,091 A | 6/1994 | Baker | |
| 5,353,826 A | 10/1994 | Davis, Sr. | |
| 5,360,250 A * | 11/1994 | Wood | B60P 7/0807 |
| | | | 296/39.2 |
| 5,460,423 A | 10/1995 | Kersting et al. | |
| 5,472,256 A | 12/1995 | Tucker | |
| 5,480,206 A | 1/1996 | Hathaway et al. | |
| 5,487,585 A | 1/1996 | Wheatley | |
| 5,531,497 A | 7/1996 | Cheng | |
| 5,560,666 A * | 10/1996 | Vieira | B60P 3/40 |
| | | | 224/402 |
| 5,636,893 A | 6/1997 | Wheatley et al. | |
| 5,676,415 A | 10/1997 | Ament et al. | |
| 5,690,377 A | 11/1997 | Denyer | |
| 5,702,147 A | 12/1997 | Essig | |
| 5,706,753 A | 1/1998 | Menne et al. | |
| 5,758,922 A | 6/1998 | Wheatley | |
| 5,788,315 A | 8/1998 | Tucker | |
| 5,813,449 A | 9/1998 | Patmore et al. | |
| 5,881,793 A | 3/1999 | Righter et al. | |
| 5,906,407 A | 5/1999 | Schmeichel | |
| 5,921,603 A | 7/1999 | Karrer | |
| 5,934,735 A | 8/1999 | Wheatley | |
| 5,961,172 A | 10/1999 | Ament et al. | |
| 5,984,400 A | 11/1999 | Miller et al. | |
| 5,988,472 A | 11/1999 | McPhail et al. | |
| 6,024,401 A * | 2/2000 | Wheatley | B60J 7/102 |
| | | | 296/100.17 |
| 6,053,556 A | 4/2000 | Webb | |
| 6,053,558 A | 4/2000 | Weldy et al. | |
| 6,086,709 A | 7/2000 | Hills | |
| 6,113,176 A | 9/2000 | Bernardo | |
| 6,125,908 A | 10/2000 | Ament et al. | |
| 6,131,782 A | 10/2000 | De Silva et al. | |
| 6,224,139 B1 | 5/2001 | Weyand | |
| 6,234,561 B1 | 5/2001 | Huotari | |
| 6,257,306 B1 | 7/2001 | Weldy | |
| 6,257,647 B1 | 7/2001 | Ninness et al. | |
| 6,286,888 B1 | 9/2001 | Essig | |
| 6,293,608 B1 | 9/2001 | Dicke et al. | |
| 6,309,006 B1 | 10/2001 | Rippberger | |
| 6,322,129 B2 | 11/2001 | Huotari | |
| 6,422,635 B1 | 7/2002 | Steffens et al. | |
| 6,427,500 B1 | 8/2002 | Weinerman et al. | |
| 6,454,337 B2 | 9/2002 | Steffens et al. | |
| 6,474,654 B1 | 11/2002 | Schmeichel | |
| 6,499,791 B2 | 12/2002 | Wheatley | |
| 6,520,559 B1 | 2/2003 | Steffens et al. | |
| 6,527,278 B1 | 3/2003 | Norris | |
| 6,527,330 B1 | 3/2003 | Steffens et al. | |
| 6,543,836 B1 | 4/2003 | Wheatley | |
| 6,565,141 B1 | 5/2003 | Steffens et al. | |
| 6,568,740 B1 | 5/2003 | Dimmer | |
| 6,575,520 B1 | 6/2003 | Spencer | |
| 6,604,898 B2 | 8/2003 | Price | |
| 6,607,234 B1 | 8/2003 | Schmeichel | |
| 6,619,719 B1 | 9/2003 | Wheatley | |
| 6,669,264 B1 | 12/2003 | Tucker | |
| 6,676,189 B2 | 1/2004 | Schall et al. | |
| 6,685,240 B2 | 2/2004 | Bacon | |
| 6,685,251 B2 | 2/2004 | Dumas | |
| 6,688,668 B2 | 2/2004 | Stevens et al. | |
| 6,719,353 B1 | 4/2004 | Isler et al. | |
| 6,752,449 B1 | 6/2004 | Wheatley | |
| 6,773,019 B2 | 8/2004 | Schmeichel | |
| 6,808,220 B2 | 10/2004 | Wheatley | |
| 6,808,221 B2 | 10/2004 | Wheatley | |
| 6,811,203 B2 | 11/2004 | Wheatley | |
| 6,814,388 B2 | 11/2004 | Wheatley | |
| 6,814,389 B2 | 11/2004 | Wheatley | |
| 6,824,191 B2 | 11/2004 | Wheatley | |
| 6,832,803 B2 | 12/2004 | Elliott | |
| 6,893,073 B2 | 5/2005 | Wheatley | |
| 6,959,848 B2 | 11/2005 | Schmeichel | |
| 6,976,724 B2 | 12/2005 | Wheatley | |
| 7,025,403 B2 | 4/2006 | Wheatley | |
| 7,045,612 B2 | 5/2006 | Gravel | |
| 7,063,944 B1 | 6/2006 | Gravel | |
| 7,182,384 B2 | 2/2007 | Schmeichel | |
| 7,188,888 B2 | 3/2007 | Wheatley et al. | |
| 7,204,540 B2 | 4/2007 | Wheatley | |
| 7,261,328 B2 | 8/2007 | Minix | |
| 7,316,445 B2 | 1/2008 | Sugimoto | |
| 7,318,618 B1 | 1/2008 | Yue | |
| 7,363,786 B2 | 4/2008 | TerHaar et al. | |
| 7,392,834 B2 | 7/2008 | Davenport et al. | |
| 7,427,095 B2 | 9/2008 | Wheatley | |
| 7,484,790 B2 | 2/2009 | Wheatley | |
| 7,578,098 B2 | 8/2009 | Furuzawa et al. | |
| 7,604,272 B2 | 10/2009 | Day | |
| 7,604,282 B2 | 10/2009 | Spencer et al. | |
| 7,607,714 B2 | 10/2009 | Wheatley | |
| 7,621,582 B2 | 11/2009 | Schmeichel et al. | |
| 7,815,239 B1 | 10/2010 | Schmeichel et al. | |
| 7,823,957 B2 | 11/2010 | Williamson et al. | |
| 7,854,465 B2 | 12/2010 | LeBlanc et al. | |
| 7,954,876 B2 | 6/2011 | Kosinski | |
| 8,047,600 B2 | 11/2011 | Leblanc et al. | |
| 8,104,821 B2 | 1/2012 | Hu et al. | |
| 8,128,149 B1 | 3/2012 | Wolf et al. | |
| 8,146,981 B2 | 4/2012 | Huotari et al. | |
| 8,146,982 B2 | 4/2012 | Williamson et al. | |
| 8,240,740 B2 | 8/2012 | Chenowth et al. | |
| 8,336,946 B2 | 12/2012 | Schrader et al. | |
| 8,366,173 B2 | 2/2013 | Xu | |
| 8,465,079 B2 | 6/2013 | Saito et al. | |
| 8,480,154 B2 | 7/2013 | Yue | |
| 8,544,934 B2 | 10/2013 | Maimin et al. | |
| 8,573,678 B2 | 11/2013 | Yue | |
| 8,632,114 B2 | 1/2014 | Yue | |
| 8,702,150 B2 | 4/2014 | Saito et al. | |
| 8,714,622 B2 | 5/2014 | Spencer et al. | |
| 8,777,293 B2 | 7/2014 | Garska | |
| 8,814,249 B2 | 8/2014 | Rossi | |
| 8,857,887 B1 | 10/2014 | Schmeichel | |
| 8,960,764 B2 | 2/2015 | Spencer | |
| 9,032,668 B2 | 5/2015 | Blackwood et al. | |
| 9,067,481 B2 | 6/2015 | Xu | |
| 9,120,413 B2 | 9/2015 | Fink | |
| 9,908,391 B2 | 3/2018 | Williamson et al. | |
| 10,239,394 B2 | 3/2019 | Lutzka et al. | |
| 10,286,765 B2 | 5/2019 | Williamson et al. | |
| 2001/0020792 A1 | 9/2001 | Huotari | |
| 2002/0096909 A1 | 7/2002 | Schmeichel | |
| 2004/0212212 A1 | 10/2004 | Spencer et al. | |
| 2005/0057069 A1 | 3/2005 | McNamara | |
| 2005/0191701 A1 | 9/2005 | Gravel et al. | |
| 2010/0123331 A1 | 5/2010 | Buelna et al. | |
| 2010/0133872 A1 | 6/2010 | Kosinski | |
| 2014/0246877 A1 | 9/2014 | Spencer et al. | |

(56) References Cited

U.S. PATENT DOCUMENTS

2015/0001877 A1    1/2015  Fink
2015/0082704 A1    3/2015  Gamble et al.

FOREIGN PATENT DOCUMENTS

EP        2223818       9/2010
JP        2006335238    12/2006

OTHER PUBLICATIONS

"The Downey SST (Sland Side Tonneau)", Downey Products USA, Inc., 2019, http://downyproductsnortheast.com/order-online/.
Renninger, Jennifer. "Understanding Damping Techniques for Noise and Vibration Control." EAR Aearo Technologies, 2000, https://earglobal.com/media/9891/understandingdampingtechniques.pdf.
Dodge Forum: Tonneau cover vibration?, 2019, https://dodgeforum.com/forum/4th-gen-ram-tech/337026-tonneau-cover-vibration.html.
Notice of Allowance of U.S. Appl. No. 15/936,668 dated Sep. 18, 2019, 35 pages.

* cited by examiner

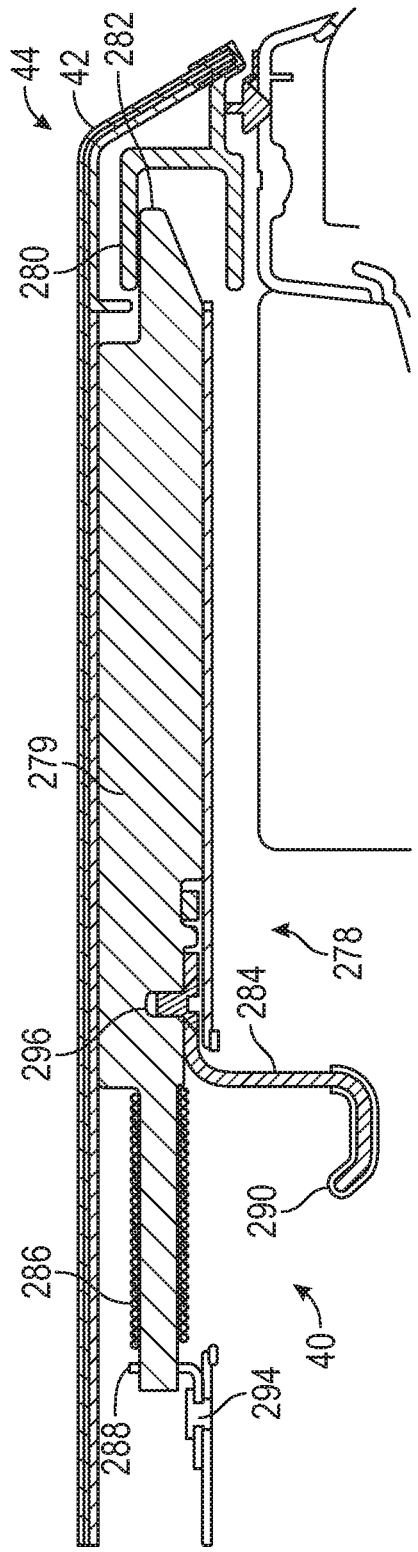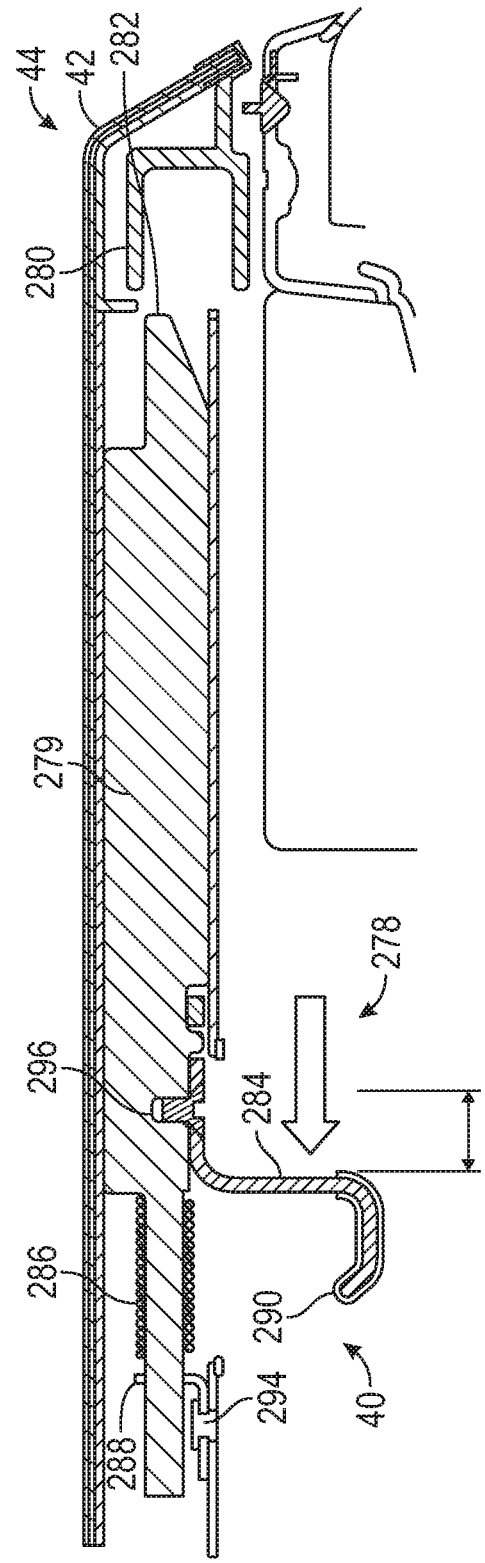

TONNEAU ASSEMBLIES AND METHODS OF USE AND MANUFACTURE THEREOF

RELATED APPLICATIONS

This application claims priority to U.S. Provisional Application Ser. No. 62/443,210 filed on Jan. 6, 2017, which is expressly incorporated herein by reference. This application also claims priority to U.S. Provisional Application Ser. No. 62/478,177 filed on Mar. 29, 2017, which is also expressly incorporated herein by reference.

BACKGROUND

The disclosed subject matter relates to tonneau assemblies, and methods of use and manufacture thereof. More particularly, the disclosed subject matter relates to assemblies for securing tonneau covers to exposed areas of vehicles, as well as related methods of use and manufacture.

Many types of vehicles include open or exposed areas, including but not limited to truck beds, unoccupied passenger seats in convertible automobiles, roadsters, etc., and rear internal storage compartments of sport utility vehicles, minivans and station wagons. Tonneaus can be used to cover these exposed areas for a variety of purposes depending on application. For example, using tonneaus to cover areas that are externally exposed, such as beds of pickup trucks and utility vehicles, and passenger compartments of convertible automobiles and roadsters, may protect internal surfaces of the truck beds and passenger compartments, as well as articles stored therein, from elements including but not limited to wind, rain, sun, etc. These tonneaus may also impede or prevent the unintentional removal of articles stored within these areas, such as while the vehicle is moving. Tonneaus may also be helpful to cover internally exposed areas, such as to shield articles stored therein from the view of individuals outside of the vehicle, such as for security reasons.

SUMMARY

The above disclosure is not intended to constitute an exhaustive listing of tonneau applications, and in particular vehicular areas that may benefit from being at least partially covered by tonneaus. Further, a variety of different types of tonneaus may be used to cover even the limited number of the different vehicular areas specifically disclosed above. For example, hard tonneaus that utilize a relatively inflexible and stiff sheet define a rigid surface to cover these open areas. The hard tonneaus may be beneficial by providing relatively resilient protection, such as from relatively large or heavy objects external to the covered area. Although rigid tonneaus may be relatively difficult to pierce, they may be relatively heavy, which decreases fuel efficiency and makes them difficult to manipulate, such as during installation and removal. The rigid and inflexible nature of hard tonneaus may also make them difficult to store in a compact manner.

Contrarily, soft tonneaus may be relatively light weight (enhancing fuel efficiency), easy to manipulate (e.g., during installation, removal, etc.), and compactable for storage. However, the soft tonneaus should cover the exposed area under both longitudinal and lateral tension in order to be effective, such as to provide the protections disclosed above, as well as to provide resistance to water pooling, support for objects placed on the tonneau upper surface, provide a smooth appearance, and reduce flapping, such as during movement of the vehicle, which can generate wind noise.

Soft tonneaus can include a tonneau sheet, which is formed of relatively flexible material (such as synthetic fabric), connected to a front rail, and an over-center rear rail that is attached to a rear end of the tonneau sheet. The rear rail can be manually pulled rearwardly to cover the exposed area and to tension the tonneau sheet longitudinally. Various apparatus can be used to connect sides of the tonneau sheet at sides of the exposed area, and to maintain lateral tension of the tonneau sheet that is applied by the user while covering the exposed area with the tonneau sheet. For example, loop and hook fasteners, snaps, zippers, etc. can be used for this connection and can maintain the lateral tension applied to the tonneau sheet by the user. As another example, plastic bars can be stitched along edges of the tonneau sheet to communicate with slots provided along side walls that define the open area to lock the tonneau sheet over the exposed area under lateral tension.

As another example, rails can be attached to upper surfaces of the sides of the vehicle that at least partially define the exposed area. These rails can be configured to directly or indirectly communicate, and engage with, the tonneau sheet to removably secure the tonneau sheet over the exposed area. In some such cases, the rails include exterior camming surfaces that define a gap therebetween, and an end of a cable (and/or cable housing) that is secured to the tonneau sheet can be disposed within the gap to removably secure the tonneau sheet to the rail.

The rails can be secured to the upper surfaces of the sides of the vehicle using various techniques. For example, the rails can be clamped or otherwise directly secured to the upper surface of the vehicle sides via a pressure fitting. However, this direct contact can damage the upper surface of the vehicle sides or otherwise become detrimental. For example, the sides that at least partially define the exposed area may include a bed frame and a bed frame cover or garnish, which may be formed of synthetic resin or other resilient or semi-resilient material. Directly securing the rails to the synthetic resin bed frame cover may not be desirable.

In some aspects of the present disclosure, an extender can be used to secure a rail to a bed frame, such that a gap is defined between the rail and a bed frame cover or garnish that covers the bed frame. Some of these extenders can include one end that is secured to the bed frame, and a longitudinally opposite end that is secured to the rail. The extender can extend through an aperture defined in the bed frame cover so as to provide the gap between the rail and the bed frame cover. This gap reduces, impedes or prevents communication of stress, pressure, etc., which is used to accomplish the above attachment, from being communicated to the bed frame cover.

Some embodiments are therefore directed to a tonneau side rail assembly for attachment to a vehicle bed frame that is at least partially covered by a bed frame cover and that at least partially defines a vehicle exposed area. The tonneau side rail assembly can be configured for use with a tonneau assembly that is capable of removably covering the vehicle exposed area. The tonneau side rail assembly can include a tonneau side rail that is configured to be removably attached to the tonneau assembly. The tonneau side rail can include upper and lower surfaces, an aperture being defined in each of the upper and lower surfaces such that an open space is defined between the apertures. The tonneau side rail assembly can also include an extender defining longitudinally opposite ends, one of the ends being configured to be rigidly secured to the vehicle bed frame, and the other of the ends being configured to be rigidly secured to the tonneau side rail adjacent the aperture defined in the lower surface so as to define a gap between the tonneau side rail and the bed frame cover.

Some other embodiments are directed to a tonneau system for use with a vehicle bed frame that is at least partially covered by a bed frame cover and that at least partially defines a vehicle exposed area. The tonneau system can include a tonneau assembly that includes a tonneau cover that is configured to removably cover the vehicle exposed area. The tonneau system can also include a tonneau side rail assembly that includes a tonneau side rail that is configured to be removably attached to the tonneau assembly. The tonneau side rail can include upper and lower surfaces, an aperture being defined in each of the upper and lower surfaces such that an open space is defined between the apertures. The tonneau side rail assembly can also include an extender defining longitudinally opposite ends, one of the ends being configured to be rigidly secured to the vehicle bed frame, and the other of the ends being configured to be rigidly secured to the tonneau side rail adjacent the aperture defined in the lower surface so as to define a gap between the tonneau side rail and the bed frame cover. Some other embodiments are directed to a tonneau system for use with a vehicle bed frame that is at least partially covered by a bed frame cover and that at least partially defines a vehicle exposed area, the tonneau system a tonneau assembly that includes a tonneau cover that is configured to removably cover the vehicle exposed area. A side rail is removably attachable to the tonneau assembly. The side rail includes an upper wall and a base, the base includes a first side positioned opposite a second side, the upper wall and the base at least partially define a chamber, the base includes a protrusion that extends from the first side of the base into the chamber, the base defines a recess on the second side of the base opposite the protrusion, the protrusion defines an aperture in the base, and the second side of the side rail is positionable opposite a side panel cover of a vehicle bed frame. An extender includes a first end that is rigidly securable to the vehicle bed frame, and a second end that is positionable adjacent the second side of the base in the recess to maintain a gap between the side panel cover and the side rail. A fastener includes a head having a diameter greater than a diameter of the aperture and a threaded shaft having a diameter that is smaller than the diameter of the aperture. The threaded shaft of the fastener is insertable through the aperture in the base of the side rail to threadingly engage the extender to secure the side rail to the vehicle bed frame. The head of the fastener is positioned in the chamber between the upper wall and the base when the side rail is secured to the vehicle bed frame. A seal is positioned in the gap between the side rail and the side panel cover. The seal engages the side rail and the side panel cover outboard of the fastener when the side rail is secured to the vehicle bed frame.

Still other embodiments are directed to a method of manufacturing a tonneau side rail assembly that is configured for attachment to a vehicle bed frame that is at least partially covered by a bed frame cover and that at least partially defines a vehicle exposed area. The tonneau side rail assembly can also be configured for use with a tonneau assembly that is capable of removably covering the vehicle exposed area. The method can include: configuring surfaces of a tonneau side rail so as to be removably attachable to the tonneau assembly; forming the tonneau side rail so as to include upper and lower surfaces; defining an aperture in each of the upper and lower surfaces such that an open space extends between the apertures; configuring an extender so as to define longitudinally opposite ends; configuring one of the ends so as to be capable of being rigidly secured to the vehicle bed frame; and configuring the other of the ends so as to be capable of being rigidly secured to the tonneau side rail adjacent the aperture defined in the lower surface, and so as to define a gap between the tonneau side rail and the bed frame cover.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 31 is a partial side view of a cross section of the rear rail in accordance with the present disclosure, with a latch assembly of the rear rail engaged with the side rail.

FIG. 32 is a partial side view of a cross section of the rear rail in accordance with the present disclosure, with the latch assembly of the rear rail disengaged from the side rail.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Vehicle and Tonneau Assembly Overview

Figure 1:
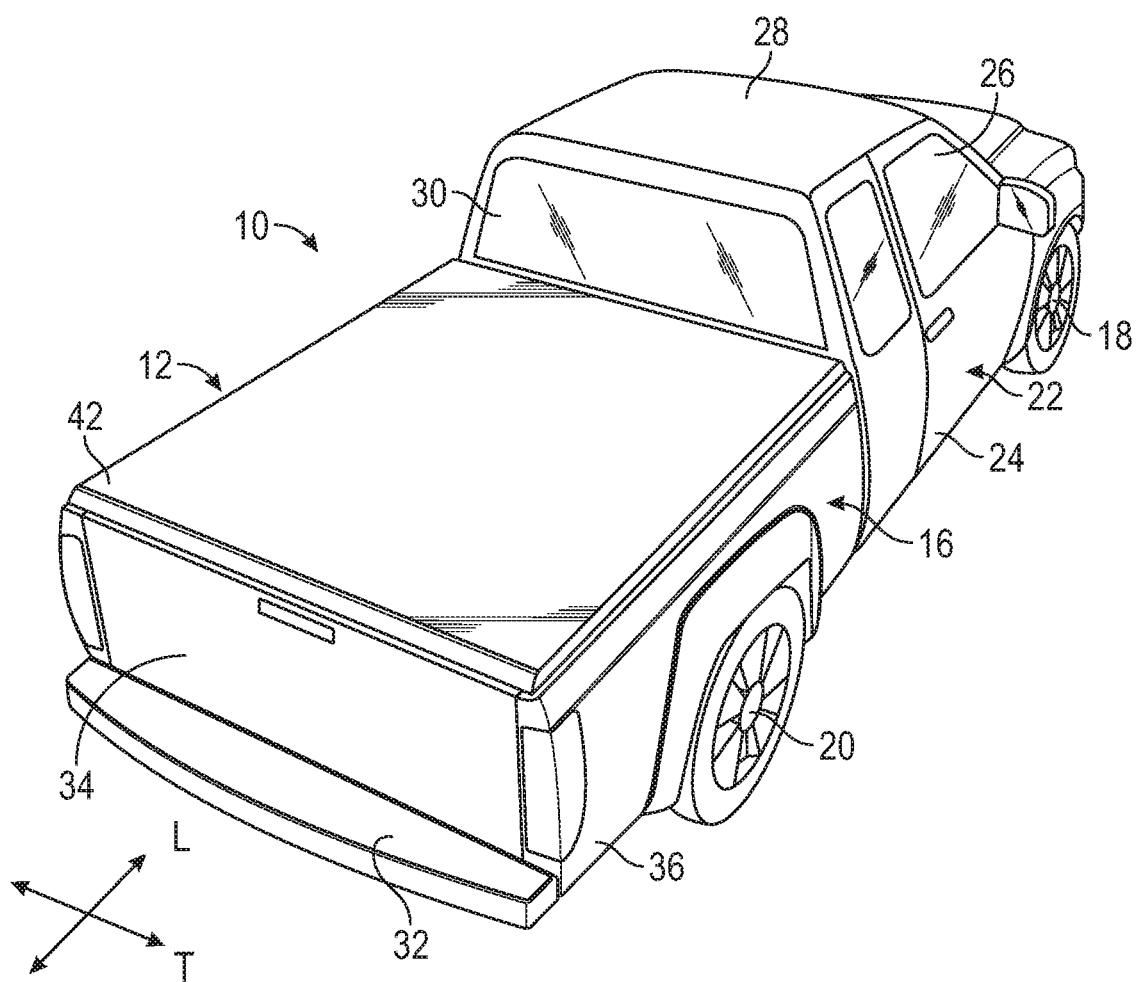
FIG. 1 is a rear perspective view of a vehicle with an exemplary tonneau assembly in accordance with the present disclosure, with the tonneau assembly in a fully closed position.
Figure 2:
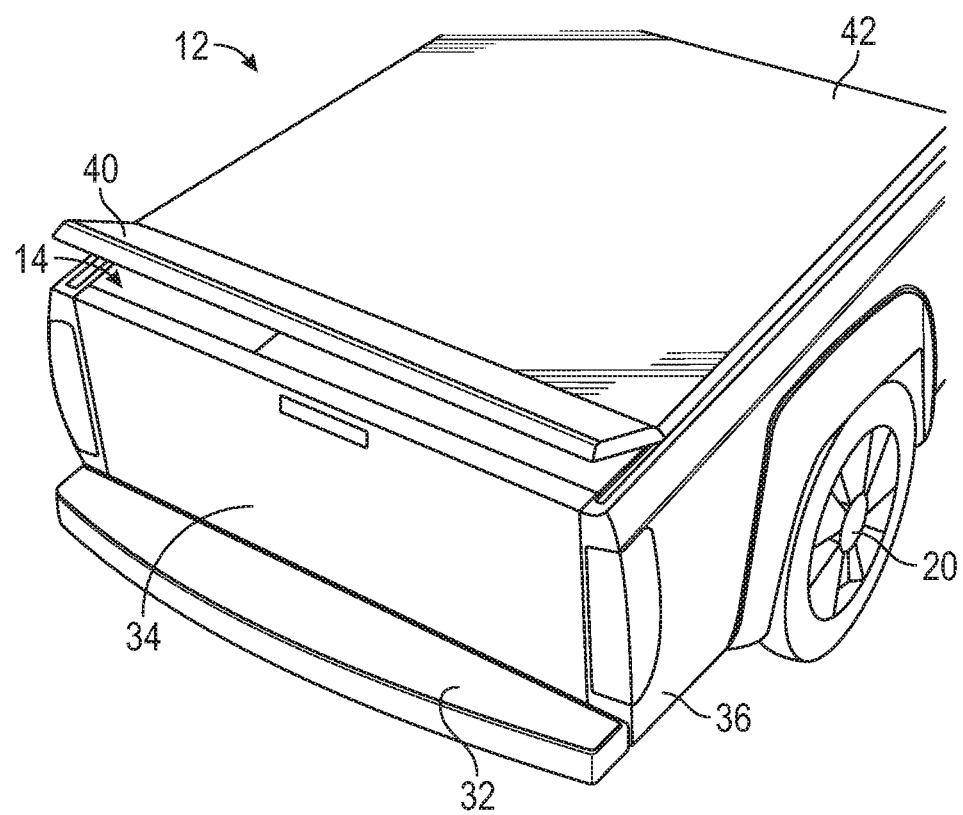
FIG. 2 is a rear perspective view of the vehicle and exemplary tonneau assembly of FIG. 1, with a rear rail of the tonneau assembly in a partially open position and the remainder of the tonneau assembly in a closed position.

FIG. 1 is a rear perspective view of a vehicle with an exemplary tonneau assembly in accordance with the present disclosure, with the tonneau assembly in a fully closed position; FIG. 2 is a rear perspective view of the vehicle and the exemplary tonneau assembly of FIG. 1, with a rear rail of the tonneau assembly in a partially open position and a remainder of the tonneau assembly in a closed position; and FIG. 3 is a rear perspective view of the vehicle and the exemplary tonneau assembly of FIG. 1, with the tonneau assembly in a fully open position.

A. Vehicle

Figure 3:
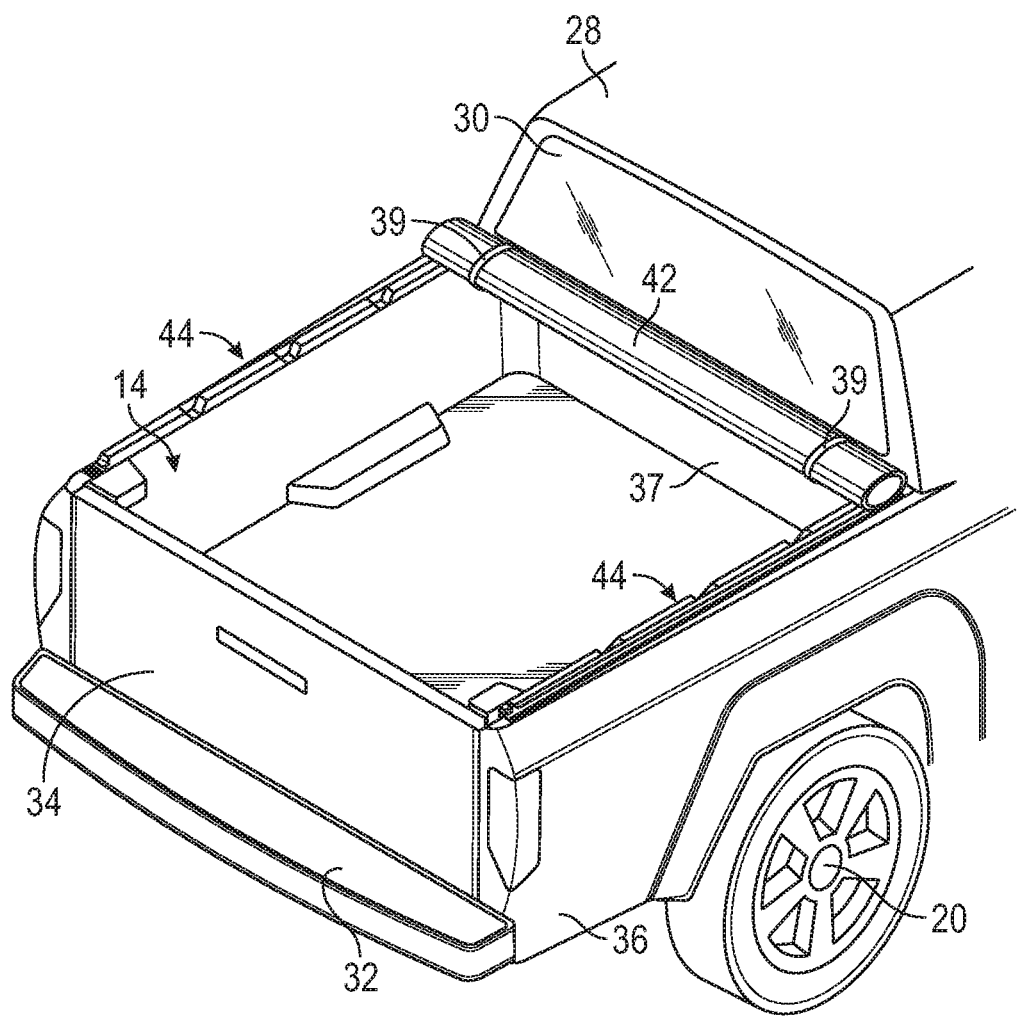
FIG. 3 is a rear perspective view of the vehicle and exemplary tonneau assembly of FIG. 1, with the tonneau assembly in a fully open or storage position.

The vehicle 10 shown in FIGS. 1-3 is an automobile, and in particular a pickup truck with a truck bed 14, where the tonneau assembly 12 is configured to fit over and cover the truck bed 14. However, the disclosed tonneau assemblies, and related methods of use and manufacture thereof, can be used with any vehicle that defines an exposed area, regardless of whether the area is exposed to an exterior of the vehicle or completely defined within the vehicle's interior. For example, embodiments are intended to be used with or otherwise include any vehicle configured for travel along any one or combination of improved, unimproved, and unmarked paths, such as any type of automobile, including a passenger car, minivan, truck, all-terrain vehicle (ATV), semi-tractor, off-highway vehicle, sport utility vehicle, other types of utility vehicles, multipurpose utility vehicle (MUV), side-by-side all-terrain vehicle (SxS, or SxS ATV), etc.

The vehicle 10 can include a truck bed 14, a body 16, a pair of front wheels 18, a pair of rear wheels 20, a pair of door assemblies 22, and a powertrain. The body 16 can be integrated with a frame assembly such as in a unibody (aka, unit body) or monocoque construction, or the body 16 can be connected to a separately formed frame assembly such as a ladder frame construction. The powertrain is hidden from view in FIGS. 1-3.

The door assemblies 22, which occupy the door openings, each can include a door 24 and a window panel assembly 26, and can be configured to selectively open and close access through the door openings by moving between a closed position and a fully opened position. In the closed position, the door assemblies 22 can span the respective door openings to obstruct access to the passenger compartment via the door openings. The fully opened position can be any position where the door assemblies 22 are pivoted away from the respective door openings to provide substantially unobstructed access to the passenger compartment via the door openings. FIG. 1 shows the door assemblies 22 in the fully closed position.

The vehicle 10 may, of course, include any number of additional or alternative features. For example, the vehicle 10 can include a roof panel 28, a rear window 30, a front window (hidden from view), a rear bumper 32, a tail gate 34, and a pair of side panels 36. The tail gate 34 can be pivotally connected to the body 16 adjacent the rear bumper 32 so as to be rotatable between an open position (not shown) and a closed position (shown in FIGS. 1-3, 11, 16, 37, 44). Not shown are support members that can be provided to support the tail gate 34 in the open position. One support member can be connected to each side of the tail gate 34 and an inside surface of each of the side panels 36.

The truck bed 14 can be defined by the tail gate 34 (in the closed position), opposing side panels 36 of the body 16, and front panel 37 (shown in FIGS. 3 and 11) disposed immediately behind the passenger compartment below the rear window 30. In the configuration shown in FIG. 1, the truck bed 14 is completely enclosed when the tail gate 34 is in the closed position and the tonneau assembly 12 is installed and in the fully closed position.

In many of the disclosed embodiments, each side of the vehicle 10 is symmetrical. Therefore, references to components on one side of the vehicle 10 that are also present on the other side of the vehicle 10 are intended to also be applicable to the components on the other side of the vehicle 10 not referenced. However, embodiments are also intended to cover vehicles with asymmetrical configurations.

B. Tonneau

The tonneau assembly 12 can include a rear rail 40, and a sheet 42 connected to the rear rail 40. The rear rail 40 can be formed of any resilient or sufficiently resilient material for the desired application. In the embodiment shown in FIGS. 1 and 2, the rear rail 40 is formed of a rigid or relatively inflexible member. Contrarily, the sheet 42 is formed of a relatively flexible material (such as fabric), which enables it to be relatively light weight (enhancing fuel efficiency), easy to manipulate (e.g., during installation, removal, etc.), and compactable for storage. The sheet 42 is sized and shaped to cover at least a part of the truck bed 14.

It is intended that the rear rail 40 and sheet 42 can be formed of any known, related art, or later developed material. It is also intended that the sheet 42 can be connected to the rear rail 40 in any manner, such as by rivets, bolts, glue, epoxy, stitching, etc. It is also intended that the sheet 42 can be connected to the rear rail 40 at any location, such as at the rear rail's front, intermediate portion, rear, bottom, or top.

FIG. 1 shows the rear rail 40 in the closed position covering a rear end of the truck bed 14. As discussed in more detail with regard to FIGS. 26A-C, the rear rail 40 can be pivoted between opened and closed positions.

With regard to FIGS. 2 and 26A-C, the rear rail 40 is removably and pivotally attached at the rear end of the truck bed 14. More specifically, front side surfaces of the rear rail 40 that are pivotally attached at the rear end of the truck bed 14 enable the rear rail 40 to pivot or otherwise be rotatable. FIG. 2 shows the rear rail 40 as being pivoted at that location to expose an interior of the truck bed 14.

This pivotal connection can also be disengaged to enable the rear rail 40 and sheet 42 to expose the truck bed 14. For example, as shown in FIG. 3, the rear rail 40 can be completely detached and used to fold or roll the sheet 42 in a longitudinal direction L toward the passenger compartment. The rigid nature of the rear rail 40 enables it to be used to manually fold or roll the sheet 42 to expose the truck bed 14, and also to store the sheet 42 in a relatively compact manner. Once folded or rolled, the sheet 42 can be secured in a storage position by looping a pair of straps 39 attached to a rearward end of a front rail 82 around the folded or rolled sheet 42 and then clipping opposite ends of each strap 39 together. Alternatively, the pair of straps 39 may be provided with buckles or any other alternative structure for connecting opposing ends, and any number of straps such as one, two, three, four, etc. may be appropriate.

To secure the side rails 44 to sides of the truck bed 14, the side rails 44 should be fixedly spaced from the sides of the truck bed 14, such as to provide: reduced stress on components of the tonneau assembly 12 such as the side rails 44; reduced stress on components of the truck bed 14 and surrounding structures such as side panel covers 100; and strengthened mounting of the side rails 44 to the sides of the truck bed 14. This side rail mounting may also be effective to improve detachment of the side rails 44, such as when removing the side rails 44 from the vehicle 10 to uninstall the tonneau assembly 12, which can be made difficult by deformed components of the tonneau assembly 12 and structures surrounding the truck bed 14 resulting from initial attachment of the side rails 44.

Various exemplary structures for providing this side rail mounting are disclosed below. However, these disclosures are provided for exemplary purposes, and are not intended to be limiting. Embodiments are intended to include or otherwise cover any structures or methods for side rail mounting in an easy, simple and effective manner.

II. Side Rail Mounting

Figure 4:
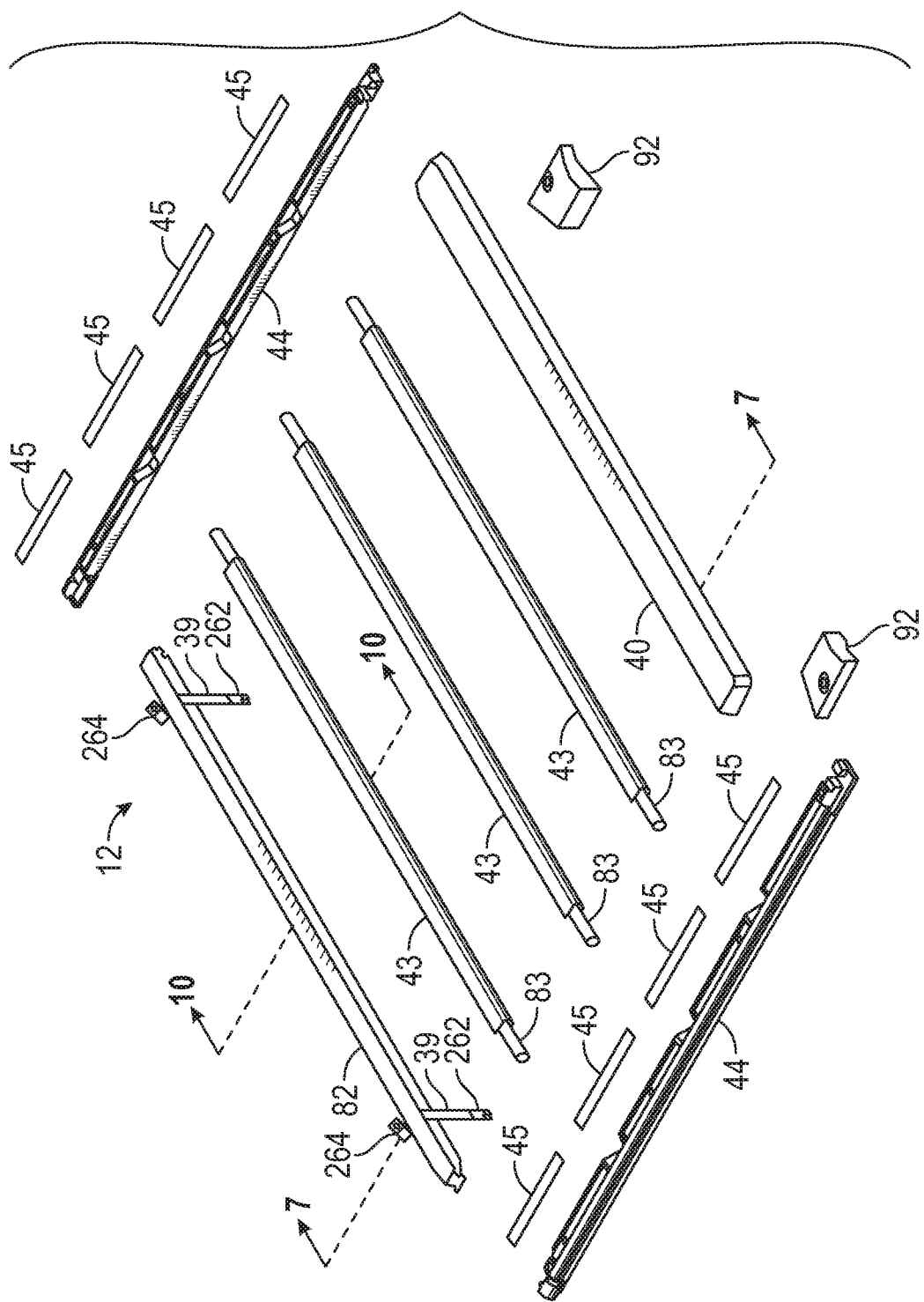
FIG. 4 is an exploded perspective view of the tonneau assembly including the rear rail, side rails, and a front rail in accordance with the present disclosure, with a sheet omitted.
Figure 11:
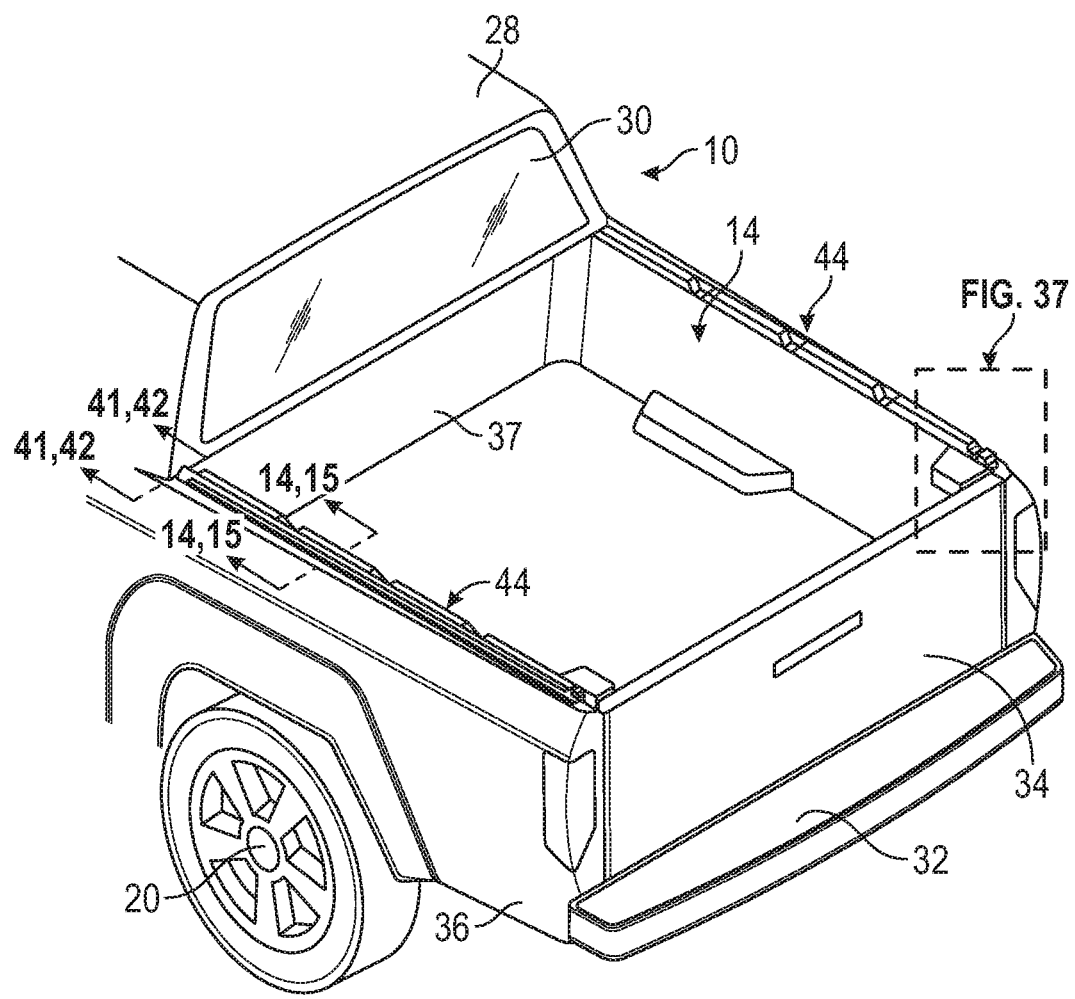
FIG. 11 is a perspective view of the tonneau assembly, with the side rails mounted to sides of the truck bed.
Figure 12:
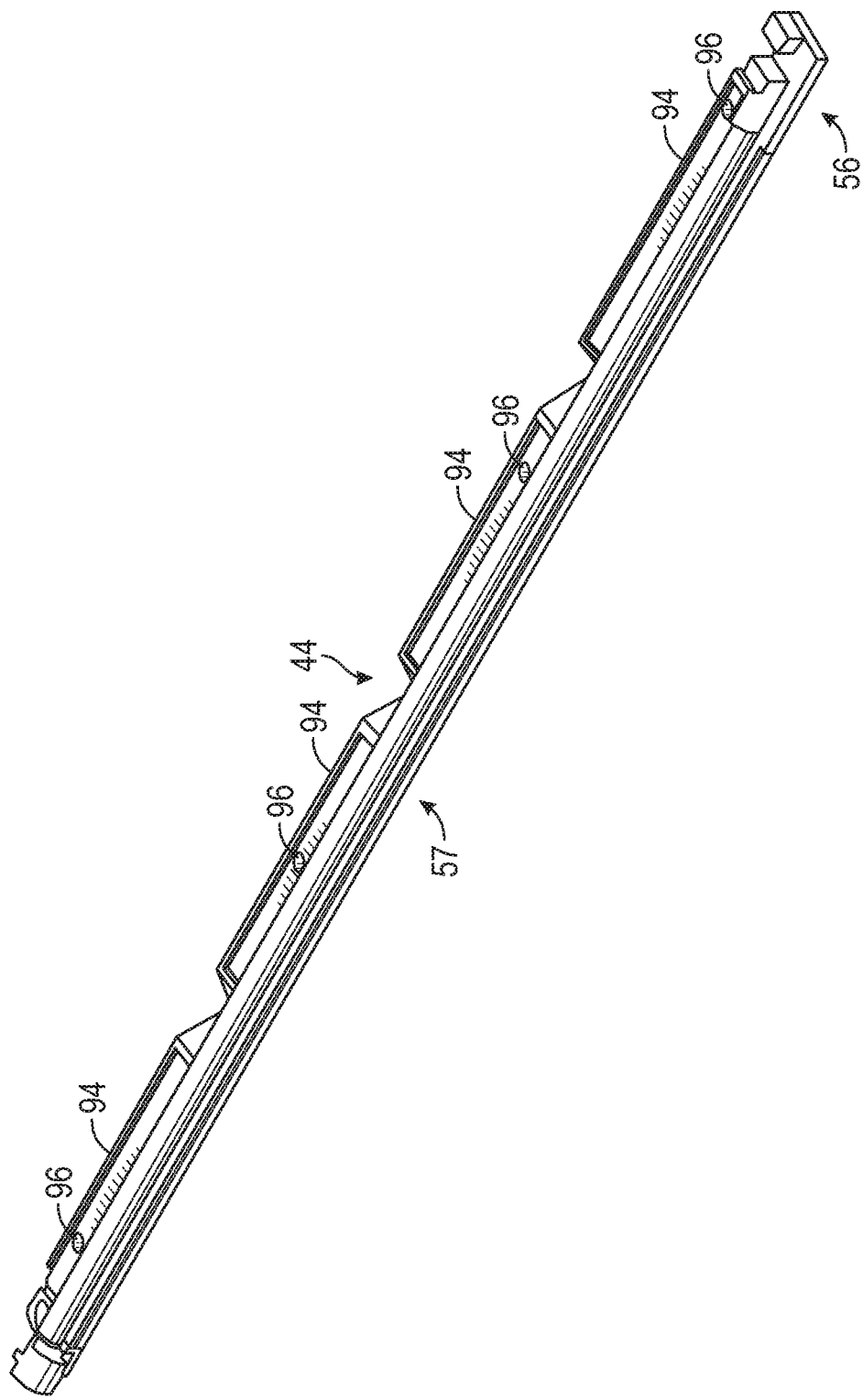
FIG. 12 is a perspective view of a driver-side side rail, with side rail caps removed.
Figure 13:
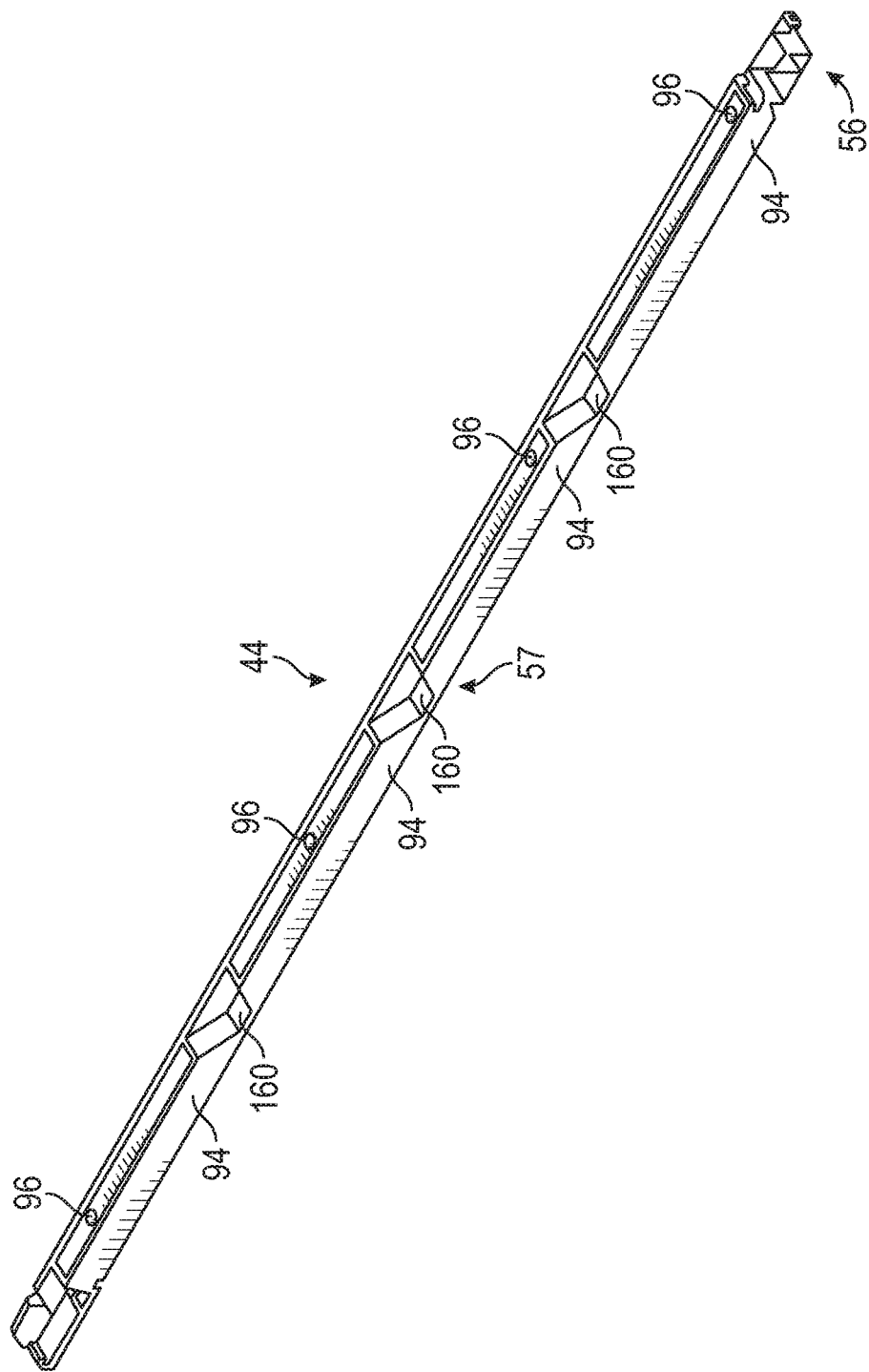
FIG. 13 is a perspective view of a passenger-side side rail, with side rail caps removed.
Figure 14:
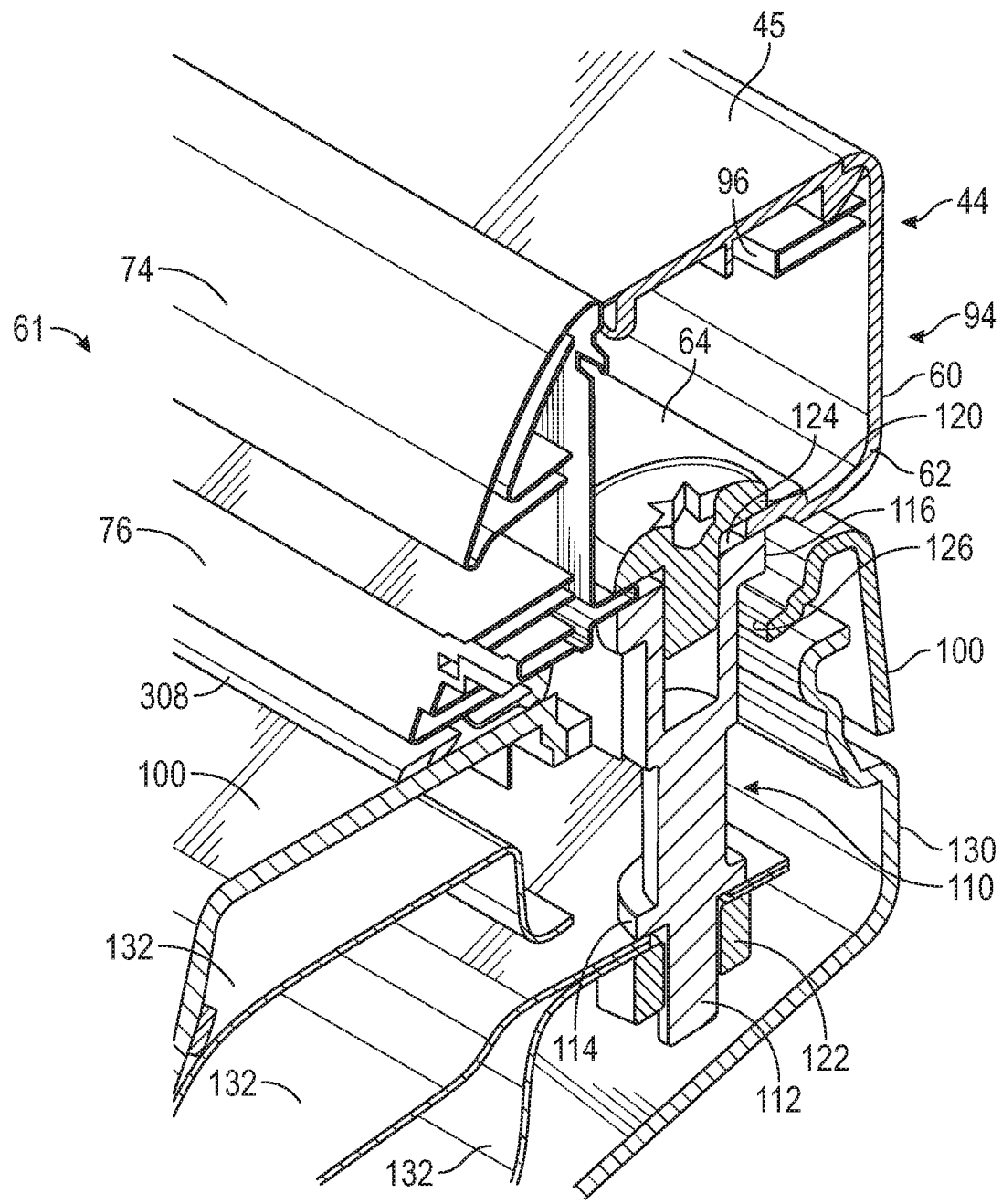
FIG. 14 is a perspective view of a cross section of the driver-side side rail of FIG. 11, with a bolt and side rail cap attached.
Figure 15:
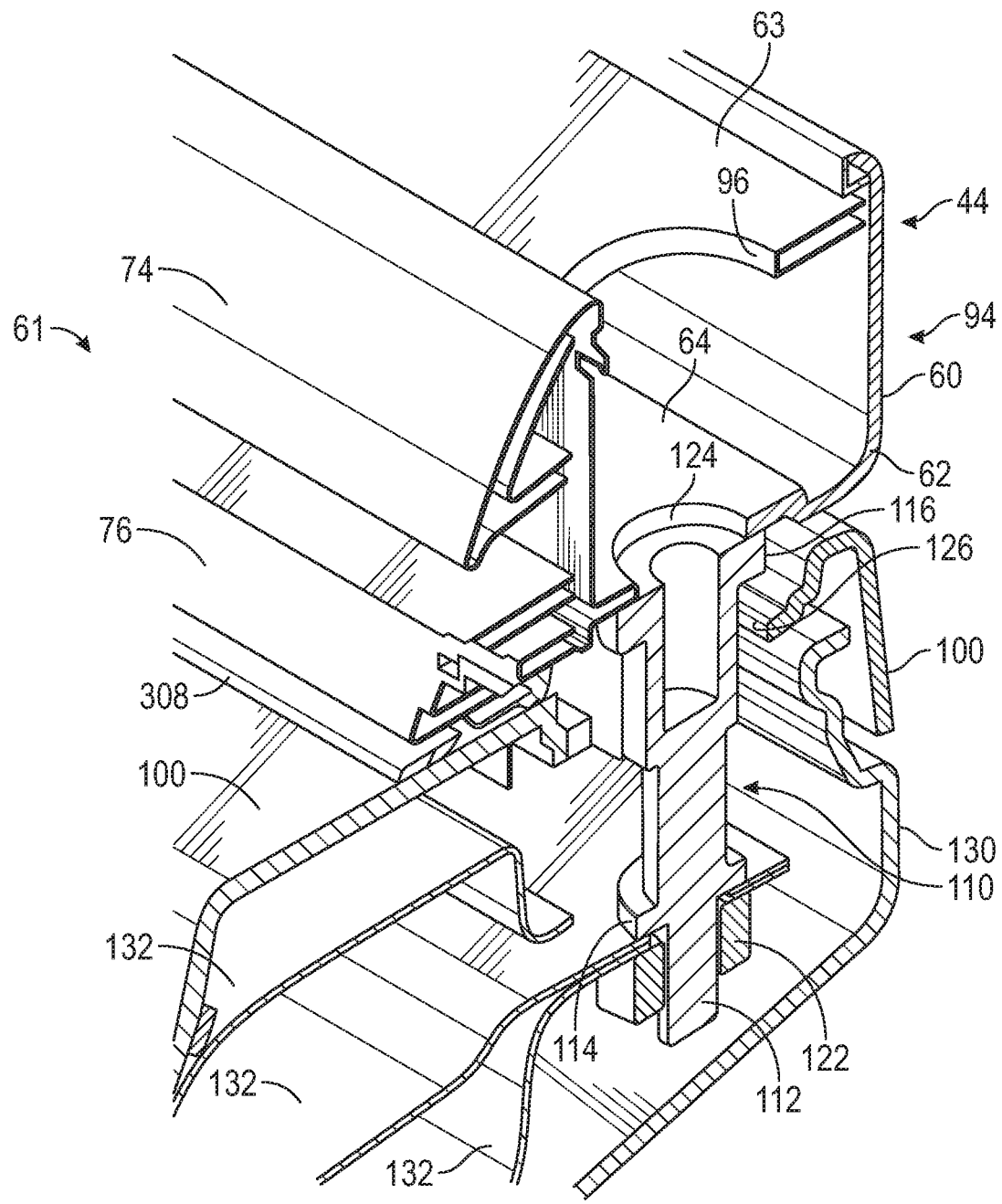
FIG. 15 is a perspective view of a cross section of the driver-side side rail of FIG. 11, with the bolt and side rail cap removed.
Figure 16:
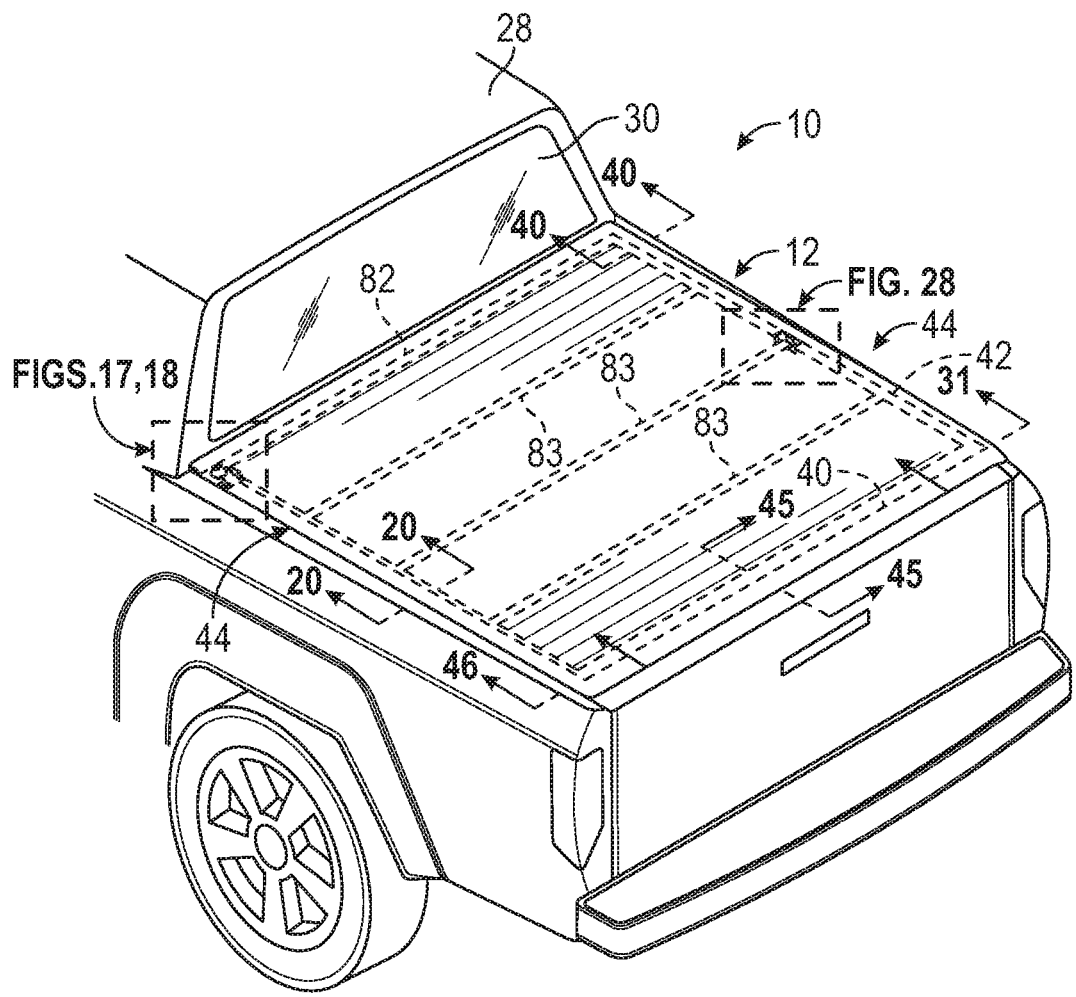
FIG. 16 is a perspective view of the tonneau assembly mounted to the vehicle, with the tonneau assembly in the fully closed position.
Figure 26A:
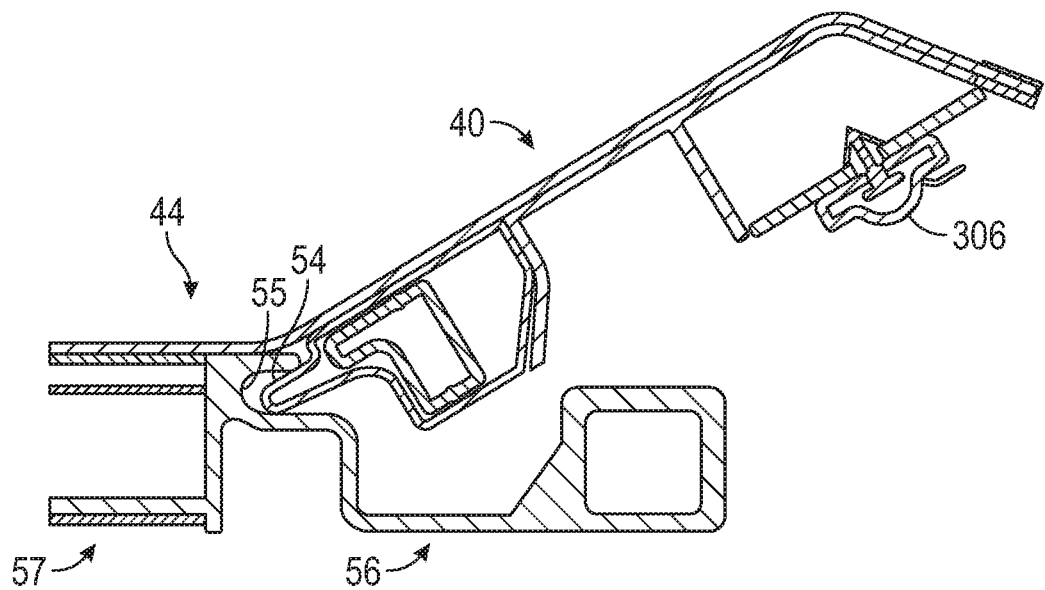
FIGS. 26A-C are side views of a cross section of the rear rail at various stages of operation.
Figure 26B:
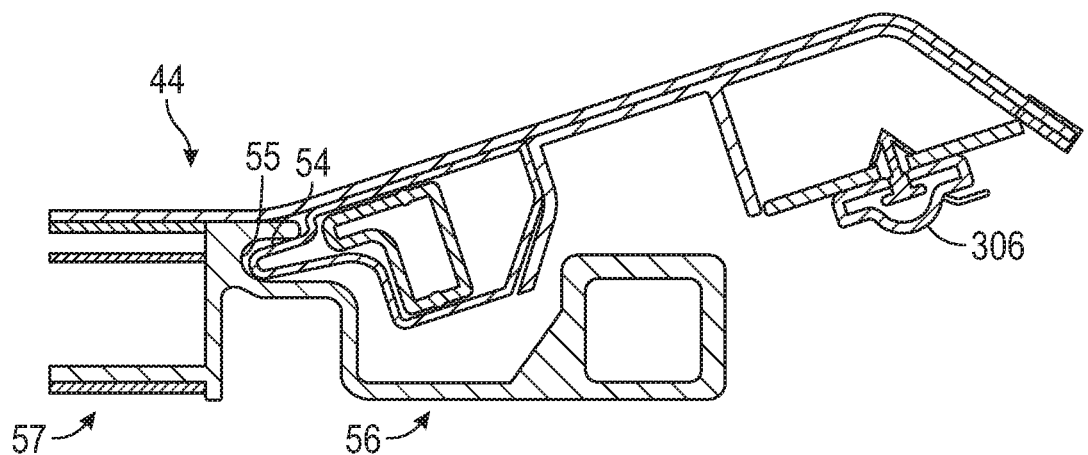
Figure 26C:
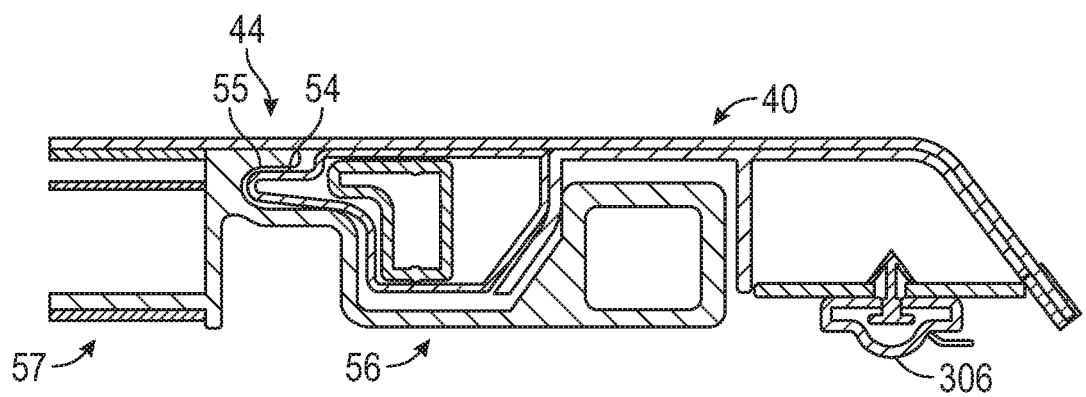
Figure 38:
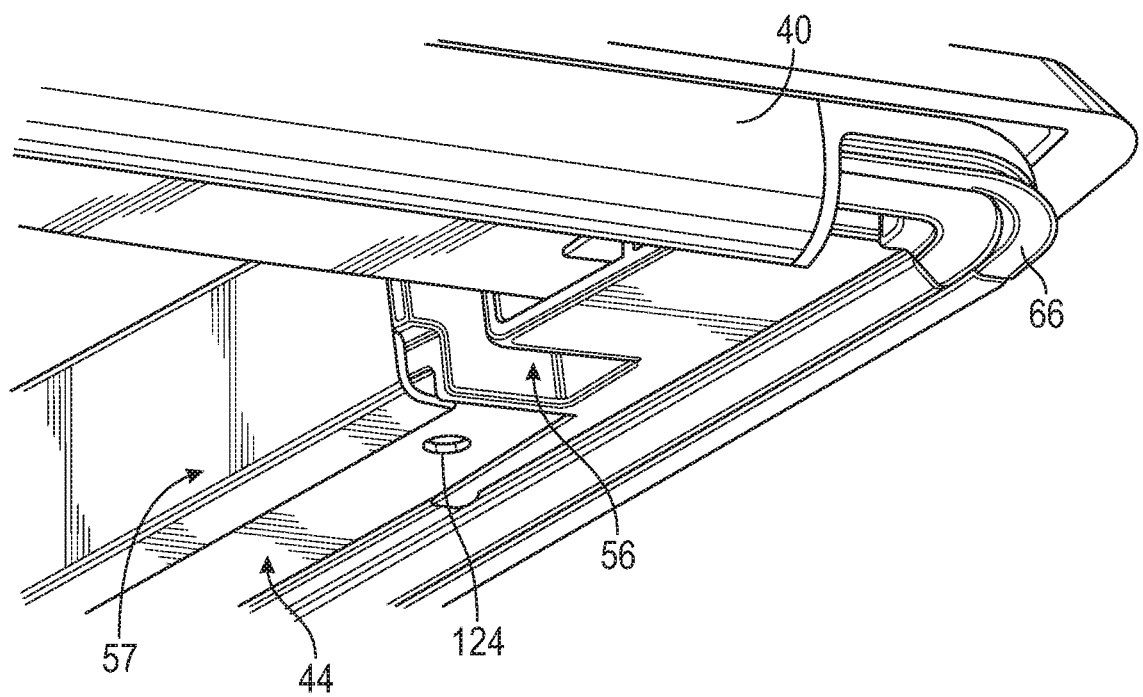
FIG. 38 is a perspective view of an underside of part of the tonneau assembly in accordance with the present disclosure, including a surrounding seal.
Figure 39:
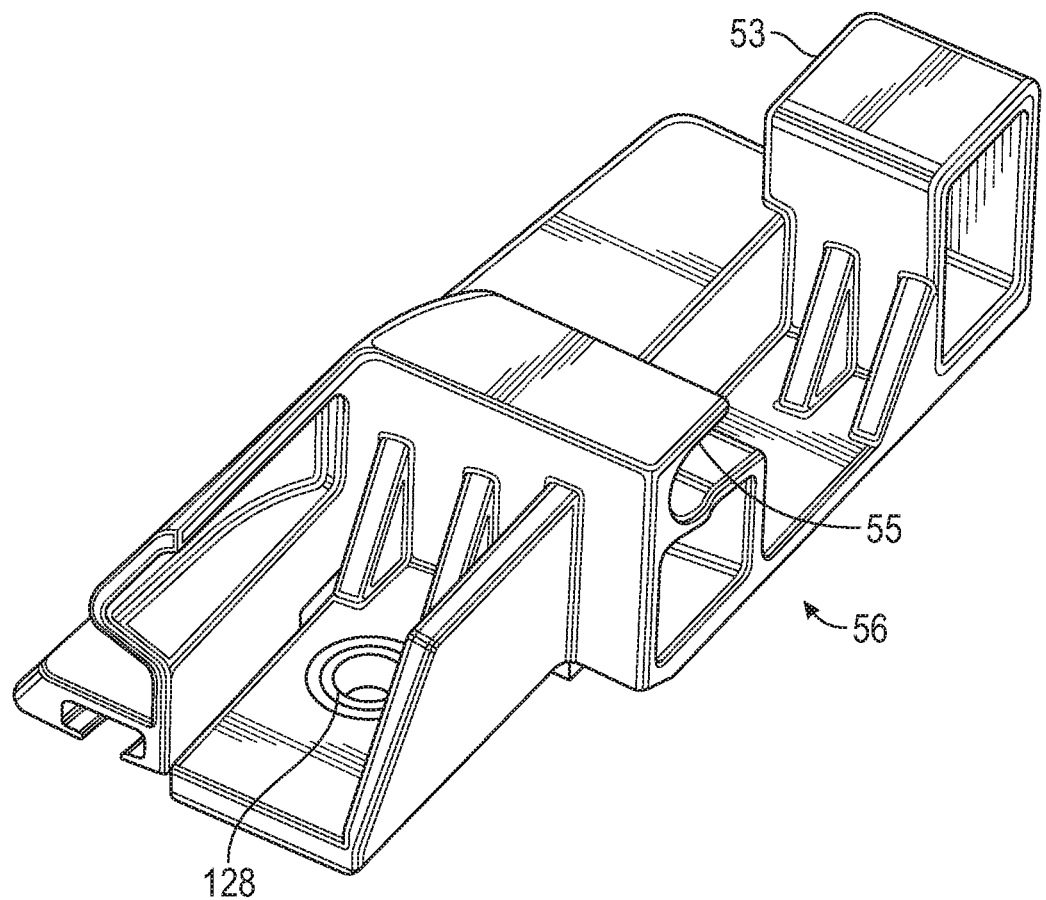
FIG. 39 is a perspective view of a hinge section of the side rail in accordance with the present disclosure.

FIG. 4 is an exploded perspective view of the tonneau assembly 12 including the rear rail 40, the side rails 44, and the front rail 82 in accordance with the present disclosure, with the sheet 42 omitted for clarity; FIG. 11 is a perspective view of the tonneau assembly 12, with the side rails 44 mounted to sides of the truck bed 14; FIG. 12 is a perspective view of a driver-side side rail 44, with side rail caps 45 removed; FIG. 13 is a perspective view of a passenger-side side rail 44, with side rail caps 45 removed; FIGS. 14 and 15 are perspective views of a cross section of the driver-side side rail 44 of FIG. 11; FIG. 16 is a perspective view of the tonneau assembly 12 mounted to the vehicle 10, with the tonneau assembly 12 in the fully closed position; FIGS. 26A-C are side views of a cross section of the rear rail 40 at various stages of operation; FIG. 38 is a perspective view of an underside of part of the tonneau assembly 12 in accordance with the present disclosure, including a surrounding seal 66; and FIG. 39 is a perspective view of a hinge section 56 of the side rail 44 in accordance with the present disclosure.

The exploded perspective view of the tonneau assembly 12 in FIG. 4 shows the rear rail 40, the front rail 82, and the support rods 83 in accordance with the present disclosure. In the embodiment of FIG. 4, the aforementioned components may each be attached to the sheet 42, however the sheet 42 has been omitted from FIG. 4 for clarity. As shown, the rear rail 40 and the front rail 82 can be oriented parallel to one another, defining rear and front ends of a sheet portion of the tonneau assembly 12. The support rods 83 are positioned between and can extend parallel to the rear rail 40 and the front rail 82, spanning approximately a length of both the rear rail 40 and the front rail 82. FIG. 4 also shows the side rails 44 and the corresponding side rail caps 45, as well as corner blocks 92.

FIG. 12 is a perspective view of a driver-side side rail 44, with side rail caps 45 removed. As shown in FIG. 12, the side rail 44 can extend longitudinally and include a rail section 57 connected to a hinge section 56. In the present embodiment, the rail section 57 can include four rail compartments 94 disposed consecutively along the length of the rail section 57, however the rail section 57 can have any other appropriate number of rail compartments 94 such as one, two, three, four, etc. The rail compartments 94 are defined by outer surfaces, whereby an upper compartment surface may have one or more compartment apertures 96 formed therein. The compartment aperture 96 provides access for securing an extender 110, which will be described below and shown in FIG. 8.

The side rails 44 include an inboard wall 60, an outboard wall 61 (that includes an upper wall or camming surface 74 and a lower wall or camming surface 76), a base 62, and an upper wall 63. The base 62 may include a protrusion 64 that extends into a chamber defined by at least the inboard wall 60, the base 62, and the upper wall 63. The protrusion 64 defines a recess on the side of the base 62 positioned opposite a side panel cover 100.

FIG. 11 is a perspective view of the tonneau assembly 12, with the side rails 44 mounted to sides of the truck bed 14. Specifically, FIG. 11 shows the side rails 44 mounted to sides of the truck bed 14 and the corner blocks 92 mounted to rear corners (D-pillars) of the truck bed 14, with other components of the tonneau assembly 12 such as the sheet 42, rear rail 40, and front rail 82 removed for clarity.

FIGS. 14 and 15 are perspective views of a cross section of the driver-side side rail 44 of FIG. 11. FIG. 14 in particular shows a cross-section of the side rail cap 45 covering the upper surface of the rail compartment 94 and thereby covering the compartment aperture 96, as well as an extender 110 and bolt 120 extending through interiors of the side of the truck bed 14 and the rail compartment 94. As shown in FIG. 14, the driver side of the truck bed 14 includes the side panel cover 100 and a bed liner 130 surrounding a bed frame 132. In the exemplary embodiment, the side panel cover 100 and the bed liner are comprised of a material that is less rigid than the bed frame 132. In a non-limiting example, the side panel cover 100 and the bed liner 130 can be plastic and the bed frame 132 can be metal or a metal alloy such as steel or aluminum, however the aforementioned components may also be formed of any other suitable material. Accordingly, the bed frame 132 is more rigid than the bed liner 130 and therefore the side rail 44 is mounted to the bed frame 132 via the extender 110, which is described below.

The extender 110 can be cylindrical in shape and has a screw extension end 112 configured to be screwed into a weld nut 122 attached to the bed frame 132. Adjacent the screw extension end 112 is a screw extension flange 114 having a greater diameter than that of the screw extension end 112. The screw extension flange 114 is configured to abut a surface of the bed frame 132 when the screw extension end 112 of the extender 110 is completely screwed into the weld nut 122. At an end of the extender 110 opposite the screw extension end 112 is a screw housing end 116, which extends through an extender aperture 126 in an upper portion of the bed liner 130 (and in the side panel cover 100). The screw housing end 116 can have a hollow threaded portion into which a bolt 120 is inserted to fasten a lower side of the rail compartment 94 to the extender 110. The bolt 120 is inserted through the lower side of the rail compartment 94, extending through a mounting aperture 124 (as shown in FIG. 15) and into the screw housing end 116 of the extender 110. The screw housing end 116 of the extender 110 abuts a bottom surface of the rail compartment 94 when the bolt 120 is screwed into the hollow threaded portion of the extender 110, thereby clamping a lower side of the rail compartment 94 on both top and bottom surfaces. Additionally, the screw housing end 116 can include a screw housing flange 118 having a greater diameter than other portions of the screw housing end 116 to provide more surface area to abut the bottom surface of the rail compartment 94.

The extender 110, in conjunction with the bolt 120, serve to attach the rail compartment 94 of the side rail 44 to the bed frame 132 of vehicle 10 while maintaining a gap 65 (best shown in FIG. 20) between the side rail 44 and the side panel cover 100 of the vehicle 10, the gap 65 to be filled by a seal 308 positioned between the base 62 and the side panel cover 100 outboard of the extender 110. The gap 65 between the bottom surface of the side rail 44 and the side panel cover 100 prohibits contact between those components. However, other structures may be used to achieve the aforementioned spaced attachment. Additionally, fixture devices other than screws and bolts may be used instead of the screw extension end 112 and bolt 120 including nails, clamps, adhesives, etc.

As shown in FIGS. 14 and 15, the screw housing end 116 is positioned in the recess of the base 62 on the opposite side of the protrusion 64. The recess helps to locate the screw end housing 116 and provides an even support surface. The bolt 120 is inserted through the mounting aperture 124 so that the head of the bolt 120 is positioned in the chamber defined by the inboard wall 60, the base 62, and the upper wall 63 with the protrusion 64 sandwiched between the head of the bolt 120 and the screw housing end 116. Positioning of the head of the fastener 120 within the chamber allows for the upper wall 63 (or side rail cap 45) to maintain an even surface for supporting the underside of the sheet 42 during use as well as during removal or deployment over the truck bed 14.

Similarly, FIG. 15 shows the cross-section of the side rail 44 mounted to the side of the truck bed 14 shown in FIG. 14, however in FIG. 15 the side rail cap 45 and the bolt 120 have been removed. As was previously described and shown in more detail in FIG. 15, the screw housing end 116 of the extender 110 is hollow and cylindrical, and the rail compartment 94 includes both the compartment aperture 96 and the mounting aperture 124 through which the bolt 120 is inserted. The compartment aperture 96 has a diameter larger than that of a head of the bolt 120, while the mounting aperture 124 has a diameter larger than that of a shaft of the bolt 120 and smaller than the diameter of the head. The diameters of the various apertures allow the entire bolt 120 to pass through the compartment aperture 96, while permitting only the shaft of the bolt 120 to pass through the mounting aperture 124. Consequently, the bolt 120 can be inserted into the rail compartment 94 to be screwed into the extender 110, thereby fastening the extender 110 to the bottom surface of the rail compartment 94.

FIG. 39 is a perspective view of a hinge section 56 of the side rail 44 in accordance with the present disclosure. The hinge section 56 includes a hinge part 55 into which a joint part 54 of the rear rail 40 is inserted so as to form a hinge, as shown in FIGS. 26A-C. The hinge section 56 and the rail section 57 are formed as separate sections of the side rail 44 because construction of the hinge part 55 must support repeated hinging resulting from operation of the tonneau assembly 12, and therefore has tolerance requirements differing from those of the rail section 57. The hinge part 55 is rearward-facing and configured to engage the joint part 54 along the transverse direction. The hinge section 56 also includes a seal block 53 around which the rear rail 40 extends in the closed position. The seal block 53 corresponds to a similarly shaped gap in the rear rail 40, so that upon closing the rear rail 40 the seal block 53 fits into the gap.

In the present embodiment, the hinge section 56 can also include a hinge mounting aperture 128 configured to overlap the corresponding mounting aperture 124 of the rearmost rail compartment 94 of the rail sections 57 when the rail section 57 and hinge section 56 are fitted together. Specifically, a front portion of the hinge section 56 that includes the hinge mounting aperture 128 is inserted into a rear portion of the rearmost rail compartment 94 of the rail section 57 such that the hinge mounting aperture 128 of the hinge section 56 aligns with the mounting aperture 124 of the rail compartment 94. The bolt 120 that is inserted through the mounting aperture 124 of the rail compartment 94 is therefore simultaneously inserted through the hinge mounting aperture 128 to secure the hinge section 56 to the bed frame 132 of the vehicle 10.

FIG. 38 is a perspective view of an underside of part of the tonneau assembly 12 in accordance with the present disclosure, including a surrounding seal 66. In FIG. 38, the tonneau assembly 12 is shown removed from the vehicle 10 such that undersides of parts of the rail section 57, the hinge section 56, and the rear rail 40 are shown. In addition, part of the surrounding seal 66 proximate the rear passenger side of the tonneau assembly 12 is shown, the surrounding seal 66 insulating the interior of the truck bed 14 when the tonneau assembly is in the closed position.

FIG. 16 is a perspective view of the tonneau assembly 12 mounted to the vehicle 10, with the tonneau assembly 12 in the fully closed position. Specifically, FIG. 16 shows the interaction of the support rods 83 of the tonneau assembly 12 with the side rails 44 when the tonneau assembly 12 is in the closed position. As shown in greater detail in FIGS. 28-30, the support rods 83 are disposed in gaps between rail compartments 94 so as not to protrude above the top surfaces of the rail compartments 94 and interfere with the disposition of the sheet 42 in the closed position. In other words, this configuration of the support rods 83 allows the sheet 42 to remain flat and edges of the sheet to lay flush with surrounding structures such as the side rails 44.

III. Rear Rail Operation

FIGS. 26A-C are side views of a cross section of the rear rail 40 at various stages of operation. FIG. 26A shows the rear rail 40 in an opened position; FIG. 26B shows the rear rail 40 in an intermediate position; and FIG. 26C shows the rear rail 40 in a fully closed position.

As shown in FIGS. 26A-C, pivoting the rear rail 40 upward to expose a rear portion of the truck bed 14 (not shown) also lifts the sheet 42 upward by virtue of its attachment to the rear rail 40. Contrarily, pivoting the rear rail 40 downwardly to the closed position lowers the sheet 42 to fully cover the truck bed 14.

In the present embodiment, a joint part 54 of the rear rail 40 is formed to project at a front end of each side of the rear rail 40. A corresponding hinge part 55 is formed to project from rear ends of each of the hinge sections 56 of the side rails 44. The joint and hinge parts 54 and 55 are formed to cooperate to enable rotation of the rear rail 40 relative to the side rails 44, if they are attached. However, the joint and hinge parts 54 and 55 are formed to be detached from one another to enable the rear rail 40 to be detachable from the side rails 44. For example, FIG. 3 shows the rear rail 40 as detached from the side rails 44 to enable the sheet 42 to be rolled up and the tonneau assembly 12 to be put into the fully opened position.

As previously described, the seal block 53 of the hinge section 56 is configured to fit within the gap between the rear end of the rear rail 40 and the joint part 54 when the rear rail 40 is in the closed position. Conversely, a portion of the rear rail 40 adjacent the joint part 54 is configured to fit within another gap between the seal block 53 and the hinge part 55 of the side rail 44 when the rear rail 40 is in the closed position. Fitment within these gaps serves to provide a seal for a rear portion of the truck bed 14 at the rear rail 40. Additionally, a rear seal 306 can be attached or otherwise disposed at a lower surface at the rear end of the rear rail 40. The rear seal 306 provides a seal between the lower surface of the rear rail 40 and an upper surface of the tail gate 34 (not shown) of the vehicle 10. The rear seal 306 may be beneficial by impeding or preventing entry of water, debris, dirt, etc. from entering truck bed 14 when the sheet 42 covers the truck bed 14.

However, embodiments are intended to include or otherwise cover other types of seal members and/or seal locations. It is intended that any seal member can be provided at any seal location that may be beneficial. Contrarily, some embodiments may not include any seal members.

IV. Operation

The operation of the exemplary structures disclosed in the preceding sections is discussed below.

A. Side Rail Mounting

To mount the side rails 44 to the sides of the truck bed 14, extender caps (not shown) are first removed from the extender apertures 126. The extender caps may be popped off, screwed off, pulled out, etc.

Next, the extenders 110 are inserted through the now revealed extender apertures 126 in the side panel cover 100 and screwed into the weld nuts 122 attached to the bed frame 132. The extenders 110 may be attached to the bed frame 132 by any appropriate method or fixture so long as the screw extension flange 114 of each extender 110 abuts the bed frame 132 when the extenders 110 are completely attached. The screw extension flanges 114 set a height to which the extenders 110 protrude above the side panel cover 100. This height above the side panel cover 100 ensures that the gap 65 will be present between the side panel cover 100 and the side rail 44 upon attachment. The gap 65 may be at least partially filled by the rail seal 308 which will be described below, the rail seal extending approximately the length of the side rail 44.

Following insertion and attachment of the extenders 110, the hinge sections 56 of the side rails 44 are brought into contact with rear ends of the rail sections 57 so that the hinge mounting apertures 128 overlap the corresponding rearmost mounting apertures 124 of the rail sections 57 of the side rails 44. Subsequently, the side rails 44 in their entirety, including the hinge and rail sections 56, 57) are laid overtop the side panels 36 so that the mounting apertures 124 of the rail compartments 94 align with the corresponding extenders 110. Alternatively, the hinge sections 56 may be brought into contact with the rail sections 57 after the rail sections 57 have already been laid overtop the side panels 36.

Once the mounting apertures 124 are aligned with the extenders 110, the bolts 120 are inserted through the compartment apertures 96 and into the rail compartments 94 of the side rails 44. The shafts of the bolts 120 are then inserted through the mounting apertures 124 and into the screw housing ends 116 of the corresponding extenders 110, wherein the shafts of the bolts 120 are screwed into the screw housing ends 116.

After screwing the bolts 120 into the screw housing ends 116 of the extenders 110, the side rail caps 45 are placed overtop the rail compartments 94 to cover the compartment apertures 96. The side rails 44 are thereby mounted to the truck bed 14 via the extenders 100, the weld nuts 122, and the bolts 120 such that structural integrity of the side rails 44, the side panels 36, and the side panel covers 100 is preserved.

B. Rear Rail Closing

The joint parts 54 of the rear rail 40 are placed in engagement with the respective hinge parts 55 of the side rails 44. The rear rail 40 is then rotated downwardly from the orientation shown in FIG. 13A to the fully closed position shown in FIG. 13C. This fully closed position of the rear rail 40 applies tension in the sheet 42. The motion is reversed to open the rear rail 40 and relieve tension in the sheet 42.

V. Support Rod Assemblies and Fitment

As previously described, FIG. 4 is an exploded perspective view of the tonneau assembly 12 including the rear rail 40, the side rails 44, and the front rail 82 in accordance with the present disclosure, with the sheet 42 omitted for clarity. The tonneau assembly 12 shown in FIG. 4 also includes support rods 83 inserted through sheet pockets 43 extending parallel to the rear rail 40 and the front rail 82, and disposed therebetween. In the present embodiment, the tonneau assembly 12 includes three sets of the support rods 83 and the corresponding sheet pockets 43, however any appropriate number of sets of support rods and sheet pockets may be included such as none, one, two, three, four, etc.

The support rods 83 can extend approximately a length of the rear rail 40 and the front rail 82, and can be spaced from one another so as to align with recessed portions 160 in the side rails 44, which will be described in more detail below. The sheet pockets 43 can be attached to a bottom side of the sheet 42 by stitching, or by any other appropriate manner, such as glue, epoxy, etc. As shown in FIG. 4, the sheet pockets 43 do not extend an entire length of the support rods 83, such that each sheet pocket 43 terminates before respective ends of the corresponding support rod 83. Fitment of the ends of the support rods 83 within the recessed portions 160 in the side rails 44 is therefore uninhibited by the sheet pockets 43, as will be described below. However, the sheet pockets 43 may alternatively extend the length of or beyond the length of the corresponding support rods 83.

In the present embodiment, the support rods 83 serve to provide support and structure to the sheet 42 of the tonneau assembly 12 insofar as preventing sagging or rising of the sheet 42. As discussed above, other structures may alternatively be used to provide structure for the sheet 42. The recessed portions 160 in the side rails 44 into which the ends of the support rods 83 are inserted will be described in more detail below in regard to FIG. 13.

FIG. 13 is a perspective view of the passenger-side side rail 44 in accordance with the present disclosure, with the side rail caps 45 removed. As described above and shown in FIG. 13, the side rail 44 can include three recessed portions 160, or may alternatively include any appropriate number of recessed portions 160 corresponding to the number of support rods 83 included in the tonneau assembly 12, such as none, one, two, three, four, etc. The recessed portions 160 can be integrally formed in the side rail (or sections cut out of the side rail 44), or may be comprised of a separate body formed of a less rigid material such as a plastic, or any other appropriate material to prevent tears in the sheet 42 upon contact. In a non-limiting example, the recessed portion 160 is a plastic body that is inserted into an opening that has been removed from the side rail 44.

In the present embodiment, the recessed portions 160 is a plastic body that is secured in gaps between the rail compartments 94 of the side rail 44, the recessed portions 160 having a base 157 disposed below the upper surfaces of the rail compartments 94. Because the base 157 of the recessed portions 160 is disposed below those of the rail compartments 94, the recessed portions 160 are configured to accept the ends of the support rods 83 completely, such that top portions of the ends do not protrude above the upper surfaces of the rail compartments 94 when inserted into the recessed portions 160. In other words, a depth of the base 157 is greater than a diameter of the ends of the support rods 83 so that when the support rods 83 are inserted into the recessed portions 160, the ends of the support rods 83 do not extend above and out of the recessed portions 160. This configuration allows the sheet 42 to remain flat and uniform across upper surfaces of the side rails 44 when covering the truck bed 14, even at portions of the sheet 42 at which the support rods 83 are disposed.

Figure 5:
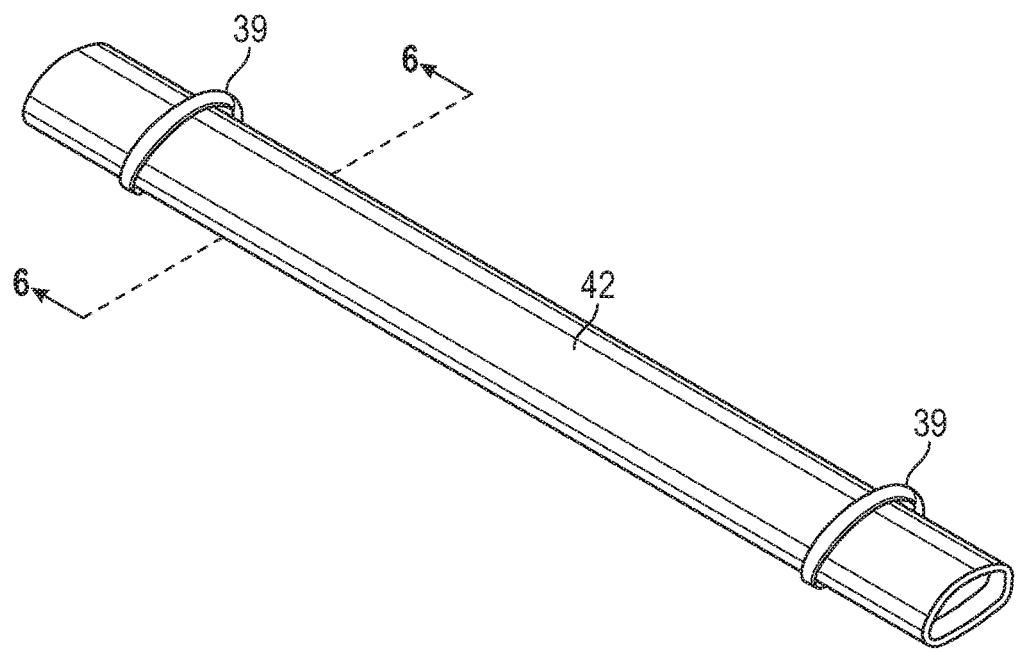
FIG. 5 is a perspective view of the sheet of the tonneau assembly in accordance with the present disclosure, with the sheet rolled up and in a fully opened or storage position.
Figure 28:
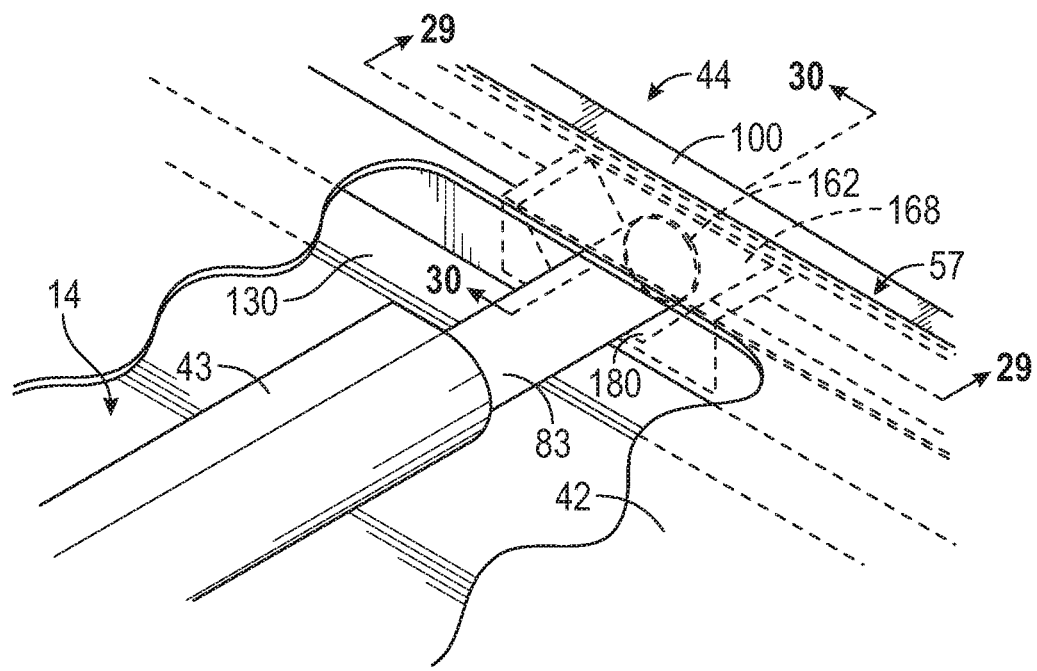
FIG. 28 is a perspective view of a recessed portion of FIG. 16 including an end of the supporting rod and a part of the side rail, with the end of the supporting rod inserted into the recessed portion.
Figure 29:
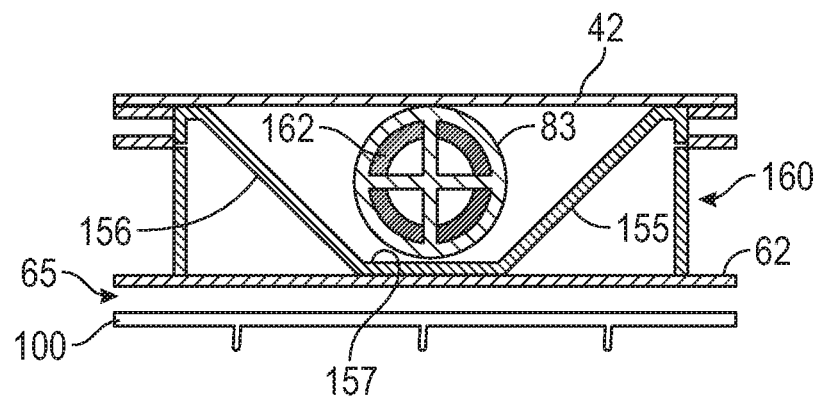
FIG. 29 is a side view of a cross section of the recessed portion of FIG. 28, with the end of the support rod inserted therein.

As shown in more detail in FIGS. 28 and 29, the recessed portions 160 of FIG. 5 are approximately U-shaped and defined by the base 157 adjacent two planar sloping side walls 155 and 156. The sloping side walls 155, 157 automatically guide the support rods 83 into and out of engagement with the base 157 as the sheet 42 is opened and closed. However, other configurations of recessed portions 160 may be used, such as inwardly curved or rectangular cut-outs in the side rails 44. In the present embodiment, the U-shaped recessed portions 160 are plastic, however other materials can be used.

FIG. 16 is a perspective view of the tonneau assembly 12 in accordance with the present disclosure, with the tonneau assembly 12 mounted to the vehicle 10 and in a fully closed position. As shown in FIG. 16, when the tonneau assembly 12 is mounted to the vehicle 10 and in the fully closed position, locations of the support rods 83 coincide with locations of the recessed portions 160 such that the support rods 83 are inserted into the coinciding recessed portions 160. As shown in FIG. 16, the support rods 83 are inserted into the recessed portions 160 when the rear rail 40 is in the fully closed position, thereby pulling the sheet 42 to lie flat across the truck bed 14 and the surrounding side rails 44.

FIG. 28 is a perspective view of a recessed portion 160 of FIG. 16 including an end of the supporting rod 83 and a part of the side rail 44, with the end of the supporting rod 83 disposed within the recessed portion 160. As described above, the recessed portion 160 is configured to accept the end of the support rod 83 entirely, thereby preventing the top portion of the end of the support rod 83 from disrupting the sheet 42 when laid overtop the truck bed 14.

FIG. 29 is a side view of a cross section of the recessed portion 160 of FIG. 28, with the end of the support rod 83 disposed therein. As described above and shown in more detail in FIG. 29, the depth of the recessed portion 160 in the present embodiment is greater than the diameter of the end of the support rod 83. The end of the support rod 83 therefore resides entirely within the recessed portion 160 such that the top portion of the support rod 83 does not disrupt the sheet 42. As shown in more detail in FIG. 30 and described below, the support rods 83 can include end caps 162 which cover the ends of the support rods 83.

Figure 30:
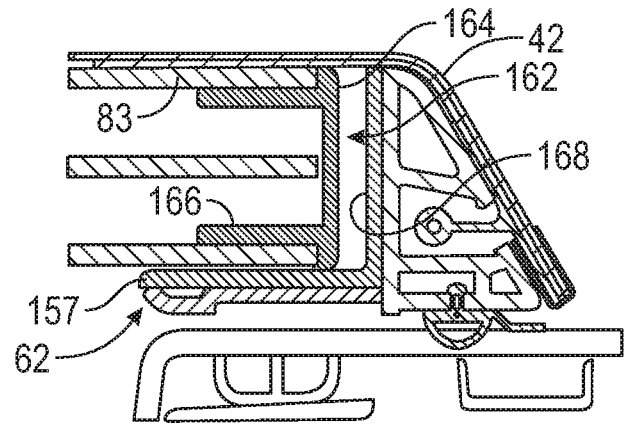
FIG. 30 is a side view of a cross section of the recessed portion of FIG. 28, with the end of the support rod including an end cap.

FIG. 30 is a side view of a cross section of the recessed portion 160 of FIG. 28, with the end of the support rod 83 including an end cap 162. As shown in FIG. 30, the end cap 162 can include a cap face 164 joined to a cap base 166, the cap base 166 being inserted into a hollow portion of the end of the support rod 83 so that a rear surface of the cap face 164 abuts the end of the support rod 83. Consequently, the end cap 162 is also inserted into the recessed portion 160 upon placement of the end of the support rod 83 therein. The cap face 164 may be planar, convex or concave (semi-spherical). In some embodiments, the end cap 162 may be spring biased such that an elastic member urges the end cap 162 towards a back wall 168 of the recessed portion 160. In other words, the elastic member urges the end cap 162 axially outward into the recessed portions 160. The elastic member can be a spring such as a coil spring, a grommet, or any other appropriate structure capable of urging the end cap 162 towards the back wall 168.

Upon insertion of the end of the support rod 83, and accordingly, placement of the end cap 162, within the recessed portion 160, the end cap 162 abuts and exerts a force against the back wall 168 of the recessed portion 160 by virtue of the elastic member. This force keeps the end of the support rod 83 within the recessed portion 160, while still permitting the end of the support rod 83 to be removed from the recessed portion 160 by application of a perpendicular upward force on the support rod 83.

VI. Spring-Biased Carriage and Cable

A. Spring-Biased Carriages

Figure 17:
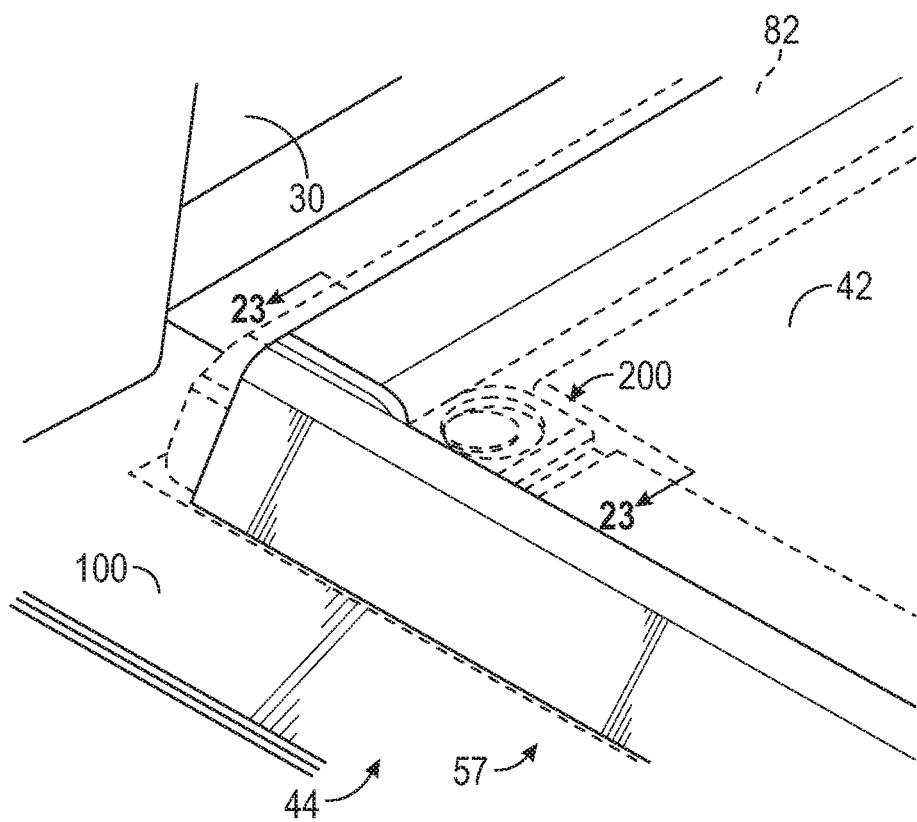
FIG. 17 is a perspective view of a carriage assembly of the driver-side side rail of FIG. 16, with the carriage assembly engaged with the front rail.
Figure 18:
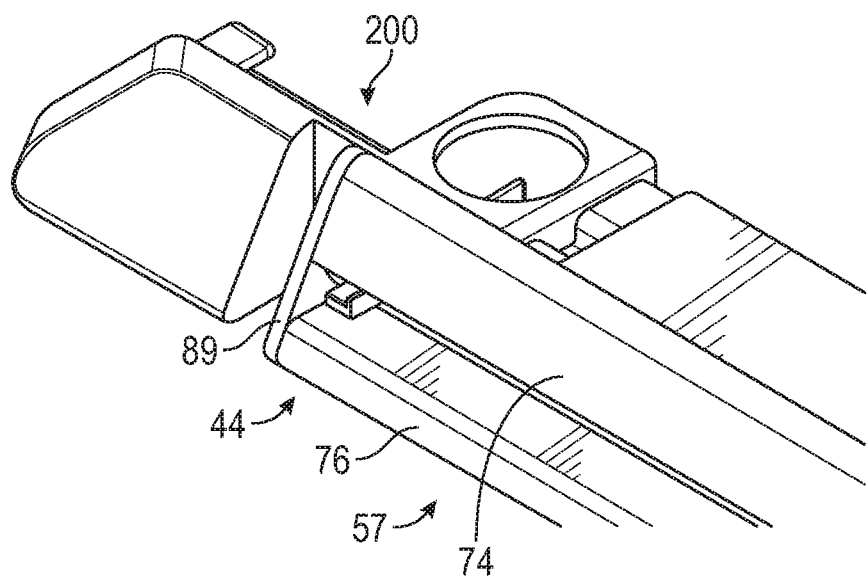
FIG. 18 is a perspective view of a carriage assembly of the driver-side side rail of FIG. 16, with the carriage assembly disengaged from the front rail.

FIG. 17 is a perspective view of a carriage assembly 200 of the driver-side side rail 44 of FIG. 16, with the carriage assembly 200 engaged with the front rail 82, while FIG. 18 is a perspective view of a carriage assembly 200 of the driver-side side rail 44 of FIG. 16, with the carriage assembly 200 disengaged from the front rail 82. As will be described below, the side rail 44 includes the carriage assembly 200 disposed at the front end of the rail section 57 of the side rail 44, the carriage assembly 200 being slideably engaged with the rail section 57. In the present embodiment, the carriage assembly 200 is spring-biased and configured to slide longitudinally along the rail section 57 of the side rail 44 as a result of tension on the sheet 42.

Figure 21:
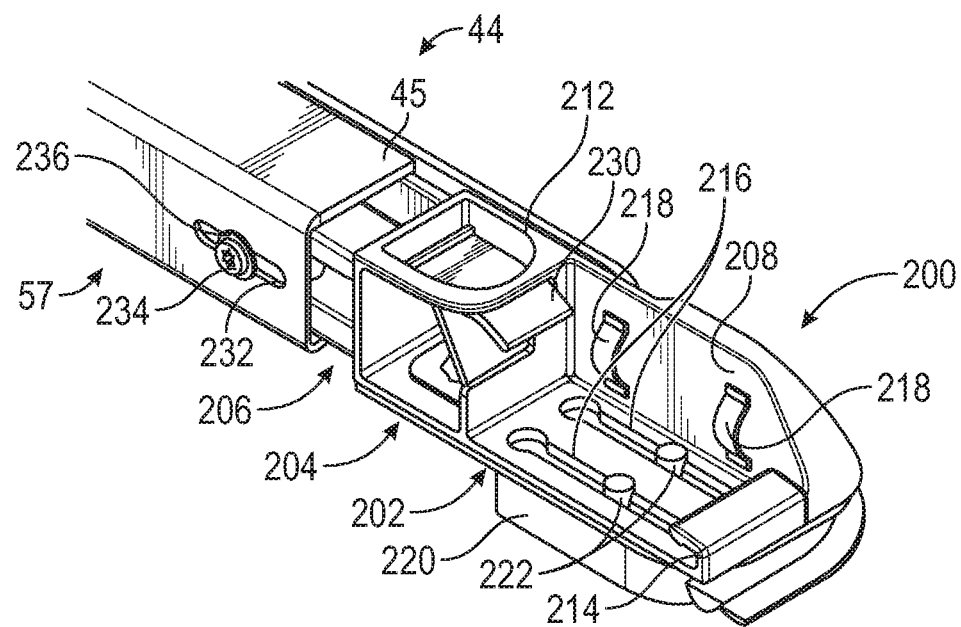
FIG. 21 is a perspective view of the carriage assembly of the driver-side side rail, with the carriage assembly disengaged from the front rail.

FIG. 21 is a perspective view of the carriage assembly 200 in accordance with the present disclosure, with an end of the front rail 82 (not shown) disengaged from the carriage assembly 200. The carriage assembly 200 includes a front portion 202, an intermediate portion 204, and a rear portion 206 formed continuously. The rear portion 206 of the carriage assembly 200 is configured to be inserted and slidable within the front end of the rail section 57. In the present embodiment, the rear portion 206 includes a pair of bolts 234 inserted through corresponding slots 232 in opposing sides of the rail section 57. The bolts 234 are configured to move longitudinally within the slots 232 to facilitate sliding movement of the rear portion 206 of the carriage assembly 200 within the rail section 57. The bolts 234 can be inserted through washers 236, and other types of fasteners such as screws, pints, tabs, etc. may alternatively be used to secure the rear portion 206 of the carriage assembly 200 within the rail section 57, and facilitate its sliding movement. As described in more detail and shown in FIGS. 23 and 24, the rear portion 206 includes a carriage spring 240 that abuts an interior surface of the rail section 57 to spring-bias the carriage assembly 200 in a longitudinal direction away from the rear rail 40.

The carriage assembly 200 also includes the intermediate portion 204 disposed adjacent and to the front of the rear portion 206. The intermediate portion 204 can include a release mechanism 230 disposed within an interior of the intermediate portion 204, the release mechanism 230 being accessible through a release aperture 212 in a top side of the intermediate portion 204. Specifically, the release mechanism 230 can be connected to a bottom side of the intermediate portion 204. As will be described in more detail and shown in FIGS. 25A-C, the release mechanism 230 can be a resilient member configured to deform to thereby engage and disengage the front rail 82 (not shown) to secure the front rail 82 within the carriage assembly 200. In the present embodiment, the release mechanism 230 is approximately Z-shaped, however other embodiments may include an alternatively configured release mechanism.

The carriage assembly 200 further includes the front portion 202 disposed adjacent and to the front of the intermediate portion 204. The front portion 202 can include a locking slot 214 at a front edge of the front portion 202, the locking slot 214 configured to engage a complementary locking protrusion 242 of the front end of the front rail 82 (not shown). The locking slot 214 can be approximately U-shaped, or may be alternatively configured to complement and engage the locking protrusion 242. The front portion 202 can also include a pair of spring plates 218 on a carriage side wall 208, the spring plates 218 configured to abut and exert a pressing force against an end face of the front rail 82. The spring plates 218 may be alternatively configured as coil springs or other elastic members. Additionally, the front portion 202 can include a pair of seal slots 216 disposed in a bottom side of the front portion 202, the seal slots 216 configured to receive a corresponding pair of seal protrusions 222. The seal protrusions 222 extend from a front corner seal 220 disposed adjacent an underside of the front portion 202, and can be inserted within the seal slots 216 so as to be slideably engaged.

Figure 22:
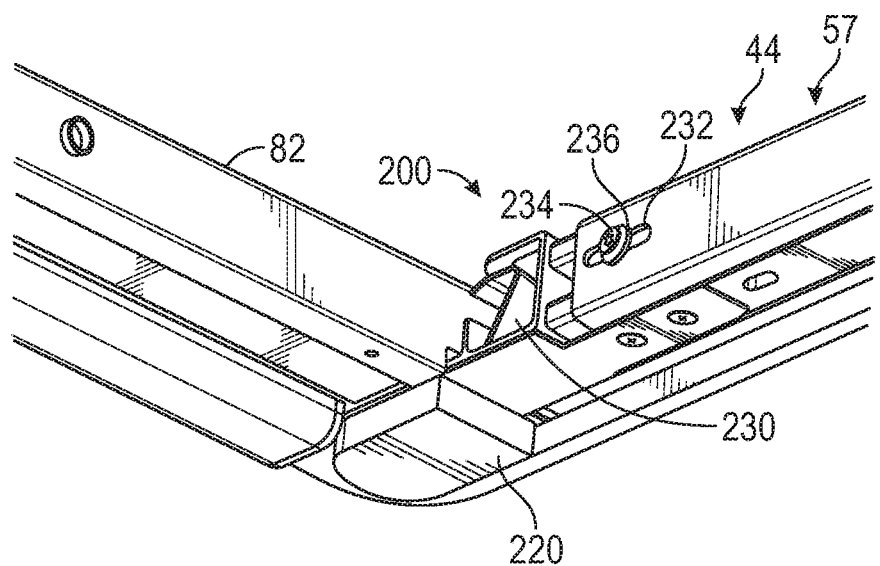
FIG. 22 is a perspective view of an underside of the carriage assembly of the passenger-side side rail, with the carriage assembly engaged with the front rail.

FIG. 22 is a perspective view of an underside of the carriage assembly 200 of the passenger-side side rail 44, with the carriage assembly 200 engaged with the front rail 82.

Figure 23:
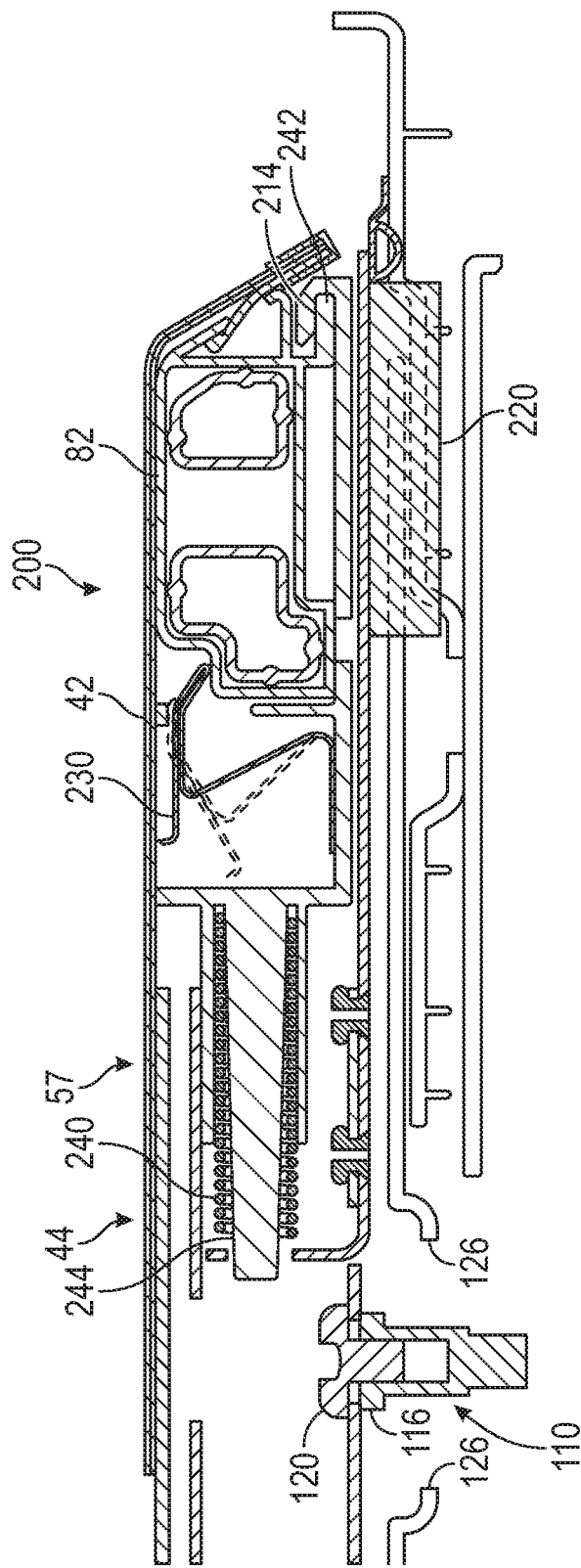
FIG. 23 is a side view of a cross section of the carriage assembly of FIG. 17, with the carriage assembly in an extended state.
Figure 24:
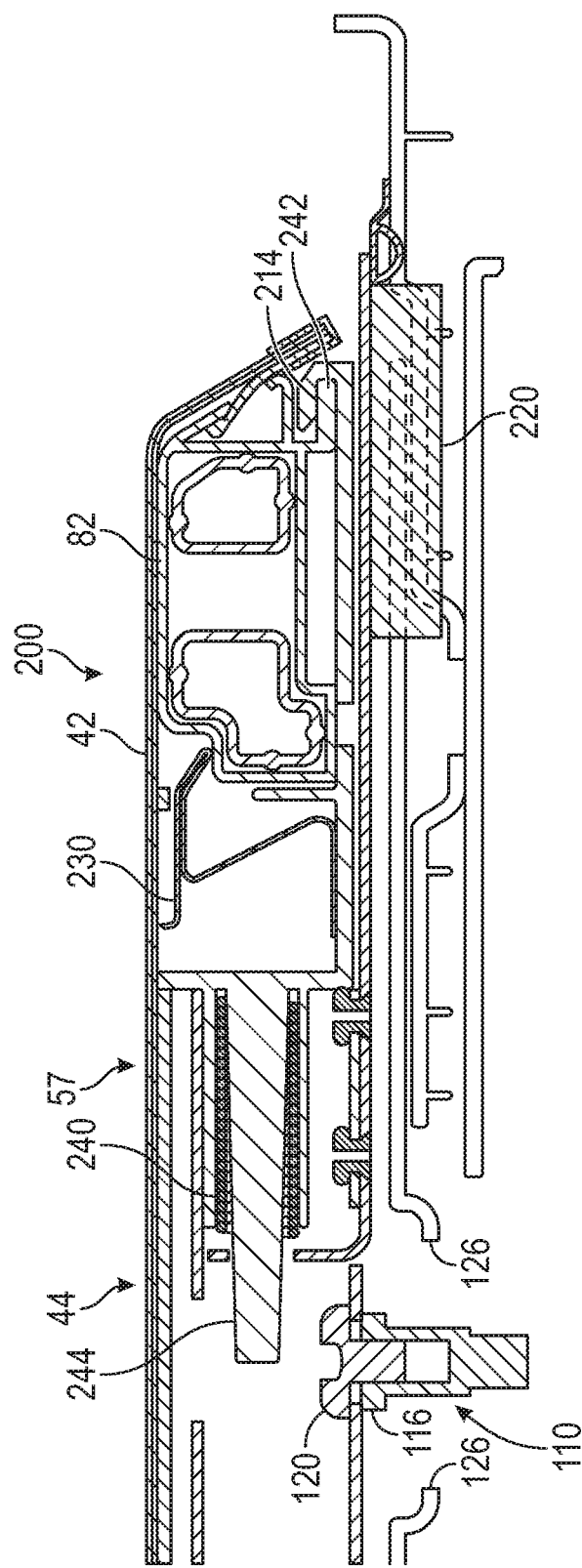
FIG. 24 is a side view of a cross section of the carriage assembly of FIG. 23, with the carriage assembly in a compressed state.

FIGS. 23 and 24 are side views of a cross section of the carriage assembly 200 of FIG. 17, with the front rail 82 shown engaged with the carriage assembly 200. The carriage spring 240 of the carriage assembly 200 is biased to abut and press against the front rail 82 so as to secure the front rail 82 in place. As described above, the carriage spring 240 abuts an interior surface of the rail section 57 of the side rail 44 at one end, while an opposing end of the carriage spring 240 abuts a facing side of the carriage assembly 200. Additionally, the carriage spring 240 can be mounted around a spring mount 244.

Particularly, FIG. 23 is a side view of the cross section of the carriage assembly 200 when the carriage spring 240 is in an expanded state, urging the carriage assembly 200 and connected front rail 82 to be disposed at a first position. The expanded state of the carriage spring 240 and the first position of both the carriage assembly 200 and the front rail 82 occurs when the rear rail 40 is in the opened position, which relieves tension in the sheet 42 and therefore allows the front rail 82 to slide away from the rear end of the vehicle 10 by virtue of the carriage spring 240, thereby maintaining tension in the sheet 42.

Shown in dashed lines in FIG. 23, the release mechanism 230 is configured to hingedly deform to a depressed position as a result of force administered downward via the release aperture 212 (not shown) onto a top portion of the release mechanism 230. As can be seen in FIG. 23, this force deforms the release mechanism 230 so that it no longer contacts the front rail 82, thereby no longer securing the front rail 82 in place and permitting removal of the front rail 82 from the carriage assembly 200. In other words, the pressing force on the release mechanism 230 allows release of the front rail 82 from the carriage assembly 200, otherwise the spring-biased release mechanism 230 will continue to secure the front rail 82 within the carriage assembly 200.

Contrarily, FIG. 24 is a side view of the cross section of the carriage assembly 200 when the carriage spring 240 is in a compressed state, permitting the carriage assembly 200 and the engaged front rail 82 to be disposed at a second position closer towards the rear rail 40 than the first position. The compressed state of the carriage spring 240 and the second position of the carriage assembly 200 and the front rail 82 occur when the rear rail 40 is in the closed position, which increases tension in the sheet 42 and urges the front rail 82 towards the rear end of the vehicle 10, thereby compressing the carriage spring 240.

The carriage spring 240 serves to maintain adequate tension in the sheet 42 throughout opening and closing operations of the rear rail 40. However, other components and configurations may be used to achieve desirable tension in the sheet 42.

Figure 25A:
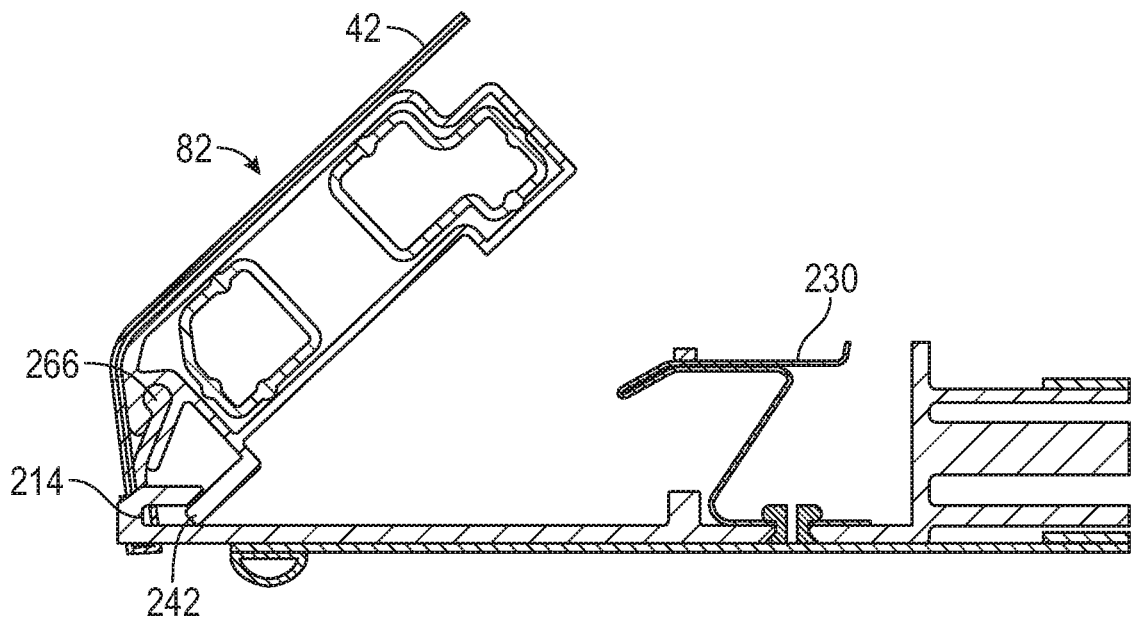
FIGS. 25A-C are side views of a cross section of the carriage assembly of FIG. 23 at various stages of engagement with the front rail.
Figure 25B:
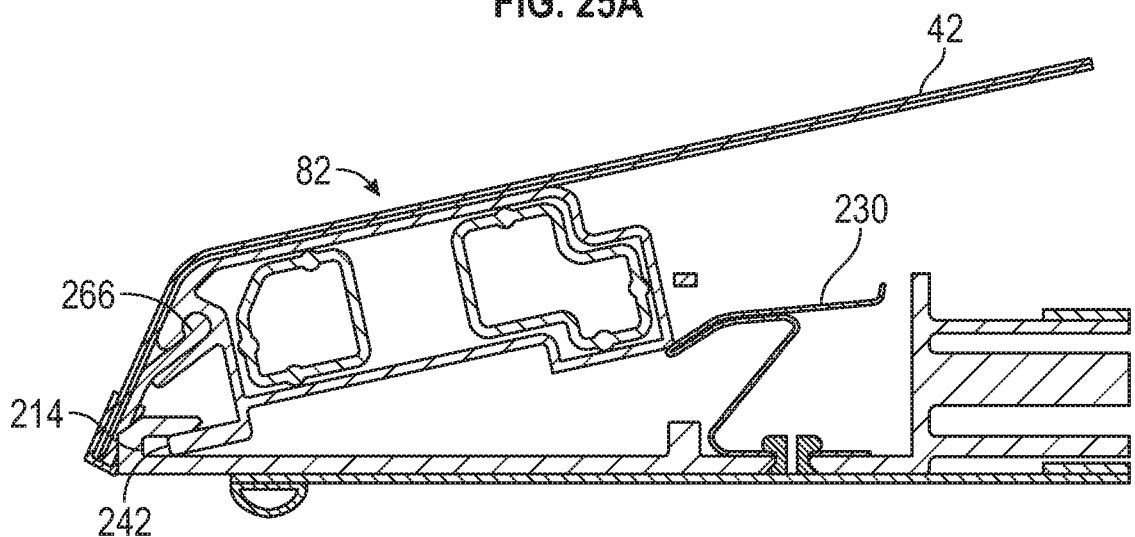
Figure 25C:
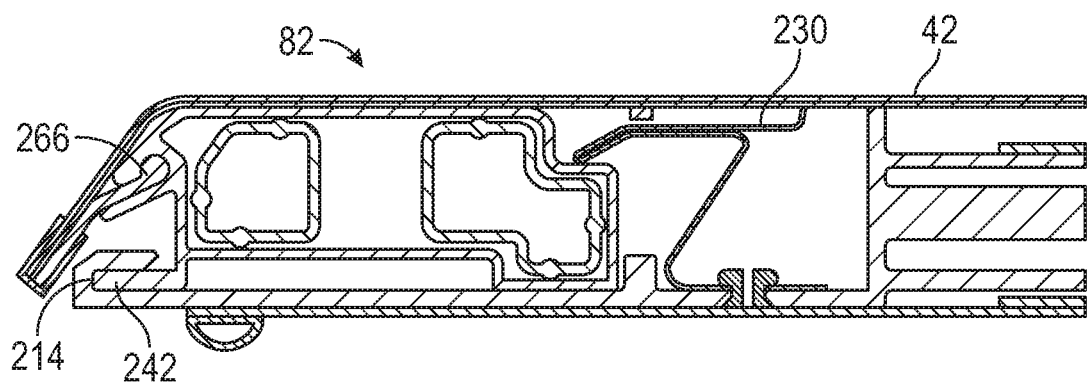

FIGS. 25A-C are side views of a cross section of the carriage assembly 200 of FIG. 23 at various stages of engagement with the front rail 82.

Specifically, FIG. 25A shows an initial step of operation in which the front end of the front rail 82 is inserted into the carriage assembly 200. In this embodiment, the locking protrusion 242 of the front rail 82 is inserted into the locking slot 214 of the carriage assembly 200.

In FIG. 25B, an intermediate step of operation shows the locking protrusion 242 is further inserted into the locking slot 214 while the front rail 82 is rotated about the locking protrusion 242 and downward towards the bottom side of the carriage assembly 200. Additionally, the front rail 82 contacts a front portion of the release mechanism 230 and begins to deform the release mechanism 230.

FIG. 25C shows the locking protrusion 242 fully inserted into the locking slot 214, and the front rail 82 fully rotated downward and into the carriage assembly 200. The release mechanism 230 is no longer deformed and engages a depressed portion of the front rail 82.

B. Side Tensioning Cables

FIG. 18 is a perspective view of the carriage assembly 200 in an extended state in accordance with the present disclosure, with a part of the side rail 44 having an upper camming surface 74 and a lower camming surface 76 spaced apart by a gap in which a cable 50 is disposed, as described in more detail below and shown in FIG. 19. As will be described, the cable 50 is connected to a front end of the rail section 57 of the side rail 44 at one end, and connected to the rear rail 40 at an opposite end. The cable 50 and the gap in which it is disposed therefore extend approximately a length of the rail section 57 of the side rail 44. The upper and lower camming surfaces 74, 76 are disposed on outward-facing portions of the side rails 44, and extend a length of the rail section 57 of each side rail 44.

Figure 19:
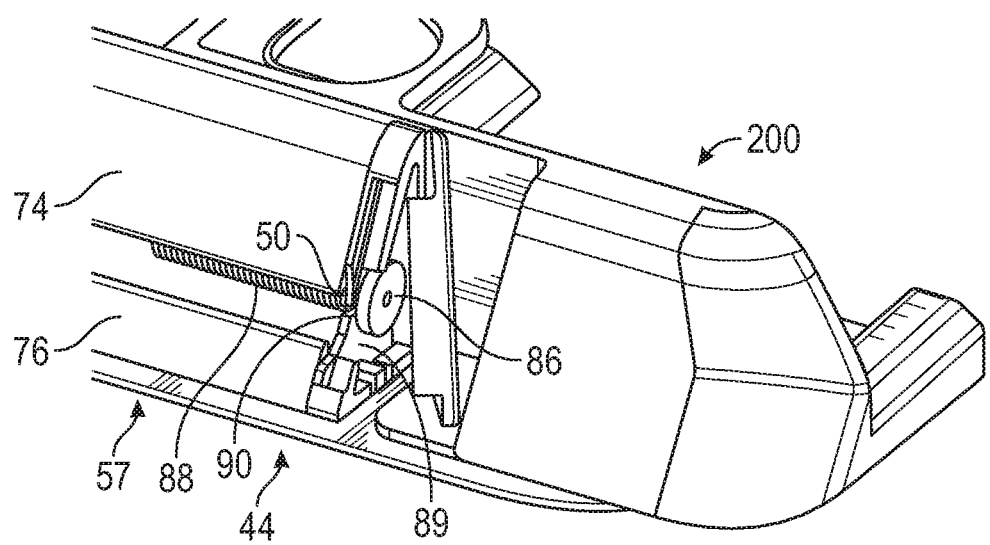
FIG. 19 is a perspective view of the carriage assembly of the passenger-side side rail, with the carriage assembly disengaged from the front rail.

FIG. 19 is a perspective view of part of the side rail 44, with the sheet 42 omitted for clarity, in accordance with the present disclosure, with the side rail 44 having upper and lower camming surfaces 74, 76 and the cable 50 disposed therebetween. As seen in FIG. 19, the upper camming surface 74 is wider in a vertical direction than the lower camming surface 76, however other embodiments may be configured such that the upper and lower camming surfaces 74, 76 are equal in vertical width, or so that the lower camming surface 76 is wider. Abutting a front end of the rail section 57 and thereby abutting front portions of the upper and lower camming surfaces 74, 76 is a cable plate 89, the cable plate 89 covering the front end of the rail section 57. The cable plate 89 has a cable aperture 90 aligned with the gap by which the upper and lower camming surfaces 74, 76 are spaced apart. A front end of the cable 50 extends through the cable aperture 90 and is affixed to a front surface of the cable plate 89 by any appropriate fixture means. Consequently, the front end of the cable 50 may include a cable stopper 86 having a diameter greater than that of the cable 50 to secure the cable 50 to the cable plate 89 at the cable aperture 90.

Additionally, the cable 50 can have a cable spring 88 encircling a front portion of the cable 50, the cable spring 88 disposed to abut against a rear surface of the cable plate 89 and configured to spring-bias the front end of the cable 50 away from the rear end of the cable 50 connected to the rear rail 40 (not shown). The cable 50, and cable spring 88 serve to provide tension at sides of the sheet 42 upon closing of the rear rail 40. As described below, the sides of the sheet 42 are secured along the upper and lower camming surfaces 74, 76 of the side rails 44 by the cables 50 extending along the gaps therebetween.

Figure 20:
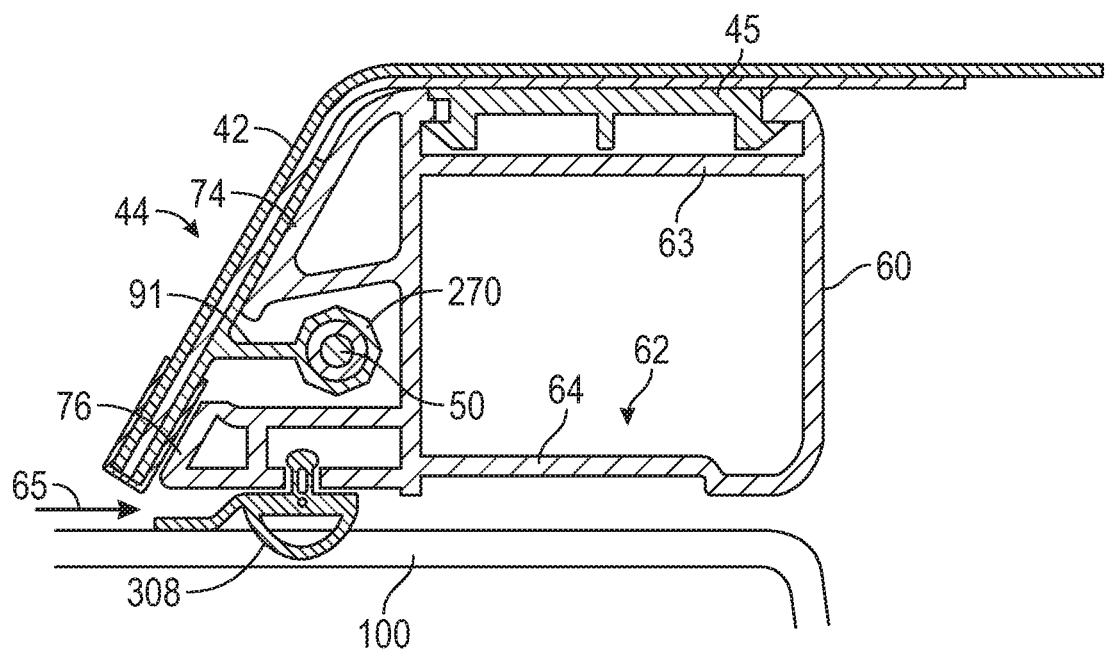
FIG. 20 is a side view of a cross section of the driver-side side rail of FIG. 16, with a side portion of the sheet engaged with the side rail.

FIG. 20 is a side view of a cross section of the driver-side side rail 44 of FIG. 16, with a side portion of the sheet 42 engaged with the side rail 44. In FIG. 20, the sheet 42 is shown attached to the cable 50 and wrapped around the camming surfaces 74, 76 by virtue of engagement of the cables 50 with the gap between the camming surfaces 74, 76. The cable 50 is attached to the sheet 42 by a cable mount 91 that extends transversely from an underside of an edge portion of the sheet 42, such that the cable mount 91 is configured to be inserted within the gap between the camming surfaces 74, 76 upon closing of the rear rail 40. The cable mount 91 serves to secure the cable 50 within the gap between the camming surfaces 74, 76 during movement of the vehicle 10.

FIGS. 26A-C are side views of a cross section of the rear rail 40 at various stages of operation, with the rear rail 40 shown in transition between opened and fully closed positions. As described above, as the rear rail 40 is moved from the opened position, such as that shown in FIG. 26A, to the closed position, such as that shown in FIG. 26C, the sides of the sheet 42 fold down over respective side surfaces of the side rails 44, thereby engaging the cables 50 with the corresponding gaps in the side surfaces of the side rails 44. Contrarily, upon transitioning the rear rail 40 from the fully closed position to the opened position, the sides of the sheet 42 unfold away from the respective side surfaces of the side rails 44, thereby disengaging the cables 50 from the corresponding gaps in the side surfaces of the side rails 44. In other words, the engagement between the cables 50 of the sheet 42 and the side rails 44 is a function of the disposition of the rear rail 40.

Figure 27A:
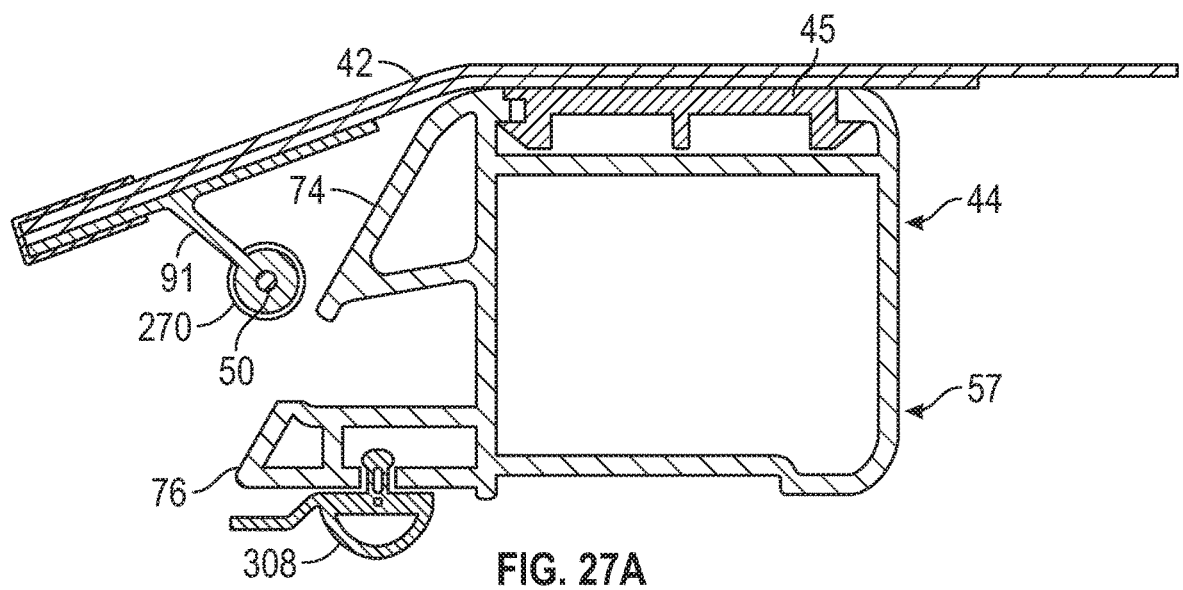
FIGS. 27A-C are side views of a cross section of the side rail of FIG. 20 at various stages of engagement with the side portion of the sheet.
Figure 27B:
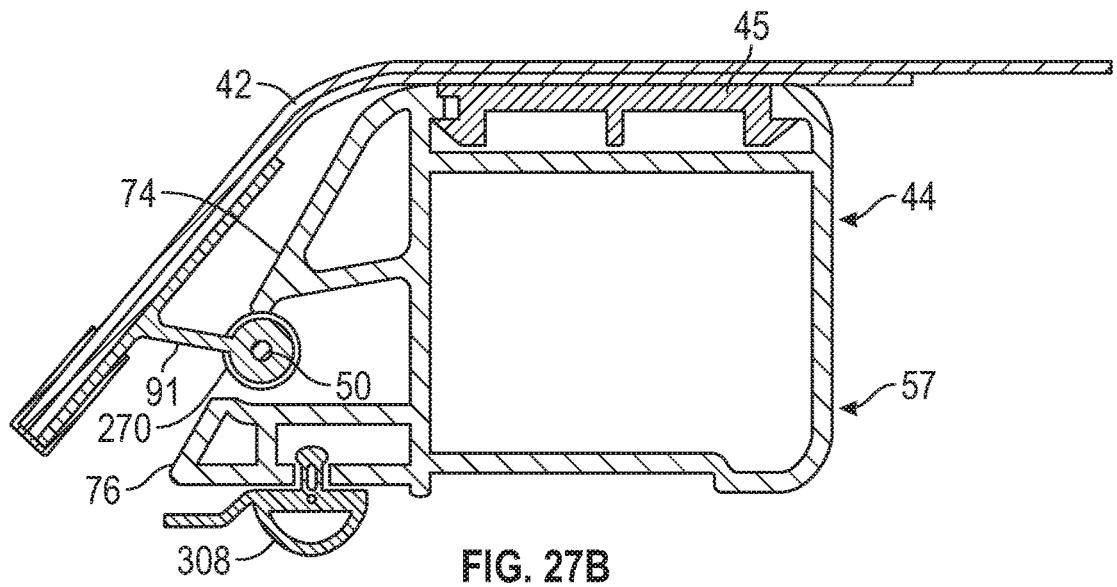
Figure 27C:
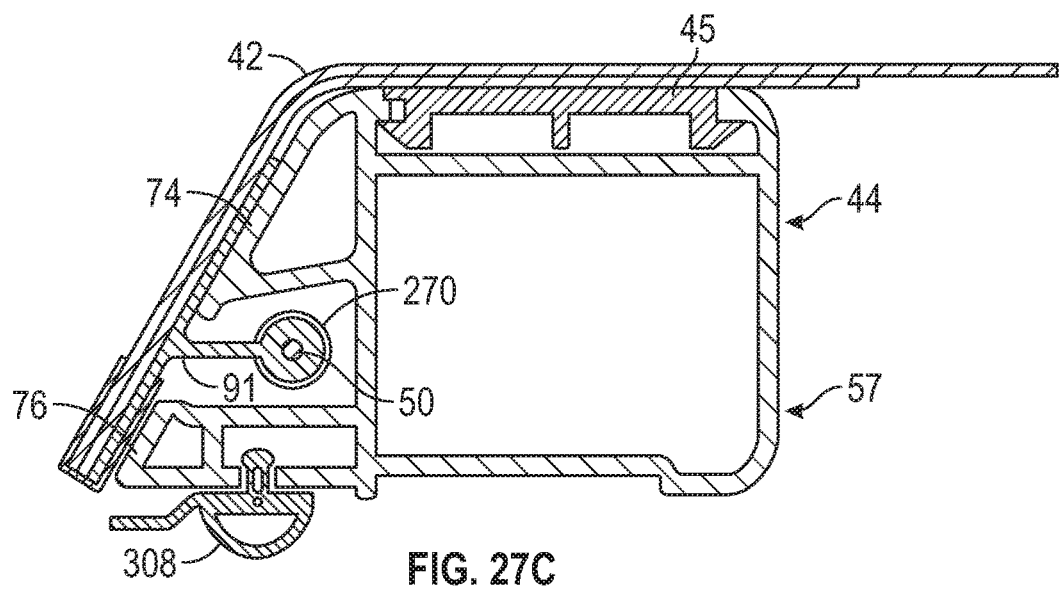

FIGS. 27A-C are side views of a cross section of the side rail 44 of FIG. 20 at various stages of engagement with the side portion of the sheet 42. FIGS. 27A-C particularly show the aforementioned engagement operation between the cable 50 and the gap in the side rail 44 associated with opening and closing the rear rail 40.

VII. Tonneau Sheet Structure and Operation

As described above, FIG. 3 is a rear perspective view of the vehicle and exemplary tonneau assembly 12 of FIG. 1, with the tonneau assembly in the fully open position. In FIG. 3, an underside of the sheet 42 adjacent the front rail 82 is covered by a guard strip 260, which will be described below and shown in greater detail in FIGS. 5-7.

The underside of the sheet 42 is comprised of a material differing in appearance and durability from that of a top side of the sheet 42. For example, the upper or top side of the sheet 42 is comprised of a more durable material, and the underside of the sheet 42 is comprised of a woven fabric that is less durable than the top side of the sheet 42. Accordingly, the material of the top side of the sheet 42 serves to protect the sheet 42 and the truck bed 14 from external elements such as rain and snow, as well as provide a desirable appearance when the tonneau assembly 12 is in the closed position. The guard strip 260 can therefore be comprised of a similar material as that which is used for the top side of the sheet 42 so as to provide similar qualities to an exposed portion of the underside of the sheet 42 when the sheet 42 is rolled towards the front rail 82 to the storage position such that the tonneau assembly 12 is in the fully open position. In other words, when the sheet 42 is rolled towards the front rail 82 to the fully opened position, a portion of the underside of the sheet 42 adjacent the front rail 82 is exposed. To avoid having a less durable material exposed to the elements, the guard strip 260 can therefore cover the portion of the underside of the sheet 42 that is exposed when the sheet 42 is rolled to the fully opened (storage) position to prevent the underside of the sheet 42 from being exposed, thereby providing improved durability and appearance for the sheet 42, and specifically the underside of the sheet 42, when in the fully opened position.

As described above, the guard strip 260 serves to provide improved durability and appearance for the sheet 42 when in the fully opened position. However, other configurations of guards and covers may be used to achieve improved durability and appearance. For instance, the guard strip 260 may extend the length of the sheet 42 instead of just the portion adjacent the front rail 82. Contrarily, the guard strip 260 may extend less than a length of the portion of the sheet 42 adjacent the front rail 82 such that the guard strip 260 only covers an exposed upper portion of the sheet 42 in the fully opened position. The guard strip 260 may also be comprised of material differing from that of the top side of the sheet 42 entirely. Furthermore, any number of guard strips of varying widths may be attached to the underside of the sheet 42 such as one, two, three, four, etc. The guard strip 260 can also extend a width of the sheet 42, or alternatively may extend less than the width of the sheet 42.

Figure 6:
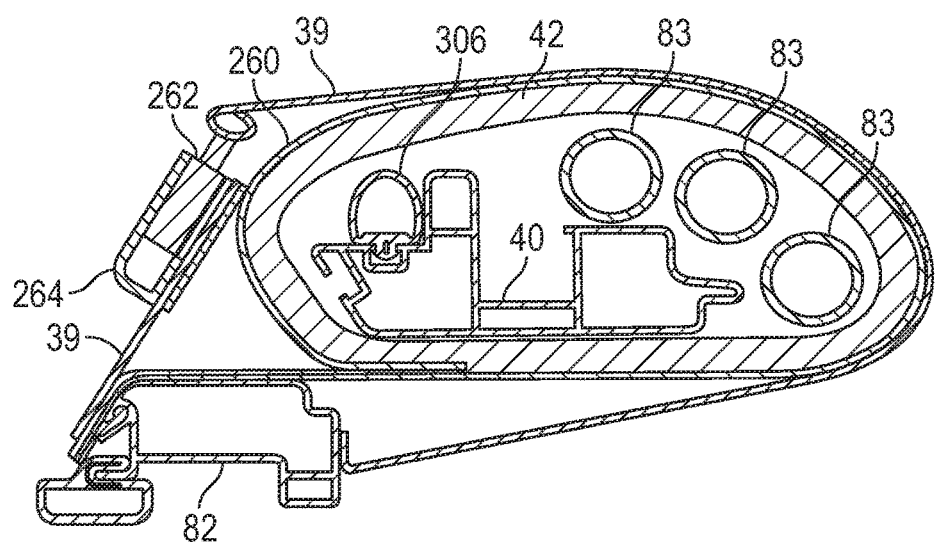
FIG. 6 is a side view of a cross section of the tonneau assembly of FIG. 3, with the sheet rolled up and the tonneau assembly in the fully opened or storage position.

FIG. 6 is a side view of a cross section of the tonneau assembly 12 of FIG. 3, with the sheet 42 rolled up and the tonneau assembly 12 in the fully opened position. Additionally, the straps 39 are wrapped around the rolled sheet 42 to hold the sheet 42 in the fully opened position.

As previously described, a portion of the underside of the sheet 42 adjacent the front rail 82 can be covered with a guard strip 260. The guard strip 260 may be sufficient in length to wrap completely around an exposed portion of the underside of the sheet 42 when in the rolled and completely opened position. When the sheet 42 is rolled to the completely open position, the rear rail 40 and the support rods 83 are wrapped within the sheet 42 and folded overtop one another. The sheet 42 is rolled to a position adjacent the front rail 82 and secured by straps 39 that wrap around the rolled sheet 42, the straps 39 having clip heads 262 that are inserted into corresponding clip bodies 264. The clip heads 262 are removable from the clip bodies 264 so that the sheet 42 may be unrolled to cover the truck bed 14. Alternatively, other attachment structures may be used in place of the clips 262, 264 such as zip ties, velcro, etc. In the present embodiment, the straps 39 are attached to a rear side of the front rail 82 such that the straps 39 extend rearward before extending up and around the rolled sheet 42, and finally extending 39 forward overtop of the rolled sheet 42 to the clip bodies 264 adjacent the front rail 82. The clip heads 262 are inserted therein, securing the rolled sheet 42 in place and in the fully opened position.

The straps 39 and the clips 262, 264 serve to secure the sheet 42 in the rolled and fully opened position under a variety of circumstances such as when the vehicle 10 is stationary and when the vehicle 10 is in motion. However, as discussed above, other structures and configurations may be used to secure the sheet 42 in the rolled and fully opened position.

Figure 7:
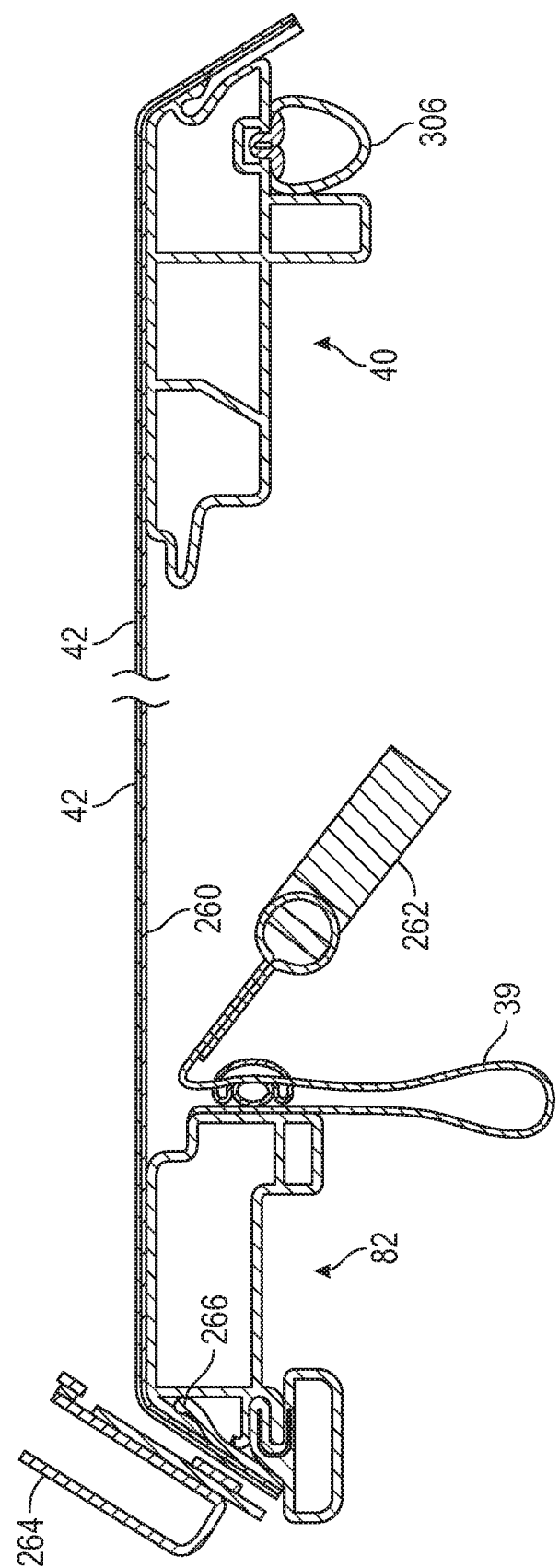
FIG. 7 is a side view of a cross section of the tonneau assembly of FIG. 4, with the tonneau assembly in a fully closed position.

FIG. 7 is a side view of a cross section of the tonneau assembly 12 of FIG. 4, with the tonneau assembly 12 in a fully closed position. Also, the straps 39 are not wrapped around the sheet 42 and instead hang from the rear side of the front rail 82 to which they are attached, with the hanging ends of the straps 39 affixed to the rear side of the front rail 82.

When the sheet 42 of the tonneau assembly 12 is in the closed position, as shown in FIG. 7, the guard strip 260 attached to the underside of the sheet 42 is directed towards the interior of the truck bed 14. Only upon rolling of the sheet 42 to the fully opened position does the guard strip 260 cover all exposed portions of the sheet 42, as discussed above and shown in FIG. 6.

Figure 8:
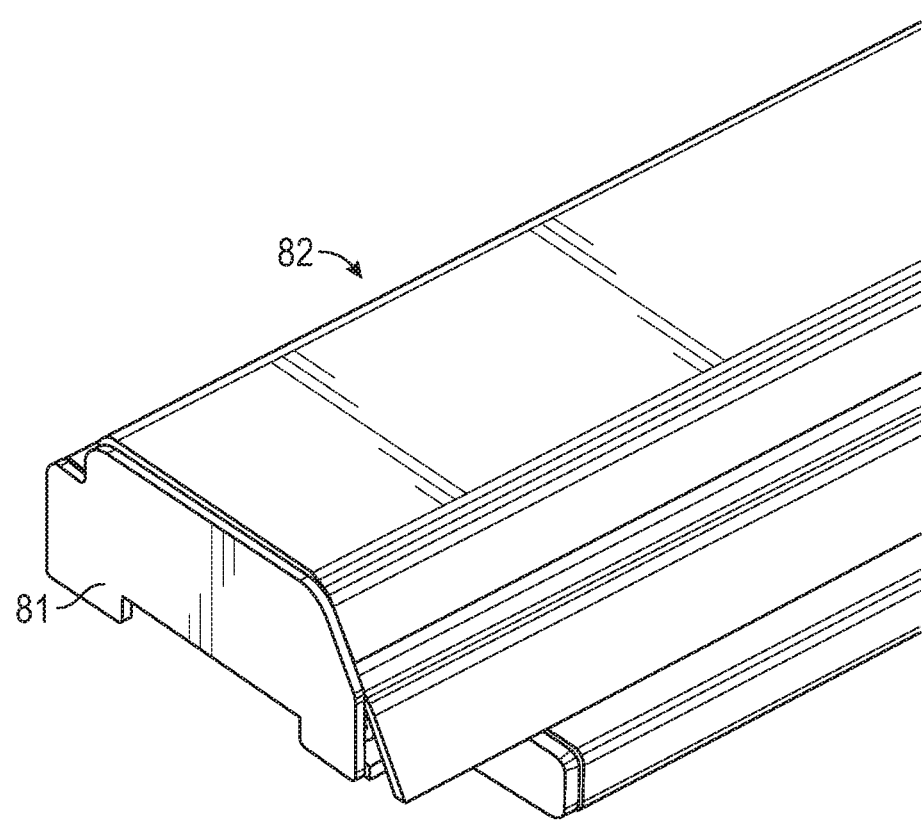
FIG. 8 is a partial perspective view of the front rail of the tonneau assembly, with the front rail engaged with a front portion of the sheet.
Figure 9:
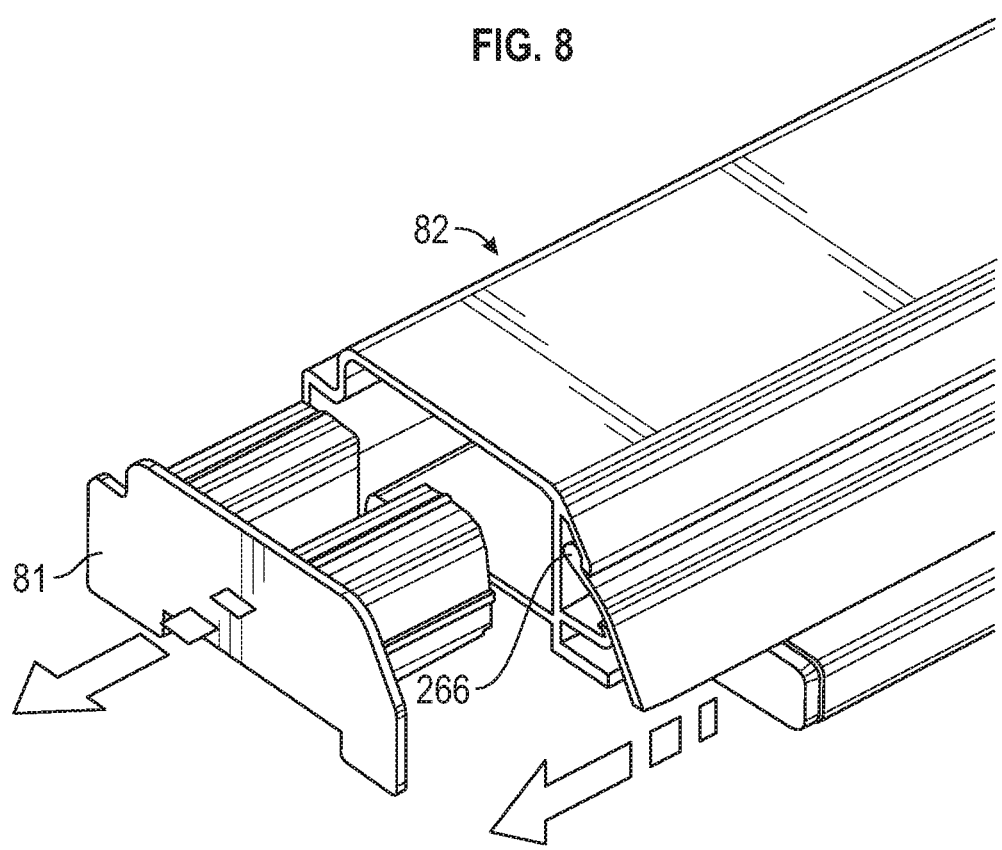
FIG. 9 is a partial perspective view of the front rail of FIG. 8, with a rail cap removed from the front rail.

FIGS. 8 and 9 are partial perspective views of the front rail 82 of the tonneau assembly 12 in accordance with the present disclosure, with the sheet 42 omitted for clarity. Specifically, FIG. 8 shows a front rail cap 81 of the front rail 82 in an inserted position, while FIG. 9 shows the front rail cap 81 of the front rail 82 in a removed position.

In the present embodiment, the front rail cap 81 is removed from the front rail 82 by pulling in the direction of the arrow shown. The sheet 42 (not shown) is then laid overtop the top side of the front rail 82, with a front edge of the sheet 42 extending beyond the top side of the front rail 82. As shown in more detail in FIG. 10, the front edge of the sheet 42 includes a front rail tab 266. The front edge of the sheet 42 is then wrapped around a contoured front surface of the front rail 82, and the front rail tab 266 is tucked up behind the contoured front surface so as to be wedged within a gap in the contoured front surface of the front rail 82. The front rail cap 81 is then reinserted into a side of the front rail 82, securing the front rail tab 266 of the sheet 42 within the gap in the front rail 82.

The front rail cap 81 and the front rail tab 266 serve to secure the front edge of the sheet 42 to the front rail 82. However, other structures may be used to secure the sheet 42 to the front rail 82.

Figure 10:
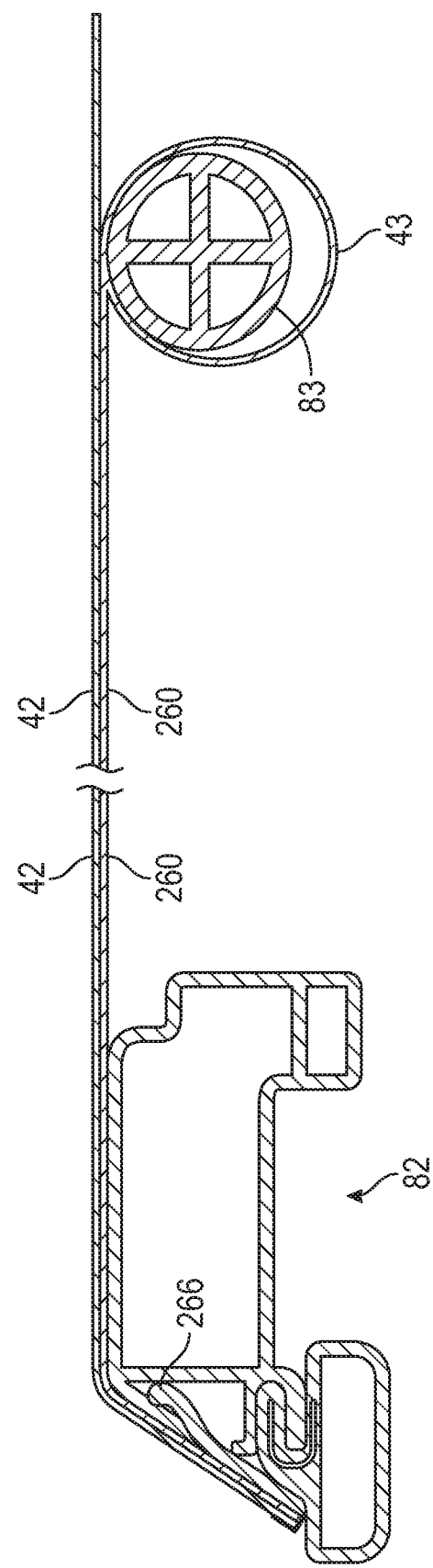
FIG. 10 is a side view of a cross section of the tonneau assembly of FIG. 4, with a support rod inserted through a sheet pocket attached to an underside of the sheet.

FIG. 10 is a side view of a cross section of a part of the tonneau assembly 12 in accordance with the present disclosure, with the sheet 42 in the fully closed position. Specifically, FIG. 10 shows the support rod 83 disposed within the sheet pocket 43, which is attached to the underside of the sheet 42.

As previously described, the support rods 83 of the tonneau assembly 12 are disposed within corresponding sheet pockets 43 attached to the underside of the sheet 42 to add structure and support to the sheet 42, particularly in the fully closed position. The support rods 83 are therefore suspended from the underside of the sheet 42.

Additionally, rod padding may be inserted between the support rods 83 and the underside of the sheet 42 to which the support rods 83 are attached. The rod padding may be attached directly to the underside of the sheet 42, and the sheet pockets 43 may then be attached to the rod padding. This configuration separates the support rods 83 from the sheet 42 so as to prevent flapping or buffeting of the sheet 42 against the support rods 83. The rod padding may be foam or any other suitable material, and may extend a length of the corresponding support rods 83 or be segmented to only extend a partial length. The rod padding may be attached to the underside of the sheet 42 by any appropriate method including stitching or gluing, including all methods of attachment contemplated for the rod pockets 43.

FIGS. 27A-C are side views of a cross section of the side rail 44 of FIG. 16 in accordance with the present disclosure, with a side edge of the sheet 42 shown in transition between engaged and disengaged positions relative to the side rail 44.

In the present embodiment, the cable 50 is retained within a cable housing 270 attached at an end of a cable mount 91, an opposite end of the cable mount 91 being attached to an underside of the side edge of the sheet 42. The cable housing 270 can be cylindrical in shape, and can extend a length of the side edge of the sheet 42. Alternatively, the cable housing 270 can be segmented to only extend a partial length of the side edge of the sheet 42. The cable housing 270 and the cable mount 91 of the present embodiment are made of plastic, however other appropriate materials such as metal may be used. Because the cable mount 91 is relatively rigid, movement of the side edge of the sheet 42 corresponds to similar movement of the cable mount 91, thereby also moving the cable 50 retained within the cable housing 270.

As described above, the cable mount 91 and cable housing 270 are inserted into the gap between the upper and lower camming surfaces 74, 76 of the side rail 44 upon closing of the rear rail 40. In FIG. 27A, the sheet 42 is shown in a state in which the rear rail 40 (not shown) is not in a fully closed position, and therefore the side edge of the sheet 42 is spaced from the camming surfaces 74, 76. FIG. 27B shows the side edge of the sheet 42 being spaced closer to the camming surfaces 74, 76 by virtue of the rear rail 40 being moved to a partially closed position. FIG. 27C shows the side of the sheet 42 wrapped around the camming surfaces 74, 76 by virtue of the rear rail 40 being moved to the closed position, thereby engaging the cable mount 91 and cable 50 with the gap between the camming surfaces 74, 76. In the present embodiment, the cable 50 is attached to the sheet 42 by a cable mount 91 that extends transversely from an underside of the side edge of the sheet 42, such that the cable mount 91 is configured to be inserted within the gap between the camming surfaces 74, 76 upon closing of the rear rail 40.

In conjunction with the cable mount 91, the cable 50 serves to secure the sheet 42 to the side rail 44, providing lateral tension in the sheet 42 across the width of the truck bed 14. Tension in the sheet 42 prevents buffeting and sagging from wind or other elements such as rain or snow during movement of the vehicle 10 and otherwise. However, other structures may be used to secure the sheet 42 to the side rails, such as interlocking teeth, which will be described below.

In an alternate embodiment, interlocking teeth will be attached to the underside of the side edges of the sheet 42 instead of the aforementioned cable mounts 91 and cables 50. The interlocking teeth will function in a similar way as the cables 50, securing the side edges of the sheet 42 to the side rails 44 while providing lateral tension across the width of the sheet 42. A first set of teeth may be attached to one or both of the camming surfaces 74, 76, with the teeth facing downward so as to be able to prevent other engaged teeth from sliding upwards. A second set of teeth may then be attached to the underside of the side edge of the sheet 42 similarly to the attachment of the aforementioned cable mount 91. The second set of teeth face upward, configured to interlock with the first set of teeth on the side rail 44. In this manner, the first set of teeth on the side rail 44 can prevent the side edge of the sheet 42 from lifting up and away from the side rail 44 by virtue of the second set of teeth attached thereto. The configuration of the interlocking teeth also allows the sides of the sheet 42 to be pulled downward over the camming surfaces 74, 76 of the side rail 44 to appropriately tension the sheet 42. There may be any number of interlocking teeth, and the interlocking teeth may extend an entire or partial length of the side rails 44.

As in the above cable mount 91 and cable 50 configuration, the interlocking teeth are brought into contact upon closing the rear rail 40, and separated from each other upon opening the rear rail 40. Consequently, operation of the alternate embodiment employing the interlocking teeth is similar to that of the cable mount 91 and cable 50 configuration with regard to engaging sides of the sheet 42 with the side rails 44 upon closing and opening the rear rail 40.

Alternatively, velcro may be used instead of interlocking teeth to engage sides of the sheet 42 to the side rails 44. Velcro hooks attached to the underside of the side edge of the sheet 42 can be configured to engage velcro loops attached to the camming surfaces 74, 76 such that opening and closing the rear rail 40 moves the sides of the sheet 42 and attached velcro strips into and out of contact with the velcro strips attached to the camming surfaces 74, 76. As described above, various arrangements of velcro strips may be used to secure the sides of the sheet 42 to the side rails 44.

VIII. Rear Rail Latch and Seals

A. Rear Rail Latch

Figure 33:
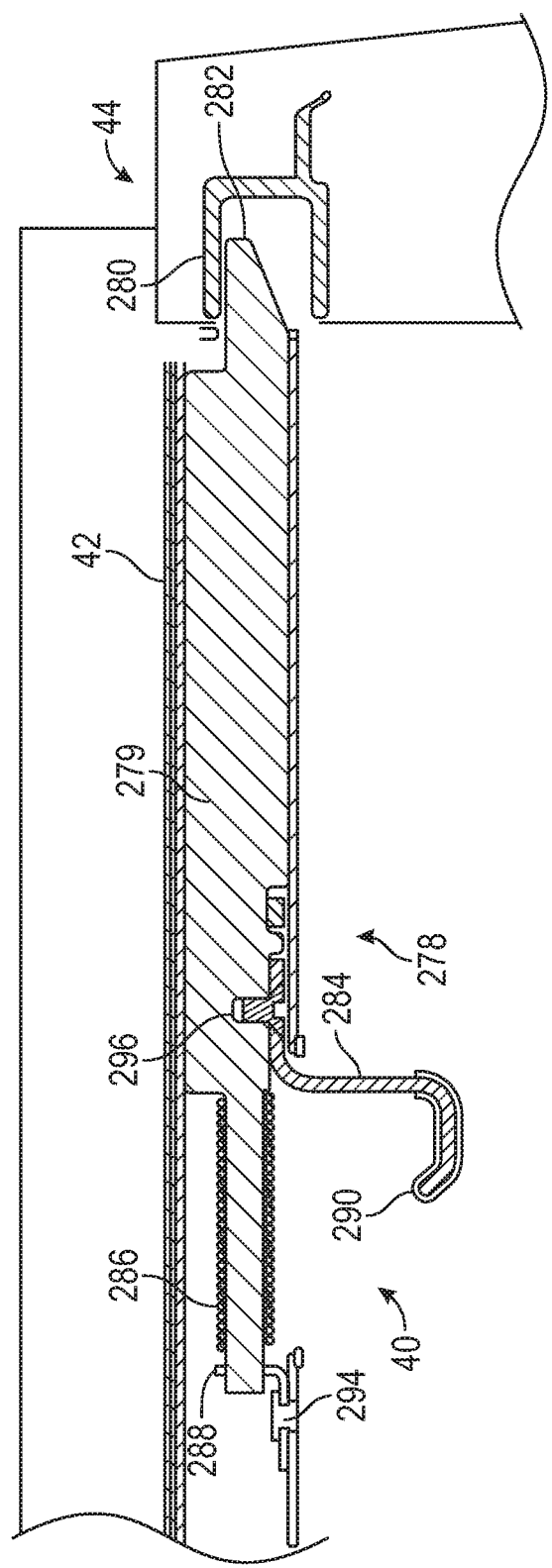
FIG. 33 is a partial side view of a cross section of the rear rail in accordance with the present disclosure.

FIGS. 31-33 are side views of a cross section of the rear rail 40 in accordance with the present disclosure, and in particular show a latch assembly 278 of the rear rail 40 in operation with the side rail 44. Specifically, FIG. 31 shows the latch assembly 278 engaged with the side rail 44, while FIG. 32 shows the latch assembly 278 disengaged from the side rail 44.

In the present embodiment, the rear rail 40 includes a latch assembly 278, the latch assembly 278 positioned at a lower portion of the rear rail 40 and having a wedge end 282 disposed at an end of a latch body 279 adjacent a side bracket 280 of the side rail 44. The rail wedge end 282 is configured to slideably engage the side rail bracket 280 upon actuation of a handle bracket 284, thereby permitting opening of the rear rail 40. The latch assembly 278 can also include a latch spring 286 to bias the latch assembly 278 towards the side rail 44 having the side bracket 280. The latch spring 286 can abut a spring bracket 288 that is inserted through a slot in the latch body 279, the spring bracket 288 being attached to the rear rail 40.

To disengage the latch assembly 278 and open the rear rail 40, a force is exerted on the handle bracket 284 to thereby slide the latch body 279 away from the side rail 44. In embodiments including the latch spring 286, this force must overcome the spring bias. Consequently, the wedge end 282 of the latch body 279 also moves away from the side rail 44, therefore disengaging the wedge end 282 from the side bracket 280. With the wedge end 282 and the side bracket 280 disengaged, the rear rail 40 may be lifted upwards to the opened position.

To close the rear rail 40 and engage the latch assembly 278, the rear rail 40 must simply be pulled downward and to the closed position. As shown, a bottom surface of the wedge end 282 can be cammed so as to transversely displace the latch body 279 away from the side rail 44 upon closing the rear rail 40. Therefore, as the rear rail 40 is closing, the cam128 surface of the wedge end 282 comes into contact with an upper portion of the side rail 44. Contact along the cammed surface displaces the latch body 279 away from the side rail 44 as the rear rail 40 continues toward the closed position. At a stage of the closing process in which the wedge end 282 aligns with the side bracket 280, the wedge end 282 is pushed into engagement with the side bracket 280 via the latch spring 286. The rear rail 40 is thereby locked in the closed position through engagement of the latch assembly 278 and the side rail 44.

Figure 34:
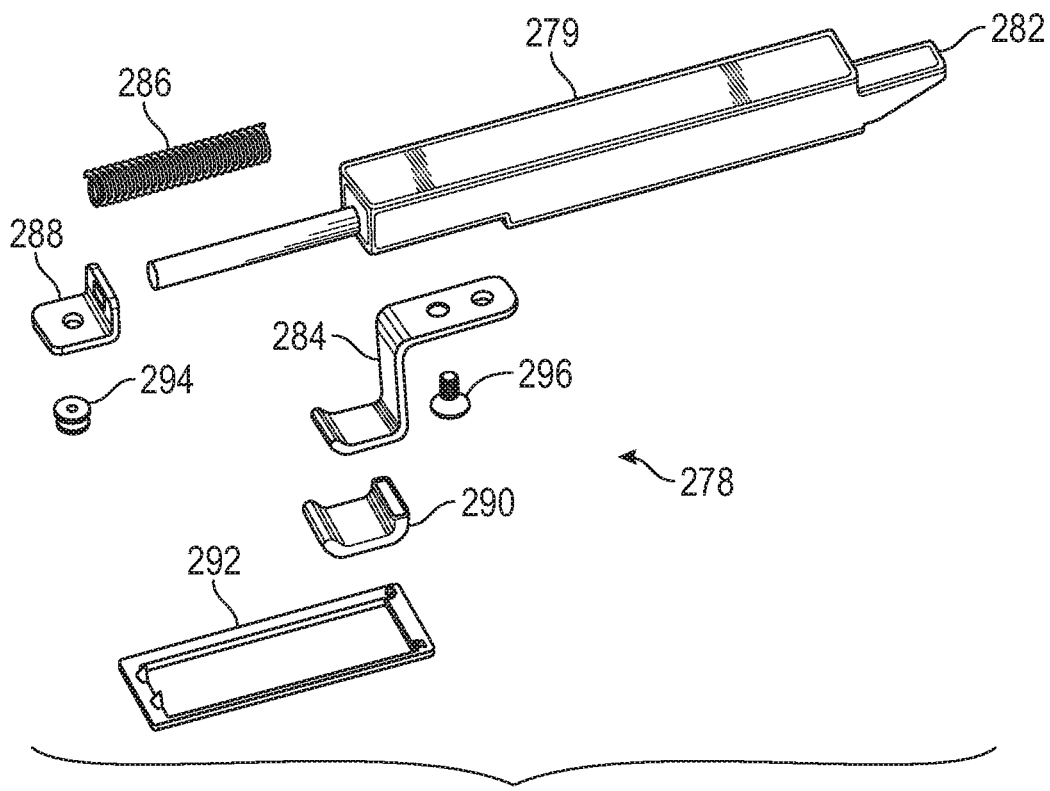
FIG. 34 is an exploded perspective view of the latch assembly in accordance with the present disclosure.

FIG. 34 is an exploded perspective view of the latch assembly 278 in accordance with the present disclosure. The latch assembly 278 can include the latch body 279 having the wedge end 282, and the latch spring 286 disposed at an end of the latch body 279 opposite the wedge end 282. The latch spring 286 may be a coil spring, and may be disposed concentrically around an elongated cylindrical portion of the latch body 279. The latch spring 286 is secured by the spring bracket 288 and spring rivet 294, the spring bracket 288 abutting a distal end of the latch spring 286.

The latch assembly 278 also includes the handle bracket 284, which is attached to an underside of the latch body 279 by a handle screw 296. An end portion of the handle bracket 284 opposite the attached portion is covered by a handle grip 290. The handle grip 290 can be a rubber coating or any other appropriate material to increase grip around the end portion. A latch cover 292 is placed around the end portion of the handle bracket 284 and fastened to the underside of the latch body 279 such that the handle bracket 284 protrudes through the underside of the latch body 279 and the latch cover 292, as described below.

Figure 35:
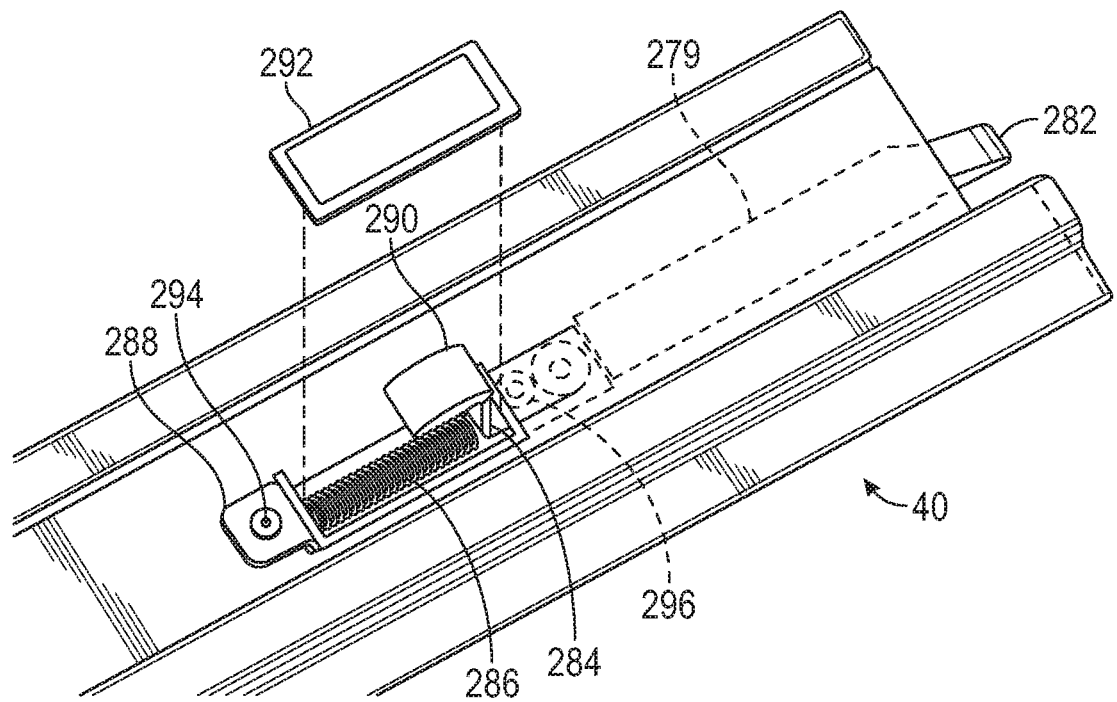
FIG. 35 is a perspective view of the underside of a part of the rear rail 40 including the latch assembly in accordance with the present disclosure, with a latch cover removed.

FIG. 35 is a perspective view of the underside of a part of the rear rail 40 including the latch assembly 278 in accordance with the present disclosure, with the latch cover 292 shown removed. As shown in FIG. 35, the latch assembly 278 can be disposed above the underside of the rear rail 40 such that the handle bracket 284 protrudes outward through a gap in the rear rail 40, the gap surrounded by the latch cover 292. Various portions of the latch assembly 278 may be visible through the latch cover 292, and the spring bracket 288 and the handle bracket 284 may be attached to the underside of the rear rail 40 via the spring rivet and the handle screw, respectively.

Figure 36:
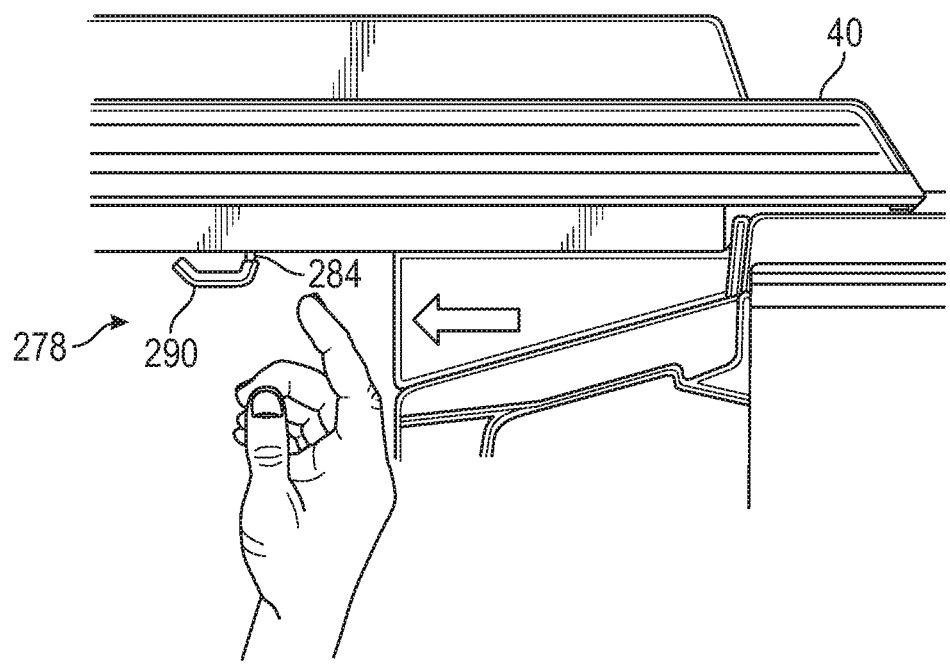
FIG. 36 is a rear view of the latch assembly assembled within the rear rail in accordance with the present disclosure.

FIG. 36 is a rear view of the latch assembly 278 assembled within the rear rail 40 in accordance with the present disclosure. A direction in which the handle bracket 284 is moved to disengage the latch assembly 278 is designated by an arrow.

B. Seals

As previously described, FIG. 20 is a side view of a cross section of the driver-side side rail 44 of FIG. 16, with a side portion of the sheet 42 engaged with the side rail 44; and FIGS. 27A-C are side views of a cross section of the side rail 44 of FIG. 20 at various stages of engagement with the side portion of the sheet 42. As shown, the rail seal 308 is affixed to an underside of the side rail 44, and specifically is affixed to a portion of the underside proximate the lower camming surface 76. The rail seal 308 fills the gap between the bottom of the side rail 44 and the side panel cover 100, preventing water or other substances from entering the truck bed 14. The rail seal 308 can be rubber, plastic, foam, or any other material appropriate for sealing. Additionally, the rail seal 308 can extend the length of the side rail 44, or may alternatively extend a length greater than or less than the length of the side rail 44.

Figure 37:
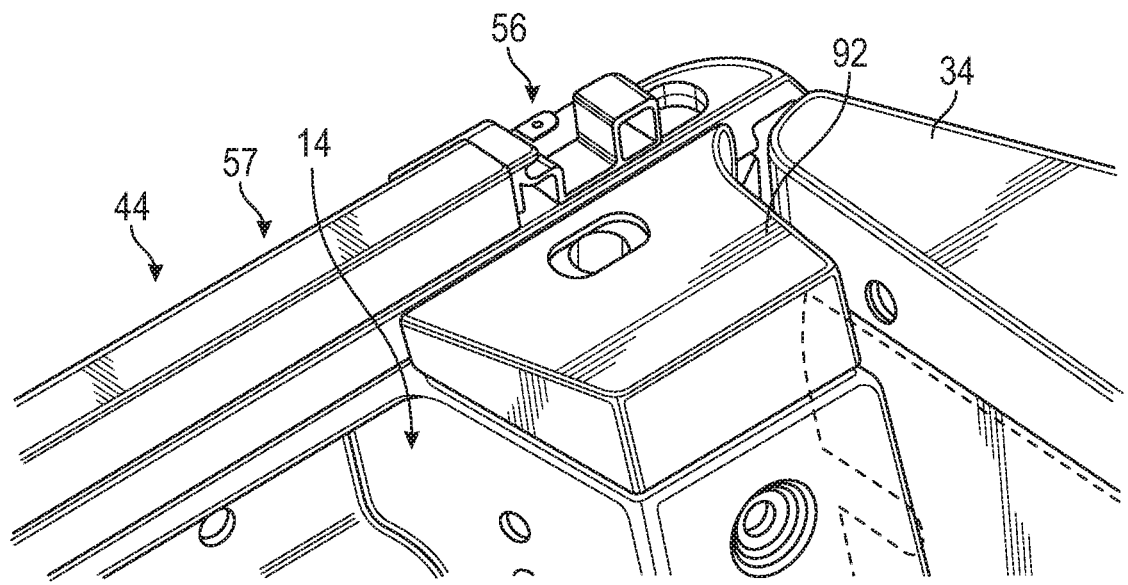
FIG. 37 is a perspective view of a corner block of the tonneau assembly of FIG. 11 in accordance with the present disclosure.
Figure 46:
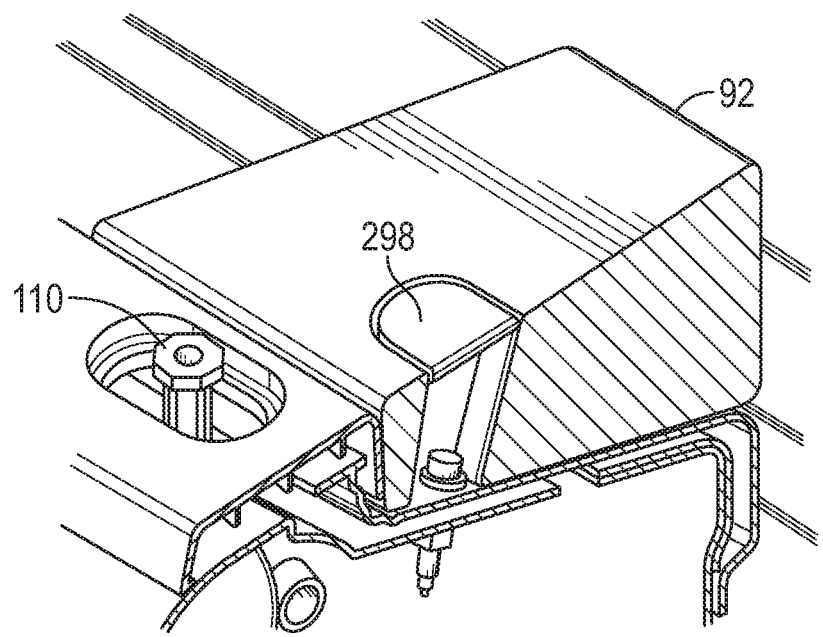
FIG. 46 is a perspective view of a cross section of the corner block of FIG. 16 in accordance with the present disclosure.
Figure 47:
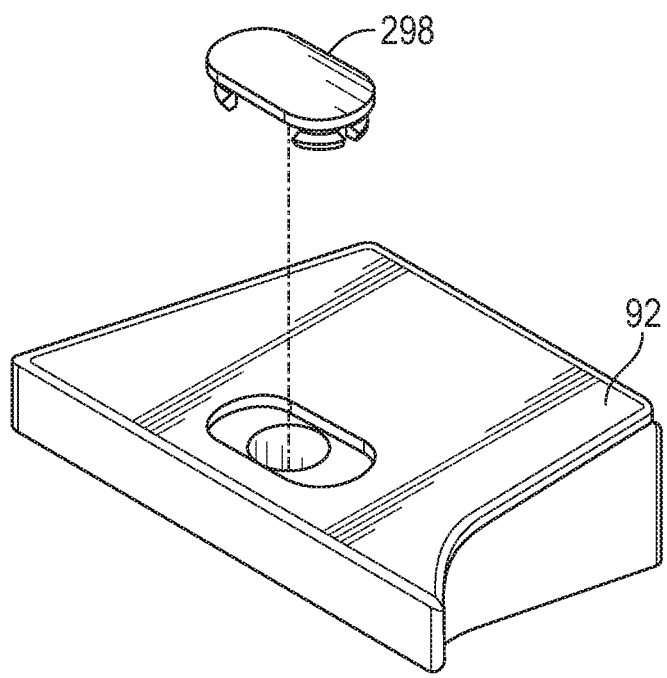
FIG. 47 is a perspective view of the corner block of FIG. 46 in accordance with the present disclosure.

FIG. 37 is a perspective view of the corner block 92 of the tonneau assembly 12 in accordance with the present disclosure. As shown in more detail in FIGS. 46 and 47, the corner block 92 affixed to a D-pillar of the vehicle 10 to create a level surface at the rear passenger-side corner of the truck bed 14. Level surfaces around the truck bed 14 allow the sheet 42 of the tonneau assembly 12 to lie flat across the truck bed 14 and be properly sealed, as will be described below. The corner block 92 can be attached to the D-pillar by a screw inserted through an aperture in the corner block 92, the aperture thereafter being covered by a block lid 298. The corner block 92 may be foam, rubber, plastic, or any other material appropriate for sealing applications to prevent entry of water and other substances into the truck bed 14.

Figure 40:
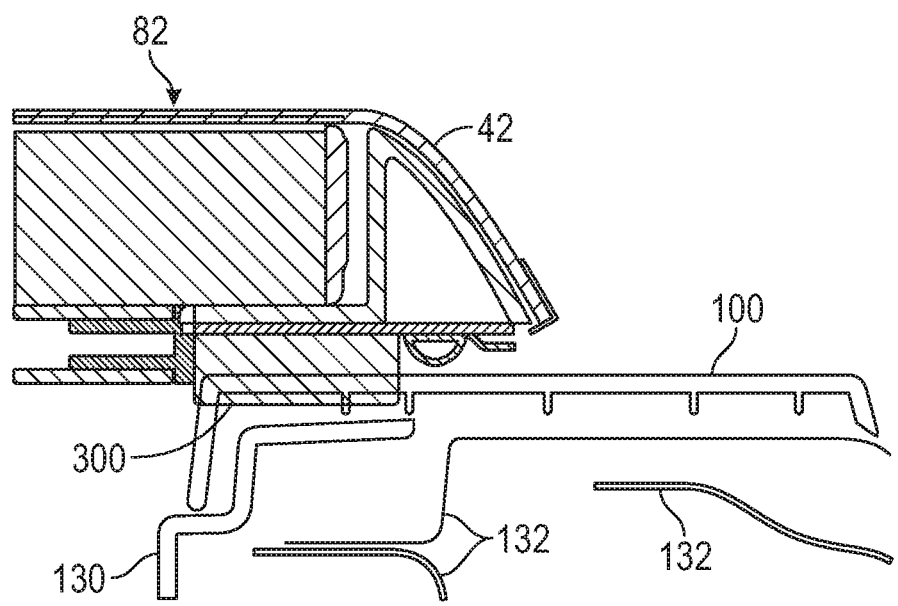
FIG. 40 is a side view of a cross section of a front corner seal of the tonneau assembly of FIG. 16 in accordance with the present disclosure.

FIG. 40 is a side view of a cross section of a front corner seal 220 of the tonneau assembly 12 of FIG. 16 in accordance with the present disclosure, with the front corner seal 220 disposed within a gap between the front rail 82 and an adjacent portion of the truck bed 14. Specifically, the front corner seal 220 abuts the side panel cover 100 of the truck bed 14 adjacent the underside of the front rail 82. The front corner seal 220 may be foam, rubber, plastic, or any other material appropriate for sealing applications to prevent entry of water and other substances into the truck bed 14.

Figure 41:
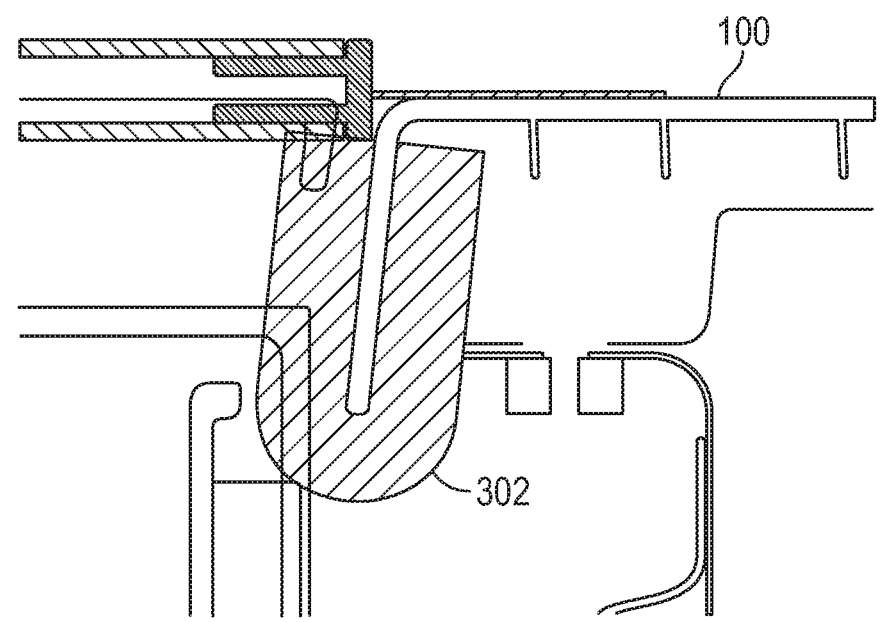
FIG. 41 is a side view of a cross section of a side seal of the tonneau assembly of FIG. 11 in accordance with the present disclosure.
Figure 42:
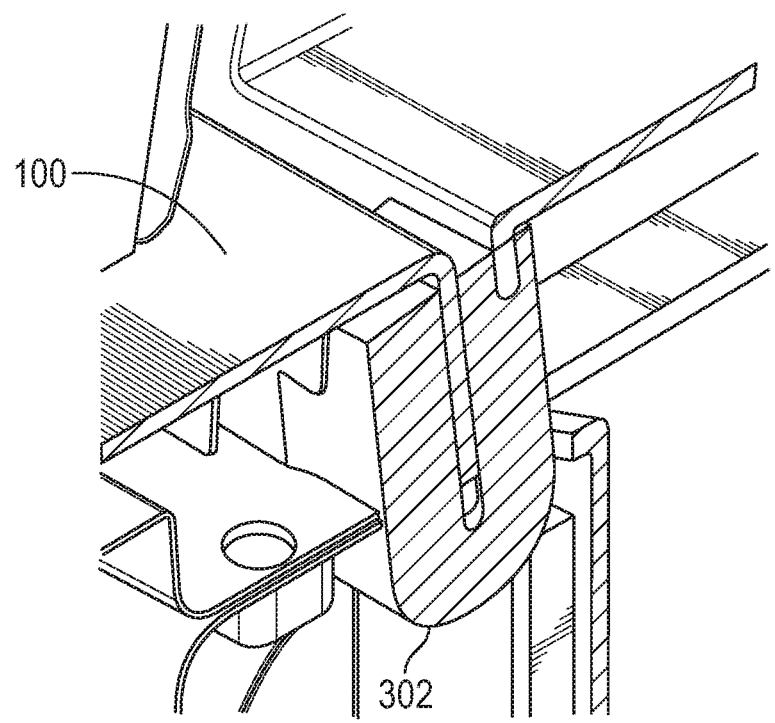
FIG. 42 is a perspective view of a cross section of a side seal of FIG. 41 in accordance with the present disclosure.
Figure 43:
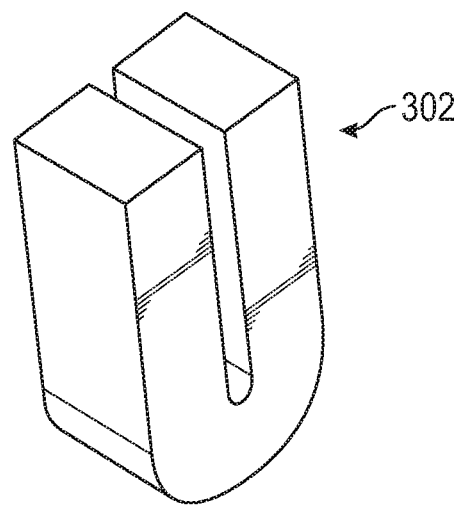
FIG. 43 is a perspective view of the side seal of FIG. 42 in accordance with the present disclosure.

FIG. 41 is a side view of a cross section of a side seal 302 of the tonneau assembly 12 of FIG. 11 in accordance with the present disclosure, with the side seal 302 approximately U-shaped and inserted around an edge portion of the side panel cover 100 of the truck bed 14 adjacent the front rail 82. As shown in more detail in FIGS. 42 and 43, the side seal 302 further creates a seal between the side panel cover 100 of the truck bed 14 and the adjacent components of the tonneau assembly 12. Specifically, the sheet 42 rests overtop of the truck bed 14 and therefore gaps between panels of the truck bed 14 can be plugged with seals such as the side seal 302.

Figure 44:
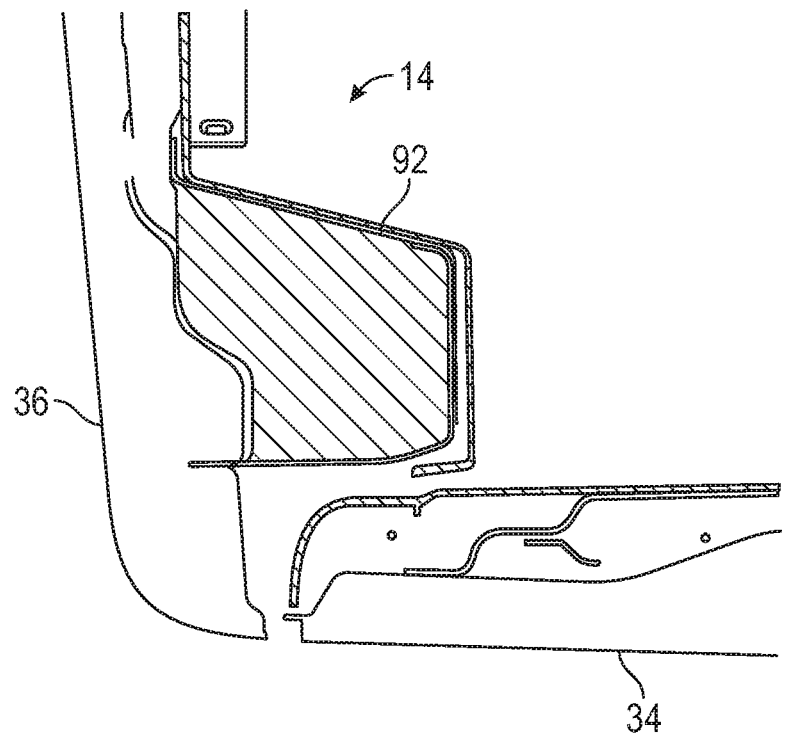
FIG. 44 is a top view of a cross section of the corner block of the tonneau assembly of FIG. 16 in accordance with the present disclosure.

FIG. 44 is a top view of a cross section of the corner block 92 of the tonneau assembly 12 of FIG. 16 in accordance with the present disclosure. As described above, the corner block 92 is fit to the D-pillar of the vehicle 10 and serves to prevent entry of water or other substances into the truck bed 14. Specifically, the corner block 92 seals gaps between the tonneau assembly 12 at the rear portion of the truck bed 14.

Figure 45:
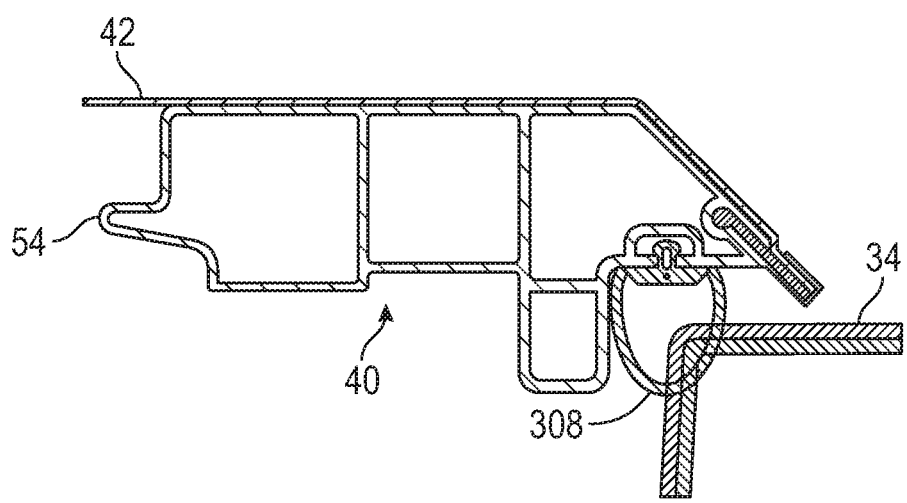
FIG. 45 is a side view of a cross section of the rear rail of the tonneau assembly of FIG. 16 in accordance with the present disclosure.

FIG. 45 is a side view of a cross section of the rear rail 40 of the tonneau assembly 12 of FIG. 16 in accordance with the present disclosure. The rear rail 40 includes a rear seal 306 extending transversely along a width of the rear rail 40. The rear seal 306 is disposed along an underside of the rear rail 40 adjacent the tail gate 34 of the vehicle so that when the tail gate 34 is up and in the fully closed position (and the rear rail 40 is down and in the fully closed position), the tail gate 34 abuts the rear seal 306 of the rear rail 40. As previously described, seals such as the rear seal 306 can be foam, rubber, plastic, or any other material suitable for sealing the interior of the truck bed 14 from external substances.

IX. Other Alternative Embodiments

While certain embodiments of the invention are described above, and FIGS. 1-47 disclose the best mode for practicing the various inventive aspects, it should be understood that the invention can be embodied and configured in many different ways without departing from the spirit and scope of the invention.

The structures are explained above in the context of a truck bed of a pickup truck. However, as previously disclosed, the various embodiments are intended to be applied to any type of vehicle having an internal or external exposed area. In fact, the embodiments are also applicable to non-vehicles, such as amusement park rides, hot tubs, swimming pools, etc.

The embodiments shown in FIGS. 3, 4, 11-13, and 16 include sets of four extenders and bolts inserted into each side rail to mount the side rails to the truck bed. However, the various embodiments are intended to include or otherwise cover assemblies with any number of extenders and bolts, including any appropriate number of both components.

The embodiments of FIGS. 4, 6, and 16 include three support rods extending transversely across the truck bed to support the sheet. However, embodiments are intended to include or otherwise cover any number of support rods to accomplish the appropriate sheet support. In fact, some embodiments may not include any support rods as support for the sheet is provided in other ways.

The disclosed embodiments also cover methods of manufacturing any of the components disclosed above. These methods of manufacturing include or otherwise cover electronics, processors and computer programs implemented by processors used to perform and/or design various elements of the storage assemblies disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

While the subject matter has been described in detail with reference to exemplary embodiments thereof, it will be apparent to one skilled in the art that various changes can be made, and equivalents employed, without departing from the scope of the invention. Any related art references discussed in the above Background Section are hereby incorporated by reference in their entirety.

What is claimed is:

1. A tonneau side rail assembly for attachment to a vehicle bed frame that is at least partially covered by a bed frame cover and that at least partially defines a vehicle exposed area, the tonneau side rail assembly being configured for use with a tonneau assembly that is capable of removably covering the vehicle exposed area, the tonneau side rail assembly comprising:
    a tonneau side rail that is configured to be removably attached to the tonneau assembly, the tonneau side rail including upper and lower surfaces, an aperture being defined in each of the upper and lower surfaces such that an open space is defined between the apertures; and
    an extender defining longitudinally opposite ends, one of the ends being configured to be rigidly secured to the vehicle bed frame, and the other of the ends being configured to be rigidly secured to the tonneau side rail adjacent the aperture defined in the lower surface so as to define a gap between the tonneau side rail and the bed frame cover;
    a weld nut rigidly attached to one surface of the vehicle bed frame, the weld nut threadingly secured to the one end of the extender; and
    a fastener that is configured to extend through the aperture defined in the lower surface of the tonneau side rail to secure the tonneau side rail to the other end of the extender.

2. The tonneau side rail assembly according to claim 1, further including a seal disposed in the gap defined between the tonneau side rail and the bed frame cover.

3. The tonneau side rail assembly according to claim 1, wherein the vehicle bed frame defines an opening, the one end of the extender is extendible through the opening of the vehicle bed frame for engagement with the weld nut.

4. The tonneau side rail assembly according to claim 3, wherein the extender defines a flange having a diameter that is larger than a diameter of the opening of the vehicle bed frame so as to impede entry of the flange into the opening of the vehicle bed frame and into contact with the weld nut.

5. The tonneau side rail assembly according to claim 1, wherein the other end of the extender defines a threaded bore, and the bolt defines a head and a threaded shaft, the shaft of the bolt being configured to extend within the bore such that the threads of the shaft communicate with the threads of the bore to secure the bolt to the extender.

6. The tonneau side rail assembly according to claim 5, wherein the bolt head defines a diameter that is larger than a diameter of the aperture of the lower surface of the tonneau side rail to impede the bolt head from entering into the aperture of the lower surface of the tonneau side rail and the bore of the extender.

7. The tonneau side rail assembly according to claim 6, wherein an upper surface of the bolt head defines an indentation that is configured for engagement with a tool, the engagement enabling transmission of torque from the tool to the bolt such that rotation of the tool causes the bolt to rotate.

8. The tonneau side rail assembly according to claim 7, wherein the bolt is disposed at a location, when secured to the extender, to enable the head of the bolt to be engaged by the tool via the aperture defined in the upper surface of the tonneau side rail.

9. A tonneau system for use with a vehicle bed frame that is at least partially covered by a bed frame cover and that at least partially defines a vehicle exposed area, the tonneau system comprising:
a tonneau assembly that includes a tonneau cover that is configured to removably cover the vehicle exposed area;
a tonneau side rail assembly that includes:
a tonneau side rail that is configured to be removably attached to the tonneau assembly, the tonneau side rail including an upper wall and a lower base wall spaced from the upper wall to define an open space therebetween, an aperture being defined in each of the upper wall and the lower base wall such that the open space is defined between the apertures; and
an extender defining longitudinally opposite ends, one of the ends being configured to be rigidly directly secured to the vehicle bed frame, and the other of the ends being configured to be rigidly directly secured to the lower base wall of the tonneau side rail adjacent the aperture defined in the lower base wall so as to define a gap between the tonneau side rail and the bed frame cover.

10. The tonneau system according to claim 9, further including a seal disposed in the gap defined between the tonneau side rail and the bed frame cover.

11. The tonneau system according to claim 9, further including a weld nut rigidly attached to one surface of the vehicle bed frame, the weld nut threadingly secured to the one end of the extender.

12. The tonneau system according to claim 11, wherein the vehicle bed frame defines an opening, the one end of the extender is extendible through the opening for engagement with the weld nut.

13. The tonneau system according to claim 12, wherein the extender defines a flange having a diameter that is larger than a diameter of the opening of the vehicle bed frame so as to impede entry of the flange into the opening of the vehicle bed frame and into contact with the weld nut.

14. The tonneau system according to claim 9, further including a bolt that is configured to extend through the aperture defined in the lower base wall of the tonneau side rail to secure the tonneau side rail to the other end of the extender.

15. The tonneau system according to claim 14, wherein the other end of the extender defines a threaded bore, and the bolt defines a head and a threaded shaft, the shaft of the bolt being configured to extend within the bore such that the threads of the shaft communicate with the threads of the bore to secure the bolt to the extender.

16. The tonneau system according to claim 15, wherein the bolt head defines a diameter that is larger than a diameter of the aperture of the lower surface of the tonneau side rail to impede the bolt head from entering into the aperture of the lower base wall of the tonneau side rail and the bore of the extender.

17. The tonneau system according to claim 16, wherein an upper surface of the bolt head defines an indentation that is configured for engagement with a tool, the engagement enabling transmission of torque from the tool to the bolt such that rotation of the tool causes the bolt to rotate; and wherein the bolt is disposed at a location, when secured to the extender, to enable the head of the bolt to be engaged by the tool via the aperture defined in the upper wall of the tonneau side rail.

18. A tonneau system for use with a vehicle bed frame that is at least partially covered by a bed frame cover and that at least partially defines a vehicle exposed area, the tonneau system comprising:
a tonneau assembly that includes a tonneau cover that is configured to removably cover the vehicle exposed area;
a side rail that is removably attachable to the tonneau assembly, the side rail includes an upper wall and a base, the base includes a first side positioned opposite a second side, the upper wall and the base at least partially define a chamber, the base includes a protrusion that extends from the first side of the base into the chamber, the base defines a recess on the second side of the base opposite the protrusion, the protrusion defines an aperture in the base, and the second side of the side rail is positionable opposite a side panel cover of a vehicle bed frame;
an extender that includes a first end that is rigidly securable to the vehicle bed frame, and a second end that is positionable adjacent the second side of the base in the recess to maintain a gap between the side panel cover and the side rail;
a fastener including a head having a diameter greater than a diameter of the aperture and a threaded shaft having a diameter that is smaller than the diameter of the aperture, the threaded shaft of the fastener is insertable through the aperture in the base of the side rail to threadingly engage the extender to secure the side rail to the vehicle bed frame, wherein the head of the fastener is positioned in the chamber between the upper wall and the base when the side rail is secured to the vehicle bed frame; and
a seal positioned in the gap between the side rail and the side panel cover, the seal engages the side rail and the side panel cover outboard of the fastener when the side rail is secured to the vehicle bed frame.

* * * * *